(12) United States Patent
Kikkawa et al.

(10) Patent No.: US 8,321,917 B2
(45) Date of Patent: Nov. 27, 2012

(54) CONNECTION AUTHENTICATION SYSTEM, TERMINAL APPARATUS, CONNECTION AUTHENTICATION SERVER, CONNECTION AUTHENTICATION METHOD, AND PROGRAM

(75) Inventors: Norifumi Kikkawa, Tokyo (JP); Kei Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 940 days.

(21) Appl. No.: 12/354,284

(22) Filed: Jan. 15, 2009

(65) Prior Publication Data
US 2009/0217359 A1    Aug. 27, 2009

(30) Foreign Application Priority Data
Jan. 18, 2008   (JP) ................................. 2008-009387

(51) Int. Cl.
*H04L 29/06* (2006.01)
(52) U.S. Cl. ............... 726/5; 726/21; 713/161; 713/168
(58) Field of Classification Search ................ 726/5, 21; 713/161, 168
See application file for complete search history.

(56) References Cited

U.S. PATENT DOCUMENTS

| | | | |
|---|---|---|---|
| 6,817,519 B2 * | 11/2004 | Yasushi et al. ................. | 235/379 |
| 7,992,212 B2 * | 8/2011 | Nagata et al. ................... | 726/27 |
| 2005/0086377 A1 | 4/2005 | Aso | |
| 2006/0206608 A1 | 9/2006 | Naito et al. | |
| 2008/0077789 A1 * | 3/2008 | Gondo .......................... | 713/155 |

FOREIGN PATENT DOCUMENTS

| | | |
|---|---|---|
| JP | 2002-082910 | 3/2002 |
| JP | 2004-310734 | 11/2004 |
| JP | 2005-094252 | 4/2005 |
| JP | 2006-171989 | 6/2006 |
| JP | 2006-238329 | 9/2006 |
| JP | 2006-254137 | 9/2006 |
| JP | 2006-262111 | 9/2006 |

* cited by examiner

*Primary Examiner* — Oscar Louie
*Assistant Examiner* — Ali Shayanfar
(74) *Attorney, Agent, or Firm* — Finnegan, Henderson, Farabow, Garrett & Dunner, L.L.P.

(57) ABSTRACT

The first terminal apparatus includes a key information acquiring unit that acquires key information from a connection authentication server, a key information notifying unit that notifies the first user of the key information, and a connection information acquiring unit that acquires connection information from the connection authentication server. The second terminal apparatus includes a key information input unit that receives the key information transmitted to the second user and an information providing unit that provides the key information and the connection information to the connection authentication server. The connection authentication server includes a key information providing unit that provides the key information to the first terminal apparatus, an information acquiring unit that acquires the key information and connection information of the second terminal apparatus from the second terminal apparatus, and a connection information providing unit that provides the connection information to the first terminal apparatus.

11 Claims, 39 Drawing Sheets

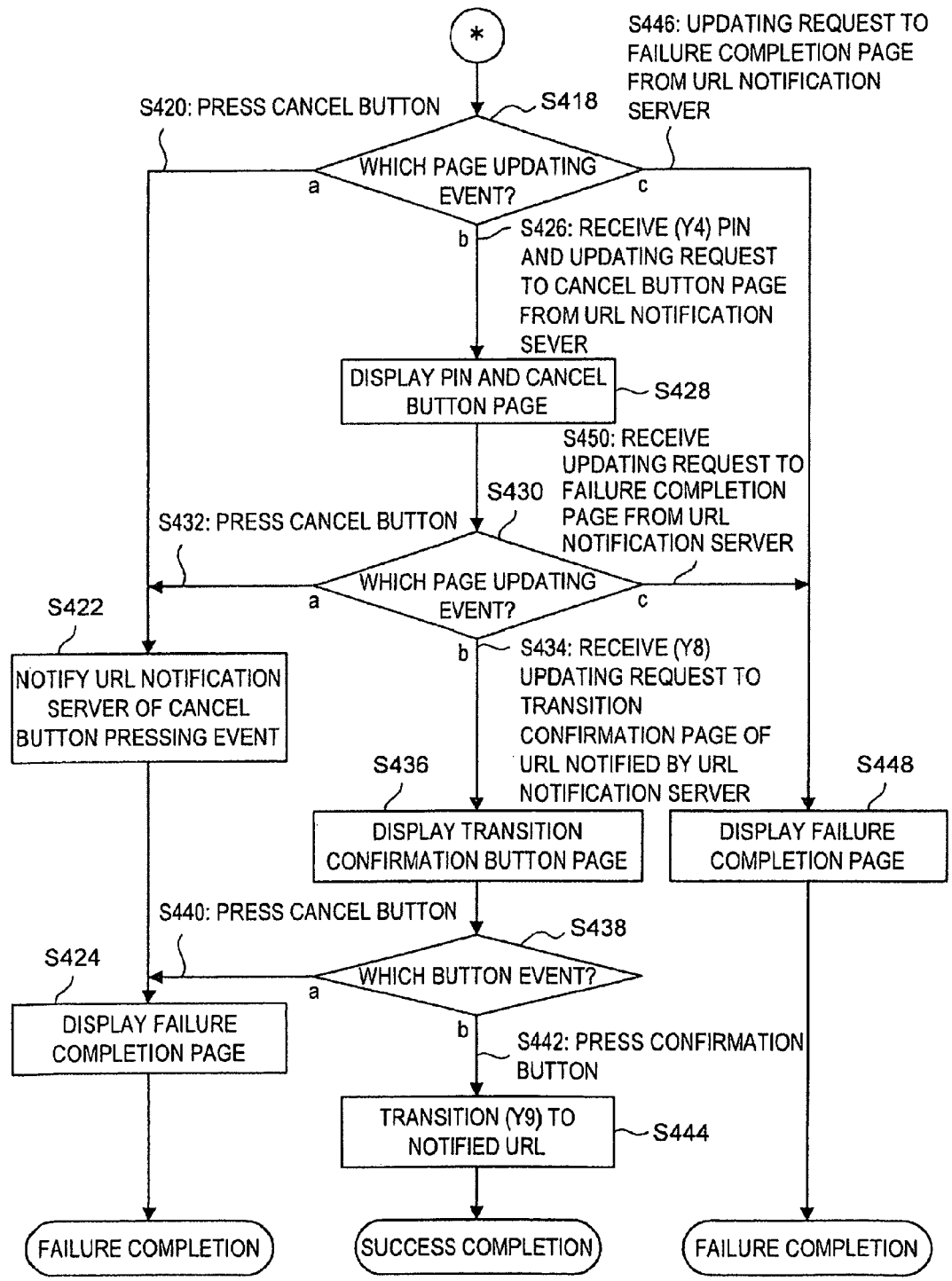

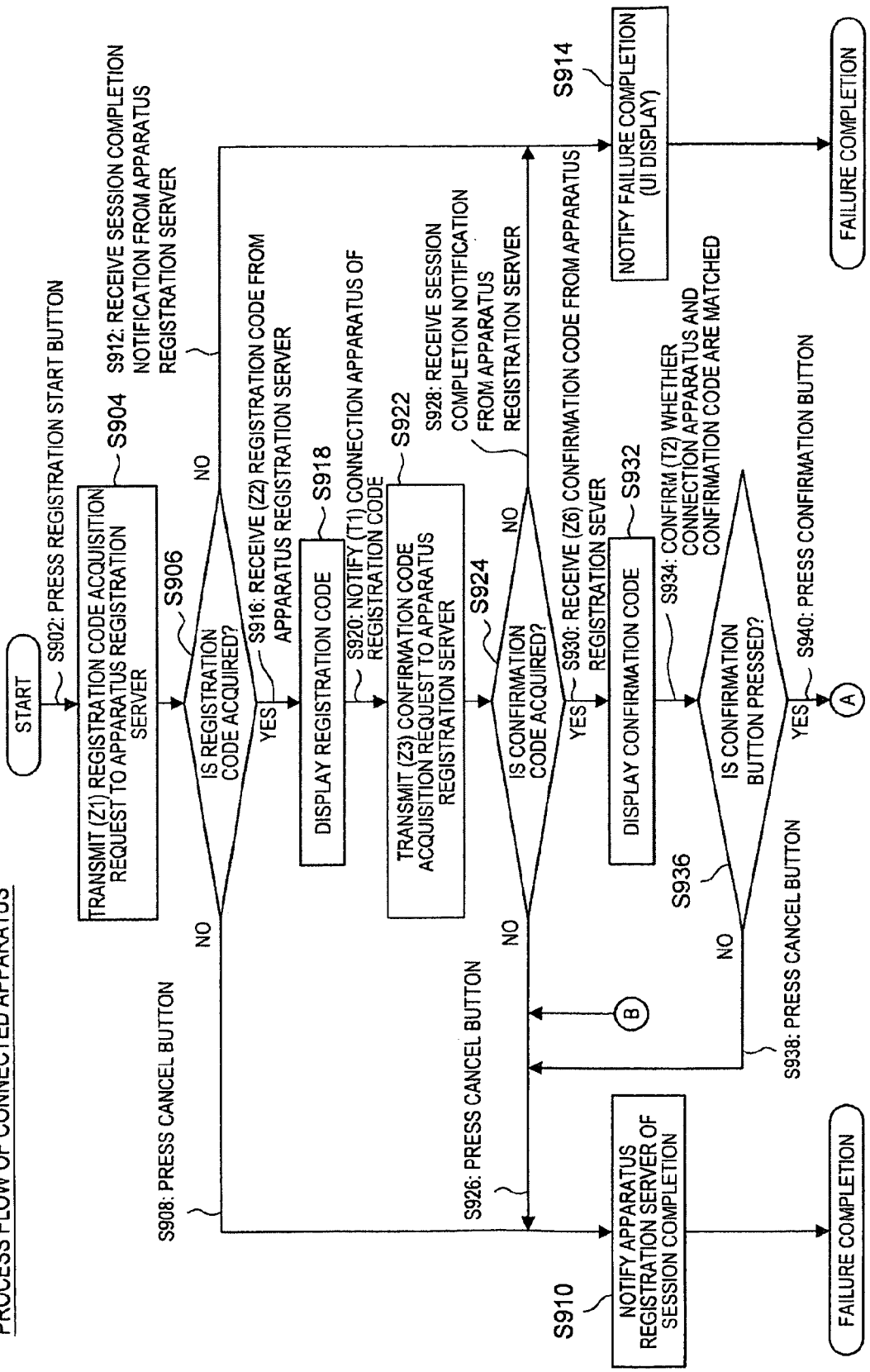

PROCESS FLOW OF CONNECTED APPARATUS (CONTINUATION)

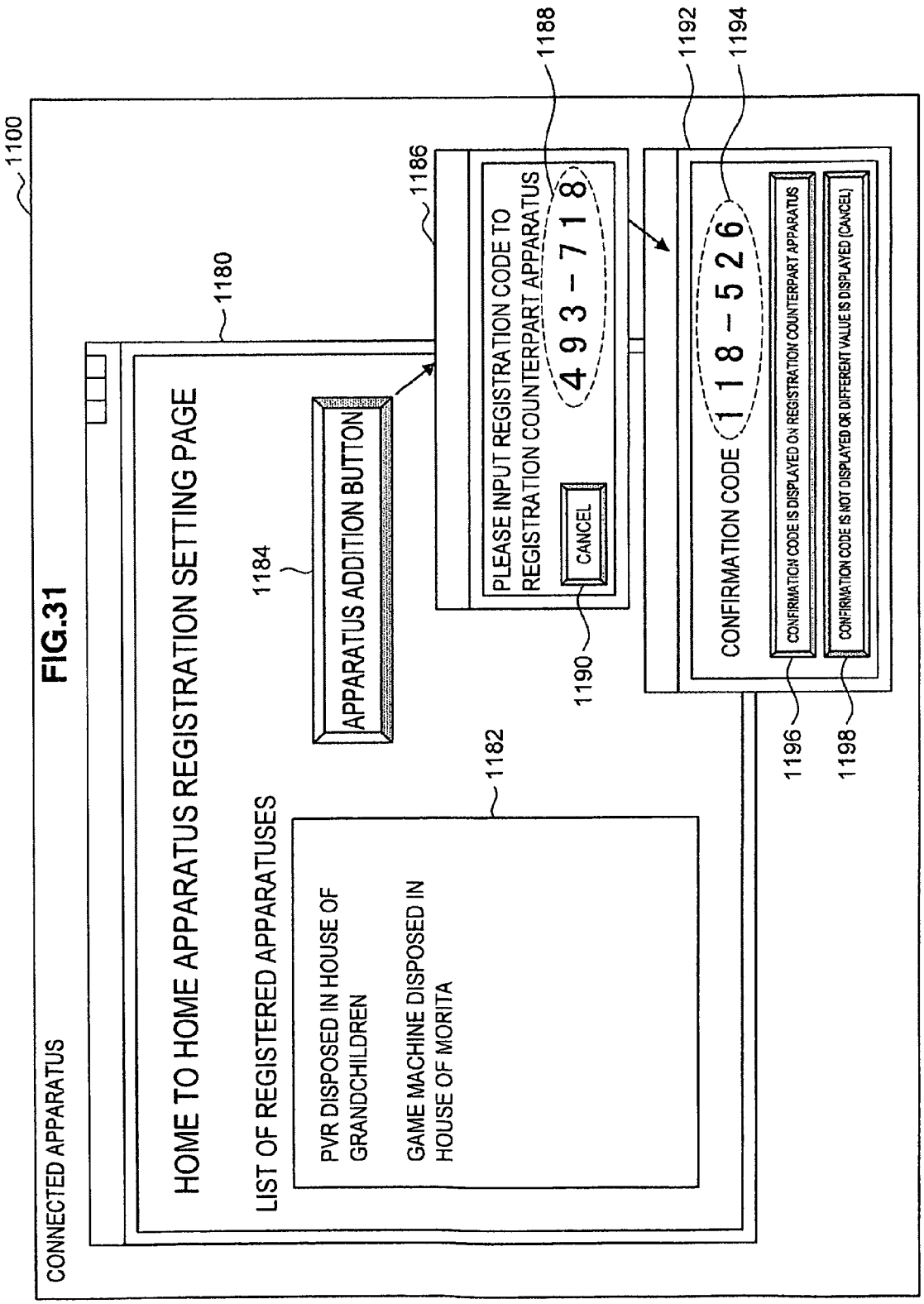

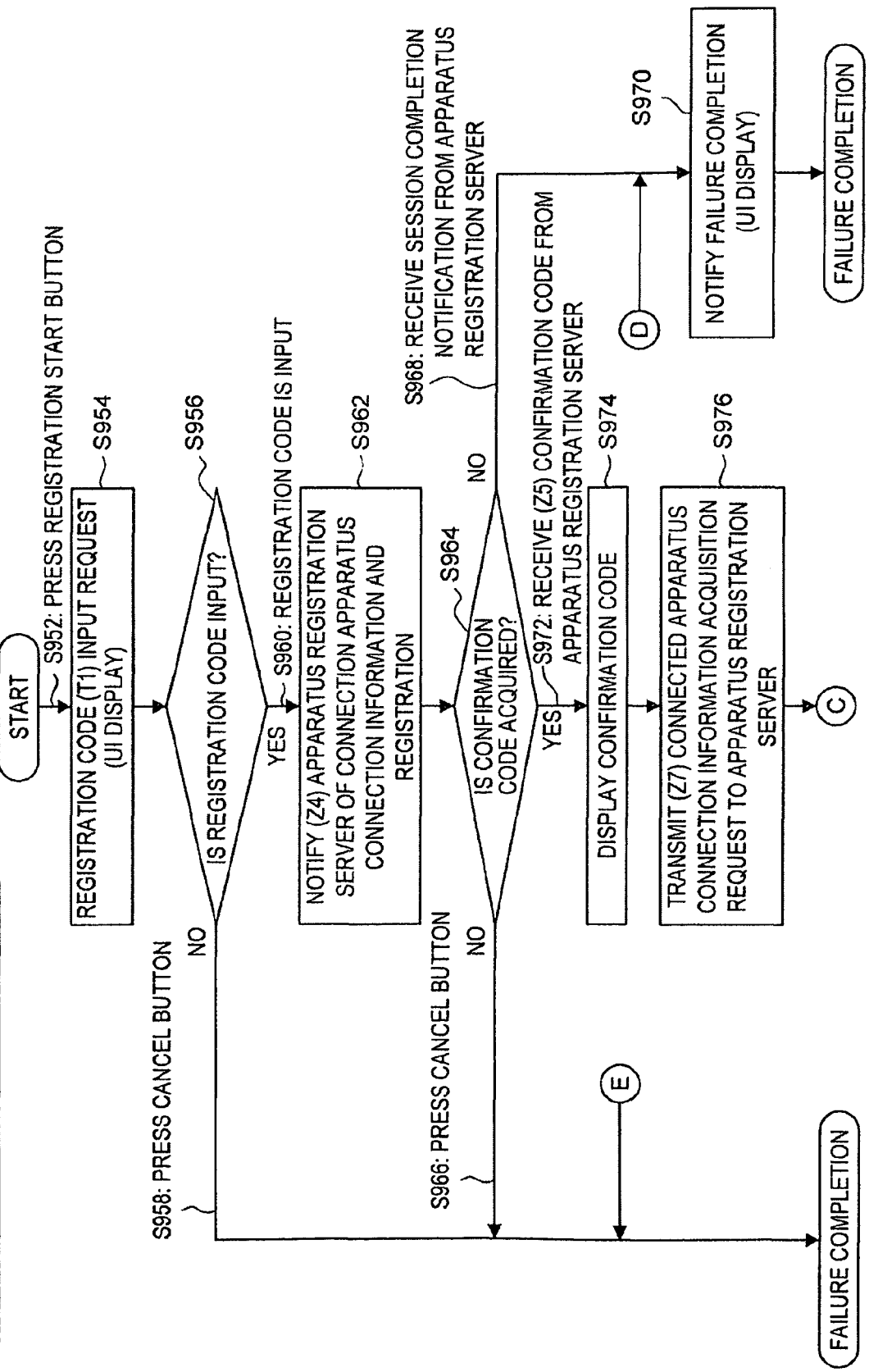

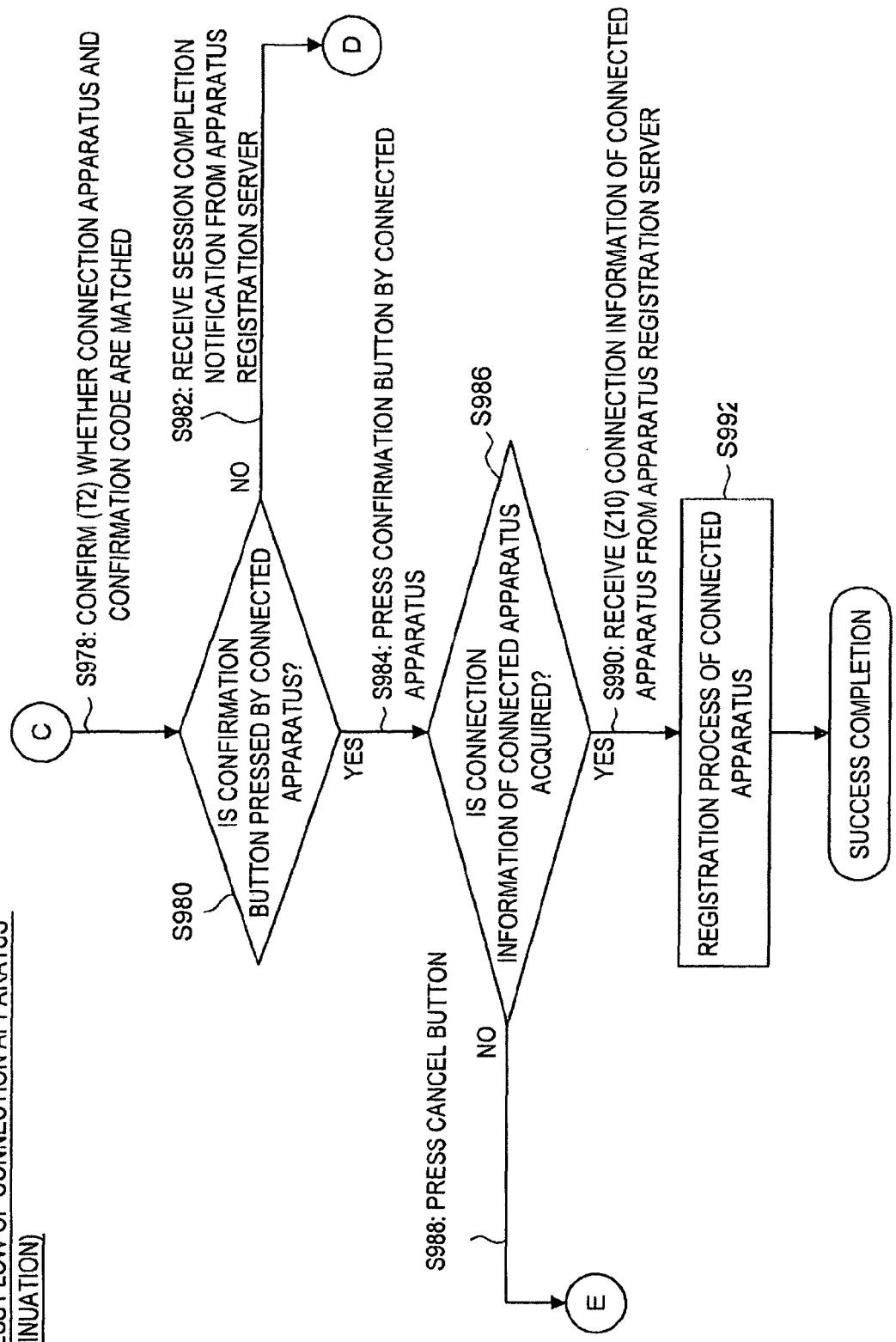

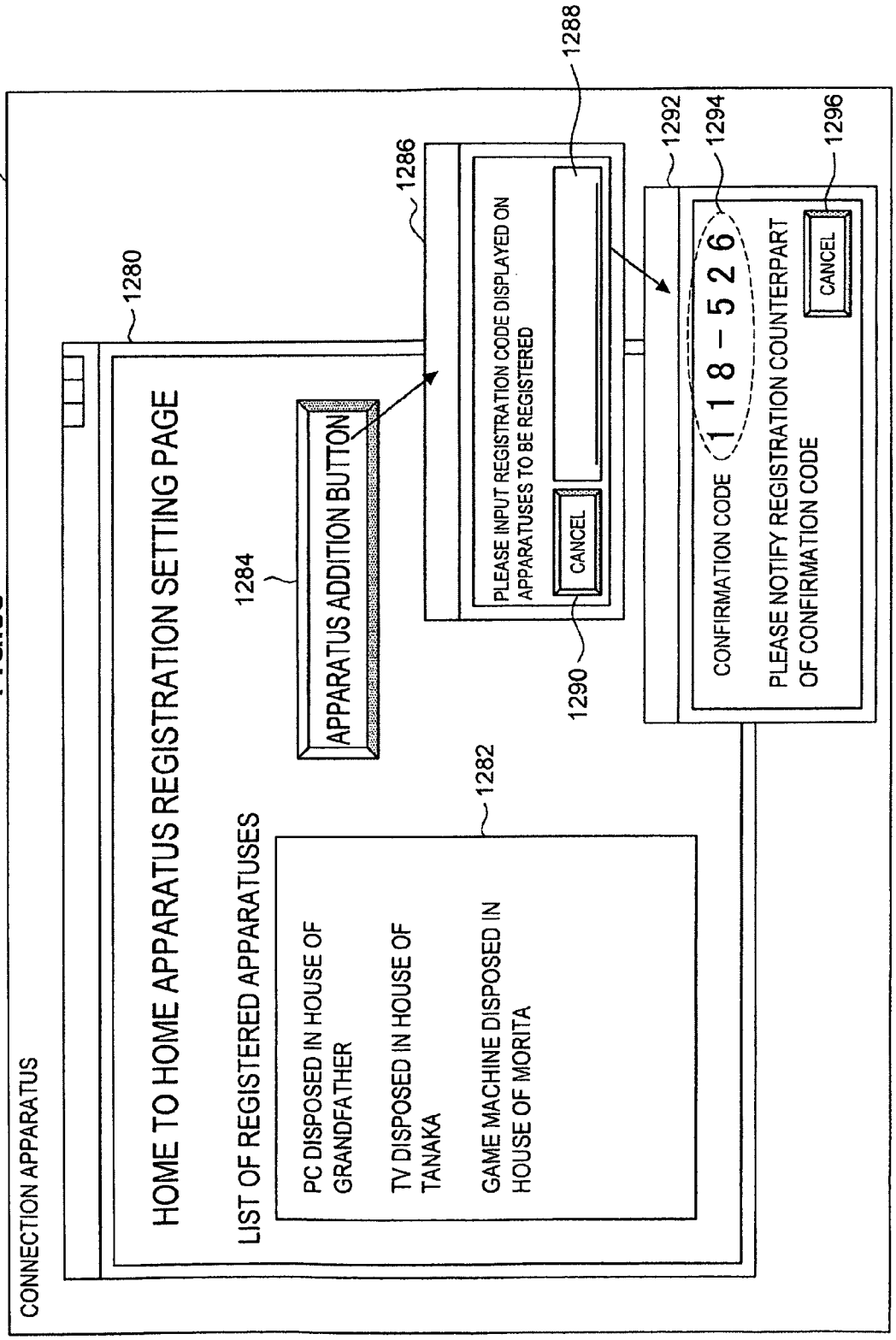

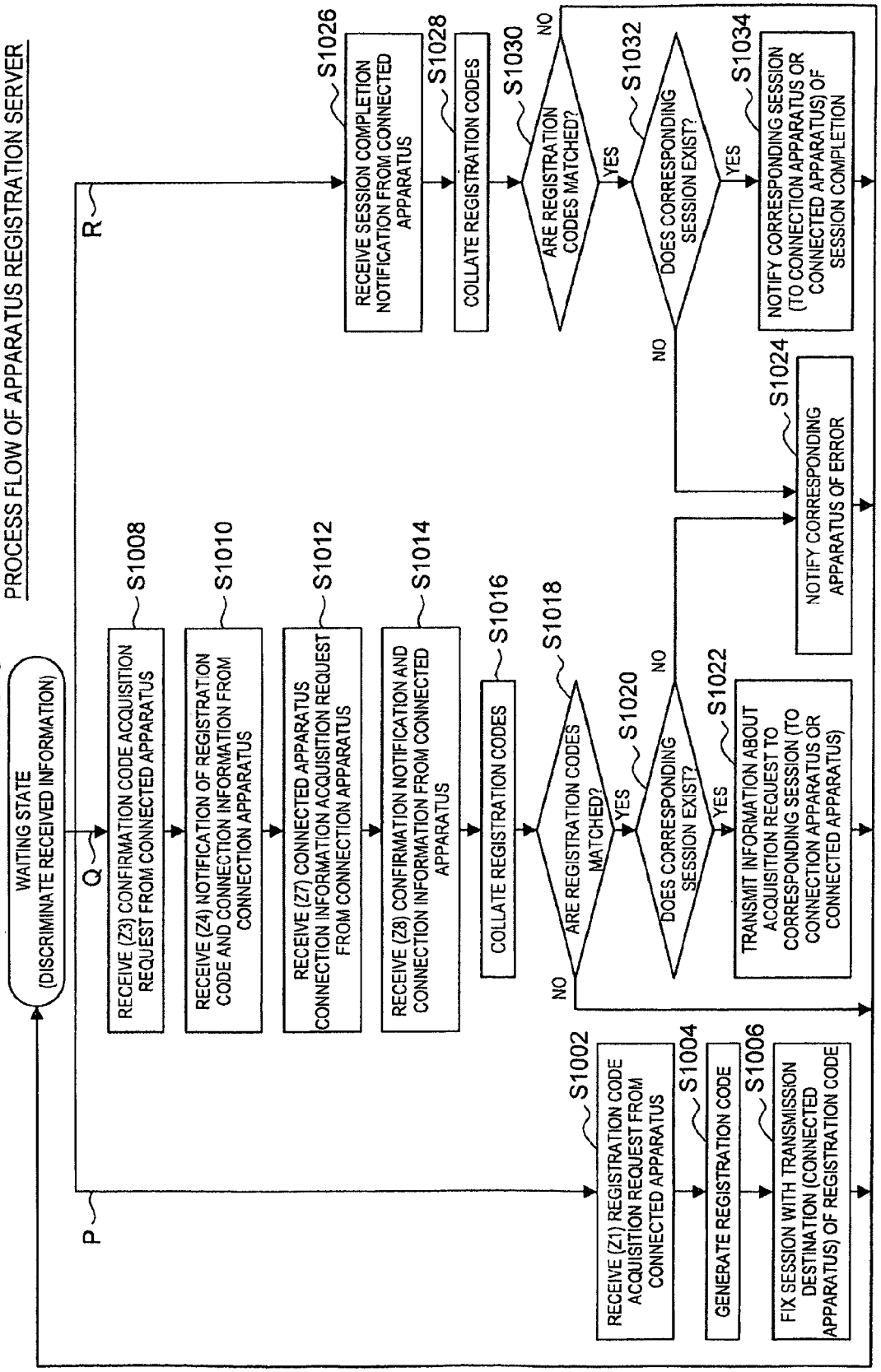
FIG.34 PROCESS FLOW OF APPARATUS REGISTRATION SERVER

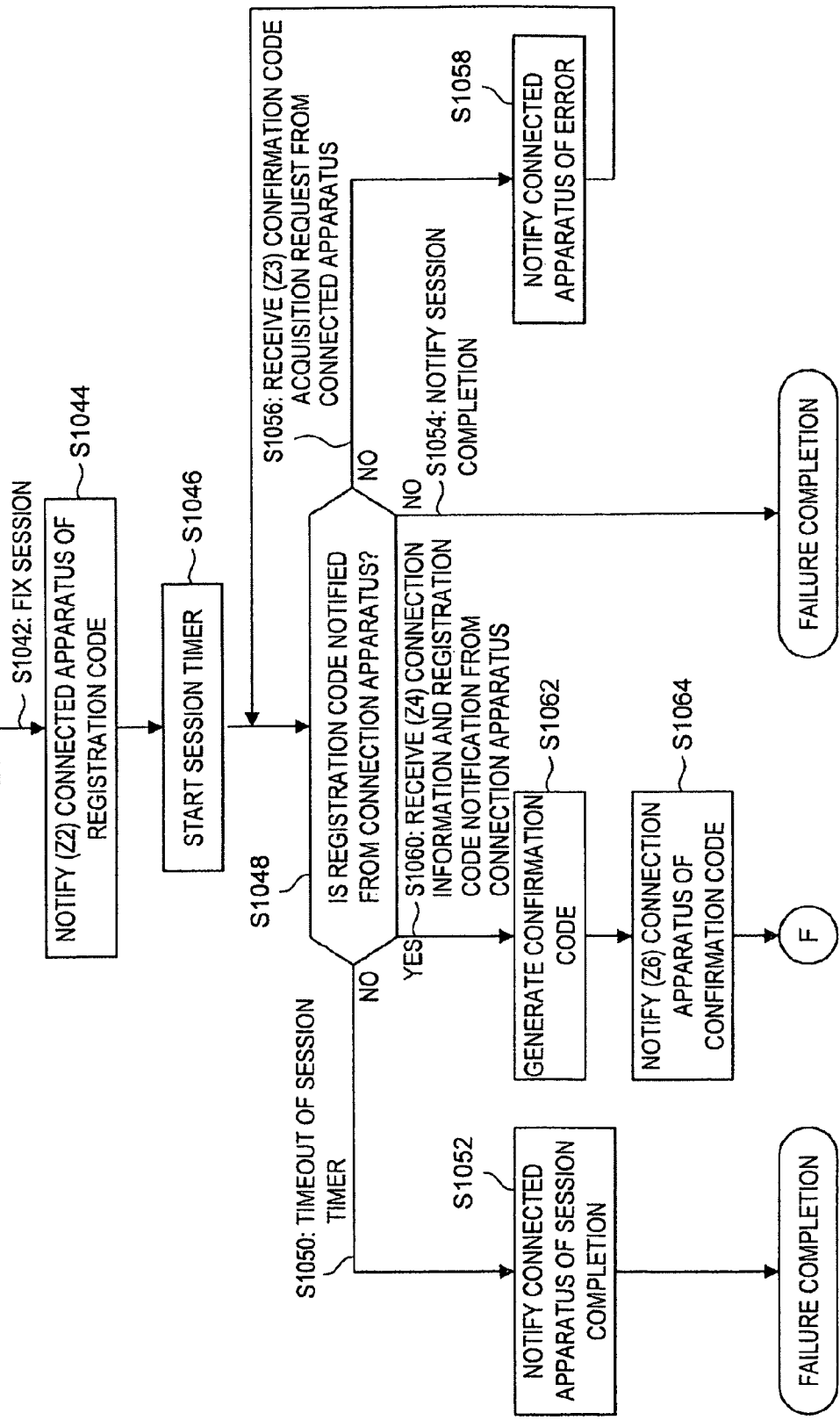

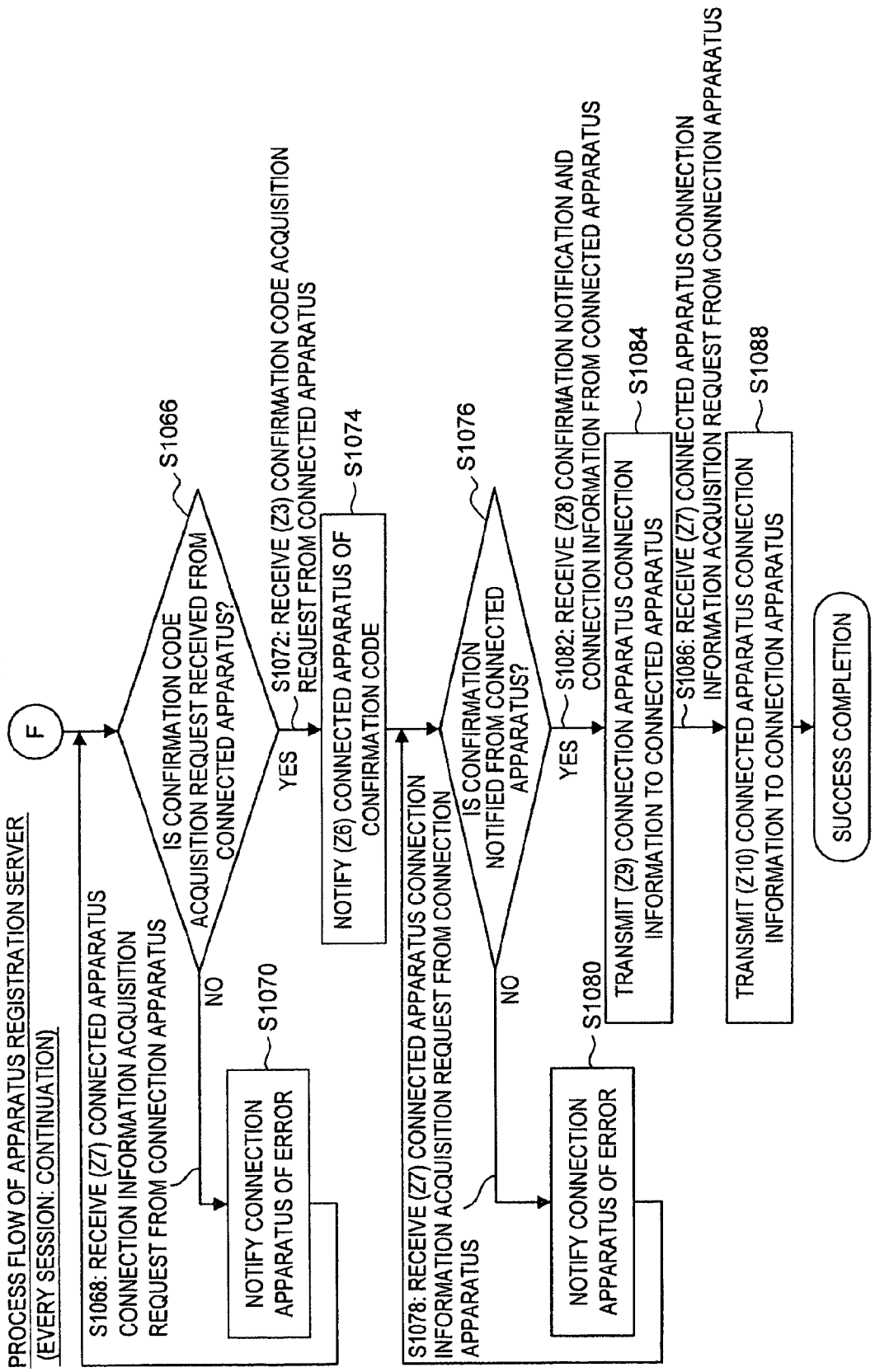

CONNECTION AUTHENTICATION SYSTEM, TERMINAL APPARATUS, CONNECTION AUTHENTICATION SERVER, CONNECTION AUTHENTICATION METHOD, AND PROGRAM

CROSS-REFERENCE TO RELATED APPLICATION

The present invention contains subject matter related to Japanese Patent Application JP 2008-9387 filed in the Japan Patent Office on Jan. 18, 2008, and Japanese Patent Application JP 2007-103293 filed in the Japan Patent Office on Apr. 10, 2007, the entire contents of which being incorporated herein by reference.

BACKGROUND OF THE INVENTION

1. Field of the Invention

The present invention relates to a connection authentication system, a terminal apparatus, a connection authentication server, a connection authentication method, and a program.

2. Description of the Related Art

In recent years, rapid digitization of information has been progressed and information apparatuses that handle digital information have been rapidly developed to general homes, and photos taken by digital cameras or television programs recorded in a form of digital information have been stored and managed in personal computers (hereinafter, simply referred to as PC). However, for example, when video images that are taken by a digital video camera are viewed in a house of a relative, in order to reproduce video images that are stored in a hard disk of a PC disposed in his or her own house by using a TV disposed in the house of the relative, apparatus registration work needs to be performed to connect the corresponding apparatuses.

For example, when each apparatus acquires a domain that constitutes a URL needed to have access to each apparatus from a dynamic domain name system (DDNS) and a registration counterpart apparatus knows an apparatus registration URL generating tool, if each apparatus transmits necessary information, such as a model number, a serial number, and a utilized port (an apparatus registration pass is fixed), to the counterpart apparatus, each apparatus can generate a URL that is used when each apparatus connects the counterpart apparatus to execute a registration process in the counterpart apparatus. Accordingly, a user sends an E-mail or a memo written in paper to the counterpart apparatus so as to transmit the necessary information thereto and inputs information using a URL of the corresponding apparatus, thereby performing apparatus registration work (For example, JP-A No. 2006-171989 and JP-A No. 2005-94252).

However, during the apparatus registration work, a work load of the user may be large and the corresponding work may be complicated for individual users. In addition, it may be difficult to transmit an arbitrary URL, and a predetermined URL generating tool is needed. If the user directly transmits a URL, the number of characters increases, which results in making the work of the user further complicated.

In view of the above issues, a method has been suggested in which an Internet server is disposed, each apparatus typically notifies the Internet server of current positional information, and the Internet server manages a list of buddies for each user account of each apparatus and executes an apparatus registration process using the list of buddies (for example, JP-A No. 2006-262111 and JP-A No. 2006-254137).

In the above method, if the user requests another account to permit the user to add another account to the list of buddies, another account is temporarily registered in the list of buddies, and when a temporarily registered counterpart user is online, the counterpart user executes a registration permission or non-permission process. Based on the process result, the Internet server executes a process that changes the temporary registration to the regular registration or deletes information of the temporary registration.

SUMMARY OF THE INVENTION

However, in the methods that are disclosed in Patent Documents JP-A No. 2006-262111 and JP-A No. 2006-254137 a client and a server may not simultaneously perform apparatus registration work, and a work load of a user is small. However, the Internet server needs to typically hold a variety of information, such as a list of buddies for each user account of each apparatus and temporary registration information, which results in causing a large amount of cost. Further, in the above method, even after the apparatus is registered, when information is exchanged with the apparatuses, the information needs to be exchanged through the Internet server. For this reason, the frequencies of having access to the Internet sever increase, which results in increasing a load of the Internet server. Further, in the above method, since the Internet server holds a large amount of personal information, a large amount of cost is needed to manage personal information.

Accordingly, the present invention addresses the above-identified and other issues associated with conventional methods and apparatuses. There is a need for a connection authentication system that can exchange connection information between apparatuses through an Internet server, a terminal apparatus, a connection authentication server, a connection authentication method, and a program, in which the amount of information held by the Internet server and the frequencies of having access to the Internet server can be reduced and connection information can be exchanged between the apparatuses through simple work.

According to an embodiment of the present invention, there is provided a connection authentication system that includes a first terminal apparatus, a second terminal apparatus that can be connected to the first terminal apparatus through a network, and a connection authentication server that is connected to the first terminal apparatus and the second terminal apparatus.

In the connection authentication system, the first terminal apparatus includes an authentication information acquiring unit that acquires authentication information from the connection authentication server, an authentication information notifying unit that notifies a user of the first terminal apparatus of the authentication information, and a connection information acquiring unit that acquires connection information of the second terminal apparatus from the connection authentication server.

Further, in the connection authentication system, the second terminal apparatus includes an authentication information input unit that allows a user of the second terminal apparatus to input the authentication information transmitted from the user of the first terminal apparatus to the user of the second terminal apparatus, and an information providing unit that provides the authentication information and the connection information of the second terminal apparatus to the connection authentication server.

Furthermore, in the connection authentication system, the connection authentication server includes an authentication information providing unit that provides the authentication information to the first terminal apparatus, an information acquiring unit that acquires the authentication information and the connection information of the second terminal apparatus from the second terminal apparatus, and a connection information providing unit that collates the authentication information provided to the first terminal apparatus and the authentication information acquired from the second terminal apparatus, and provides the connection information of the second terminal apparatus to the first terminal apparatus when the provided authentication information and the acquired authentication information are matched with each other.

In this case, the user of the first terminal apparatus and the user of the second terminal apparatus may be the same user or may be different from each other. For example, the first terminal apparatus and the second terminal apparatus may be a PC and a TV that are possessed by the same user and may be two PCs that are possessed by different users, respectively.

Further, the authentication information is not limited to the specific authentication information. For example, key information, such as a PIN, and arbitrary information that can be used for authentication, such as a file to execute connection authentication, may be used as the authentication information.

The connection authentication server may hold the authentication information provided to the first terminal apparatus for only a predetermined time.

The authentication information may be transmitted from the user of the first terminal apparatus to the user of the second terminal apparatus by using a notifying unit that notifies only a predetermined counterpart of information. The notifying unit may use a telephone circuit.

The connection information may include at least network and address information, such as a URL. As the network and address information, in addition to the URL, for example, the following information may be used.

First, in the case that is based on an Internet protocol (IP), in addition to the URL, different patterns may be used. For example, an IP address and a port may be used. Examples of the URL may include "http://1.2.3.4:5000/exampleUri" and the like, examples of the IP address and the port may include "1.2.3.4:5000" and the like. The IP address may use a domain name or may be a form of "example.sony.co.jp:5000".

Second, address information may exist in an upper layer than the IP. For example, when connection information is exchanged between two terminal apparatuses using an E-mail, an E-mail address corresponds to the connection information. Further, in the case of an instant messenger, a user account corresponds to the connection information.

Third, a case that is not based on an Internet protocol (IP) is also considered. For example, in a network that is connected by the IEEE1394, an address is represented using an address space that is defined by the IEEE1212. When a telephone network is used to constitute a network, a telephone number corresponds to the connection information.

The first terminal apparatus may include an information acquiring device that includes a key information acquiring unit and the connection information acquiring unit, and a key information notifying device that includes a key information notifying unit. In this case, the information acquiring device and the connection authentication server may be configured to be physically integrated with each other.

According to another embodiment of the present invention, there is provided a connection authentication system that includes a first terminal apparatus, a second terminal apparatus that can be connected to the first terminal apparatus through a network, and a connection authentication server that is connected to the first terminal apparatus and the second terminal apparatus.

In the connection authentication system, the first terminal apparatus includes an authentication information acquiring unit that acquires authentication information form the connection information server, an authentication information notifying unit that notifies a user of the first terminal apparatus of the authentication information, a confirmation information acquiring unit that acquires from the connection authentication server confirmation information needed when it is confirmed whether the second terminal apparatus receives the authentication information transmitted from the user of the first terminal apparatus, a confirmation information notifying unit that notifies the user of the first terminal apparatus of the confirmation information, and a connection information acquiring unit that acquires connection information of the second terminal apparatus from the connection authentication server.

Further, the second terminal apparatus includes an authentication information input unit that allows a user of the second terminal apparatus to input the authentication information transmitted from the user of the first terminal apparatus to the user of the second terminal apparatus, an information providing unit that provides the authentication information and the connection information of the second terminal apparatus to the connection authentication server, a confirmation information acquiring unit that acquires the confirmation information form the connection authentication server, and a confirmation information notifying unit that notifies the user of the second terminal apparatus of the confirmation information.

Furthermore, the connection authentication server includes an authentication information providing unit that provides the authentication information to the first terminal apparatus, an information acquiring unit that acquires the authentication information and the connection information of the second terminal apparatus from the second terminal apparatus, a confirmation information providing unit that collates the authentication information provided to the first terminal apparatus and the authentication information acquired from the second terminal apparatus, provides the confirmation information to the second terminal apparatus when the provided, authentication information and the acquired authentication information are matched with each other, and provides the confirmation information to the first terminal apparatus in accordance with an acquisition request of the confirmation information from the first terminal apparatus, and a connection information providing unit that provides the connection information of the second terminal apparatus to the first terminal apparatus.

The first terminal apparatus may further include a confirmation notifying unit that confirms whether the confirmation information provided to the first terminal apparatus and the confirmation information provided to the second terminal apparatus are the same, and notifies the connection authentication server of the confirmation result when the confirmation information provided to the first terminal apparatus and the confirmation information provided to the second terminal apparatus are the same. The connection authentication server may further include a confirmation result receiving unit that receives the notification of the confirmation result from the first terminal apparatus. The connection information providing unit of the connection authentication server may provide the connection information of the second terminal apparatus to the first terminal apparatus only when the confirmation result receiving unit receives the notification of the confirmation result from the first terminal apparatus.

The first terminal apparatus may further include a connection information providing unit that provides the connection information of the first terminal apparatus to the connection authentication server, when the confirmation result is notified to the connection authentication server. The second terminal apparatus may further include a connection information acquiring unit that acquires the connection information of the first terminal apparatus from the connection authentication server. The connection information providing unit of the connection authentication server may provide the connection information of the first terminal apparatus to the second terminal apparatus in accordance with a request from the second terminal apparatus, after the confirmation result receiving unit receives the notification of the confirmation result from the first terminal apparatus.

According to another embodiment of the present invention, there is provided a first terminal apparatus that can be connected to a second terminal apparatus having predetermined connection information through a network and connected to a connection authentication server, which acquires the connection information of the second terminal apparatus and provides the connection information to terminal apparatuses other than the second terminal apparatus.

The first terminal apparatus includes a key information acquiring unit that acquires key information from the connection authentication server, a key information notifying unit that that notifies a first user of the first terminal apparatus of the key information, and a connection information acquiring unit that allows the key information and the connection information of the second terminal apparatus to be provided from the second terminal apparatus to the connection authentication server after the key information is notified from the first user of the first terminal apparatus to a second user of the second terminal apparatus, collates the key information acquired from the second terminal apparatus by the connection authentication server and the key information provided to the first terminal apparatus, and acquires the connection information of the second terminal apparatus from the connection authentication server when the two key information are matched with each other.

The first terminal apparatus may further include a connecting unit that that is connected to the second terminal apparatus based on the connection information of the second terminal apparatus that is acquired by the connection information acquiring unit.

According to another embodiment of the present invention, there is provided a second terminal apparatus that can be connected to a first terminal apparatus having predetermined connection information through a network and connected to a connection authentication server, which acquires connection information and provides the connection information to the first terminal apparatus.

The second terminal apparatus includes a key information input unit that allows key information issued to the first terminal apparatus by the connection authentication server to be input by a second user of the second terminal apparatus, after the key information is transmitted from a first user of the first terminal apparatus to the second user of the second terminal apparatus, and an information providing unit that provides the key information and the connection information of the second terminal apparatus to the connection authentication server.

According to another embodiment of the present invention, there is provided a connection authentication server that is connected to a first terminal apparatus of a first user and connected to a second terminal apparatus of a second user connected to the first terminal apparatus through a network.

The connection authentication server includes a key information providing unit that provides key information to the first terminal apparatus, an information acquiring unit that acquires the key information and the connection information of the second terminal apparatus from the second terminal apparatus, after the key information is transmitted to the second user from the first user to which the key information is notified from the first terminal apparatus, and a connection information providing unit that collates the key information provided to the first terminal apparatus and the key information acquired from the second terminal apparatus, and provides the connection information of the second terminal apparatus to the first terminal apparatus when the provided key information and the acquired key information are matched with each other.

In the connection authentication server, the information providing unit may include a collating unit that collates the key information provided to the first terminal apparatus and the key information acquired from the second terminal apparatus, a session searching unit that detects whether a session corresponding to the collated key information exists or not, when the provided key information and the acquired key information are matched with each other as the collating result by the collating unit, and a connection information transmitting unit that transmits the connection information of the second terminal apparatus to the first terminal apparatus, when the corresponding session is detected as the detecting result by the session searching unit.

According to another embodiment of the present invention, there is provided a connection authentication method that provides connection information from a connection authentication server to a first terminal apparatus after providing the connection information from a second terminal apparatus having predetermined connection information to the connection authentication server connected to the second terminal apparatus and the first terminal apparatus, when the connection information is provided from the second terminal apparatus to the first terminal apparatus connected to the second terminal apparatus through a network.

The connection authentication method includes the steps of: providing key information to the first terminal apparatus by the connection authentication server; notifying a first user of the first terminal apparatus of the key information by the first terminal apparatus; transmitting the key information to a second user of the second terminal apparatus by the first user of the first terminal apparatus; inputting the key information to the second terminal apparatus by the second user; providing the input key information and the connection information to the connection authentication server by the second terminal apparatus; and collating the key information provided to the first terminal apparatus and the key information acquired from the second terminal apparatus, and providing the connection information of the second terminal apparatus to the first terminal apparatus by the connection authentication server when the provided key information and the acquired key information are matched with each other.

The connection authentication server may hold the key information for only a predetermined time, and the connection information may be provided from the connection authentication server to the first terminal apparatus within the predetermined time.

According to another embodiment of the present invention, there is provided a program that allows a computer in a first terminal apparatus, which is connected to a second terminal apparatus having predetermined connection information through a network and connected to a connection authentication server that acquires connection information of the second terminal apparatus and provides the connection information to terminal apparatuses other than the second terminal apparatus, to function as the following units: a key information acquiring unit that acquires key information from the connection authentication server, a key information notifying unit that notifies a first user of the first terminal apparatus of the key information, and a connection information acquiring unit that allows the key information and the connection information of the second terminal apparatus to be provided from the second terminal apparatus to the connection authentication server after the key information is notified from the first user of the first terminal apparatus to a second user of the second terminal apparatus, collates the key information acquired from the second terminal apparatus by the connection authentication server and the key information provided to the first terminal apparatus, and acquires the connection information of the second terminal apparatus from the connection authentication server when the two key information are matched with each other.

According to another embodiment of the present invention, there is provided a program that, allows a computer in a second terminal apparatus, which is connected to a first terminal apparatus having predetermined connection information through a network and connected to a connection authentication server that acquires connection information and provides the connection information to the first terminal apparatus, to function as the following units: a key information input unit that allows key information issued to the first terminal apparatus by the connection authentication server to be input by a second user of the second terminal apparatus, after the key information is transmitted from a first user of the first terminal apparatus to the second user of the second terminal apparatus, and an information providing unit that provides the key information and the connection information of the second terminal apparatus to the connection authentication server.

According to another embodiment of the present invention, there is provided a program that allows a computer in a connection authentication server, which is connected to a first terminal apparatus of a first user and connected to a second terminal apparatus of a second user connected to the first terminal apparatus through a network, to function as the following units: a key information providing unit that provides key information to the first terminal apparatus; an information acquiring unit that acquires the key information and the connection information of the second terminal apparatus from the second terminal apparatus, after the key information is transmitted to the second user from the first user to which the key information is notified from the first terminal apparatus, and a connection information providing unit that collates the key information provided to the first terminal apparatus and the key information acquired from the second terminal apparatus, and provides the connection information of the second terminal apparatus to the first terminal apparatus when the provided key information and the acquired key information are matched with each other.

According to the embodiments of the present invention, in a connection authentication system that can exchange connection information between individual apparatuses through an Internet server, a terminal apparatus, a connection authentication server, a connection authentication method, and a program, the amount of information that is held by the Internet server and the frequency of having access to the Internet server can be reduced, and the connection information can be exchanged between the individual apparatuses by simple work.

BRIEF DESCRIPTION OF THE DRAWINGS

FIG. 19B is a flowchart illustrating a URL notification process flow in the terminal apparatus according to the embodiment;

FIG. 30A is a flowchart illustrating a process flow in the first terminal apparatus according to the embodiment;

FIG. 31 is a diagram illustrating an example of a display screen when an apparatus registration process is executed in the first terminal apparatus according to the embodiment;

FIG. 32A is a flowchart illustrating a process flow in the second terminal apparatus according to the embodiment;

FIG. 32B is a flowchart illustrating a process flow in the second terminal apparatus according to the embodiment;

FIG. 33 is a diagram illustrating an example of a display screen when an apparatus registration process is executed in the second terminal apparatus according to the embodiment;

FIG. 34 is a flowchart illustrating a process flow in a connection authentication server according to the embodiment;

FIG. 35A is a flowchart illustrating a process flow in the connection authentication server according to the embodiment; and FIG. 35B is a flowchart illustrating a process flow in the connection authentication server according to the embodiment.

DETAILED DESCRIPTION OF THE PREFERRED EMBODIMENTS

Figure 1:
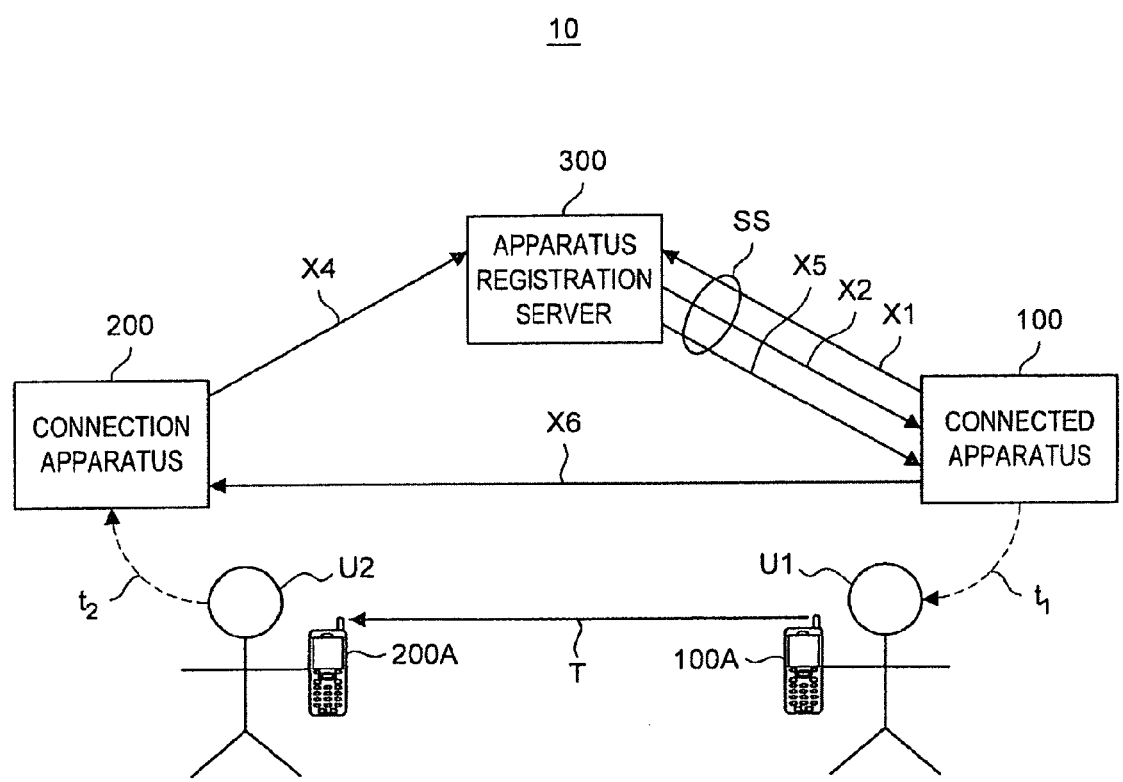
FIG. 1 is a diagram illustrating the entire configuration of a connection authentication system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Connection Authentication System According to a First Embodiment of the Present Invention First, a connection authentication system according to a first embodiment of the present invention will be described. When two terminals having no connection information are connected to each other through the Internet, the connection authentication system according to this embodiment executes an authentication process using key information that is issued to one terminal by an Internet server, and the Internet server acts as an intermediary when the two terminals exchange connection information with each other.

(Entire Configuration of Connection Authentication System and Outline of Connection Authentication Method According to a First Embodiment)

First, based on FIGS. 1 and 2, the entire configuration of a connection authentication system and the outline of a connection authentication method according to this embodiment will be described. FIG. 1 is a diagram illustrating the entire configuration of a connection authentication system according to this embodiment, and FIG. 2 is a diagram illustrating a use case of a connection authentication system according to this embodiment.

In the below description of the connection authentication system, an apparatus registration system 10 is exemplified as an example of the connection authentication system according to this embodiment. Before describing the entire configuration of the apparatus registration system 10, a use case of the apparatus registration system 10 is described with reference to FIG. 2.

Figure 2:
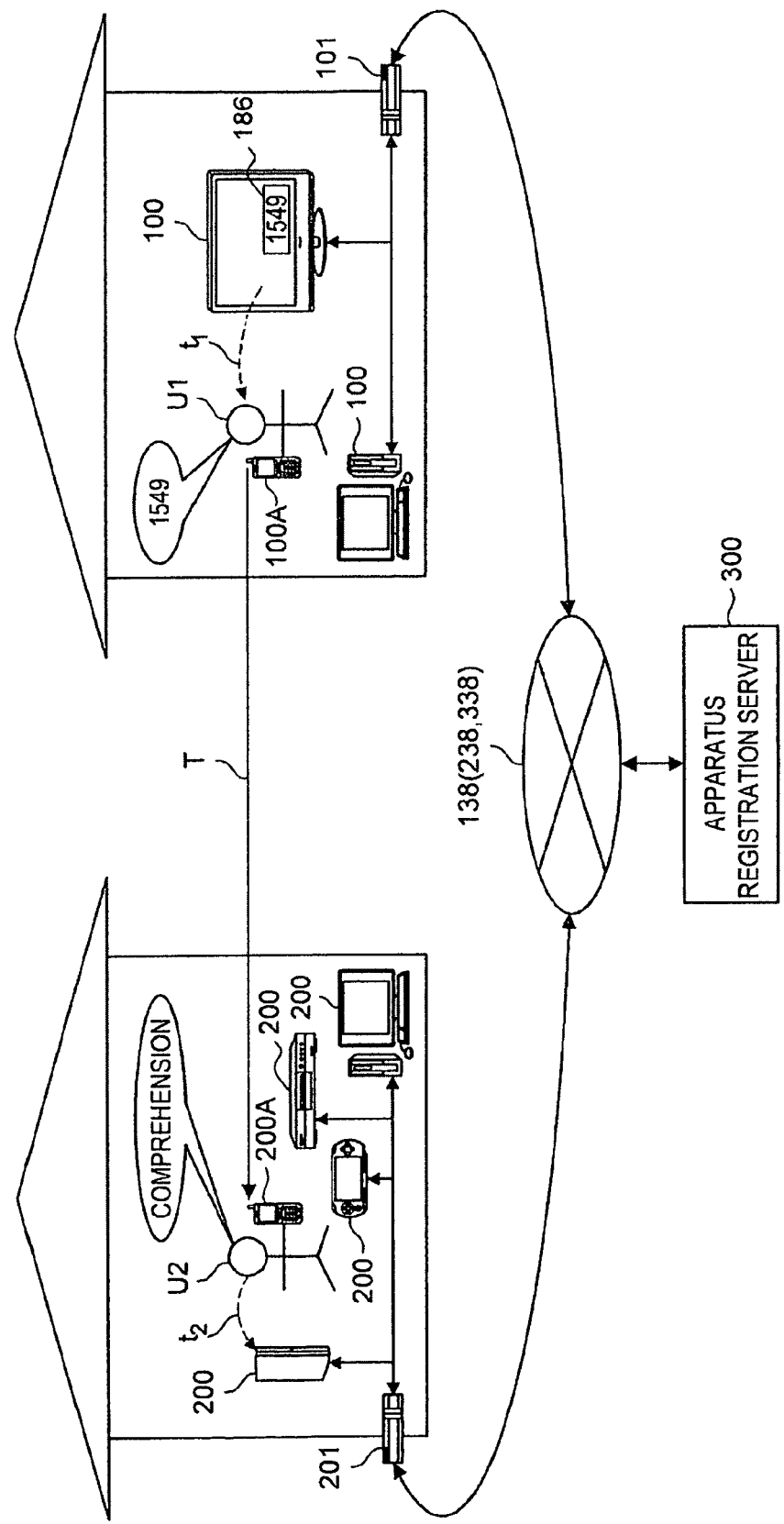
FIG. 2 is a diagram illustrating a use case of the connection authentication system according to the embodiment.

In the use case shown in FIG. 2, in a home of a user U1, apparatuses 100, such as a PC or a TV, are connected to each other through a router 101 to constitute a home network. In a home of a user U2, apparatuses 200, such as a PC, a PVR, a game machine, and a portable game machine, are connected to each other through a router 201 to constitute a home network. Further, the routers 101 and 201 are connected to each other through a communication network 138 (238 and 338), such as the Internet. In addition, an apparatus registration server 300 that acquires connection information of the apparatuses 200 and provides the acquired connection information to the apparatuses 100 is also connected in the communication network 138 (238 and 338).

In this case, in the case where the user U1 desires to use the TV 100 of the user U1 to view contents recorded in the PVR 200 of the user U2, in order to have access to the PVR 200 of the user U2 from the TV 100 of the user U1, the user U1 of the TV 100 needs to input positional information (for example, URL) of the PVR 200. However, if the input of the positional information is performed using a remote controller of the TV, this is very complicated. When the user U1 is, for example, an aged person, even though complication of the input is not considered, it may be difficult to input the positional information of the PVR 200. Further, in order for the user U1 to acquire the positional information, for example, the user U2 needs to operate the PVR 200 to acquire a URL (positional information) and notify the user U1 of the acquired URL using a telephone. As a result, it may be difficult for the user U1 to acquire the positional information.

Accordingly, in the apparatus registration system 10 according to this embodiment, even though the complicated or difficult input of positional information is not performed, apparatus registration and connection are enabled between the apparatus 100 of the user U1 and the apparatus 200 of the user U2 by using a simple input method. As a result, for example, if the user U1 executes a simple apparatus registration process, the user U1 can use the TV 100 to view contents recorded in the PVR 200 of the user U2. Hereinafter, an apparatus registration method will be simply described.

First, if the user U1 presses an apparatus registration start button (not shown) of the TV 100, an issuing request of key information is transmitted from the TV 100 to the apparatus registration server 300. After receiving the key information issuing request, the apparatus registration server 300 issues a PIN as the key information, which is composed of figures of four digits, such as "1549" shown in FIG. 2, with respect to the TV 100. From the viewpoint of security, the PIN can be held for only a predetermined time. In this example, it is assumed that the PIN is held for only five minutes.

After acquiring the PIN from the apparatus registration server 300, the TV 100 displays the acquired PIN on a key information display unit 186 and notifies the user U1 of the acquired PIN ($t_1$). The user U1 uses a notifying unit, such as a telephone 100A, to transmit the notified PIN to the user U2 of the PVR 200 (T). The user U2 inputs the PIN transmitted from the user U1 through a telephone 200A to a PIN input screen (not shown) of the PVR 200 within five minutes (t$_2$). After the PIN is input, the PVR 200 transmits the input PIN and the connection information (for example, URL and the like) of the PVR 200 to the apparatus registration server 300.

When receiving connection information, such as the PIN and the URL, from the PVR 200 within five minutes after the PIN is issued to the TV 100, the apparatus registration server 300 collates the received PIN and the held PIN. As a result, when the received PIN and the held PIN are matched with each other, the apparatus registration server 300 transmits the URL of the PVR 200 to the TV 100. In this way, even though the user U1 does not input a long character string, such as the URL, the TV 100 can acquire the connection information of the PVR 200. As a result, the user U1 can freely view contents that are recorded in the PVR 200 of the user U2.

Next, the entire configuration of the apparatus registration system 10 that can be applied in the above-described use case will be described.

As shown in FIG. 1, the apparatus registration system 10 includes a connected apparatus 100 that is an example of a first terminal apparatus according to this embodiment, a connection apparatus 200 that is an example of a second terminal apparatus according to this embodiment, and an apparatus registration server 300 that is an example of a connection authentication server according to this embodiment.

In the apparatus registration system 10, when each of the connected apparatus 100 and the connection apparatus 200 does not have connection information (for example, a URL, an IP address, a port number, a certificate of each apparatus, and the like) on a counterpart apparatus, an exchange of connection information between the connected apparatus 100 and the connection apparatus 200 (hereinafter, it may be called "apparatus registration") is performed through the apparatus registration server 300. That is, the apparatus registration server 300 is connected to the connected apparatus 100 and the connection apparatus 200 through a network, performs connection authentication between the connected apparatus 100 and the connection apparatus 200, and provides the connection information of the connection apparatus 200 acquired from the connection apparatus 200 to the connected apparatus 100.

Examples of the connected apparatus 100 and the connection apparatus 200 may include a personal computer (PC), a hard disk recorder (PVR: Personal Video Recorder), a television tuner, a set top box (STB), a digital camera, a digital video camera, a mobile phone, a portable information terminal (PDA: Personal Digital Assistants), a game machine, a stereo set, or a digital music device, which is an apparatus that is connected to a home network standardized by a digital living network (DLNA) and used. However, each of the connected apparatus 100 and the connection apparatus 200 is not limited to an electronic apparatus that constitutes a home network according to the standard, such as the DLNA, and may be a refrigerator or a rice cooker. Further, an information processing apparatus, such as a PC, may be exemplified as the apparatus registration server 300.

Further, each of the connected apparatus 100 and the connection apparatus 200 previously has information (for example, a URL, a server certificate, and the like) that is needed to have access to the apparatus registration server 300. Based on the above information, the connected apparatus 100 and the connection apparatus 200 can be connected to the apparatus registration server 300. Hereinafter, the outline of an apparatus registration method in the apparatus registration system 10 will be described.

First, based on the information, such as a URL or a certificate of the apparatus registration server 300, the connected apparatus 100 has access to the apparatus registration server 300 and transmits an issuing request of key information (for example, PIN) (X1). After receiving the issuing request of the key information from the connected apparatus 100, the apparatus registration server 300 generates new key information or issues key information that is not used among key information possessed by the apparatus registration server 300, and transmits the key information to the connected apparatus 100 (X2). At this time, as the issued key information, it is preferable to use key information having a set available period (for example, PIN in which an available restriction time is short as about five minutes), because the amount of information that is held by the apparatus registration server 300 is small and connection safety between the connected apparatus 100 and the connection apparatus 200 is high. Further, the apparatus registration sever 300 establishes a session SS with a transmission destination (connected apparatus 100 in this embodiment) of the key information. When the available period is set to the issued key information, the session SS is maintained for only the corresponding available period.

Next, the key information that is acquired by the connected apparatus 100 in the above-described method is notified to the user U1 of the connected apparatus 100 (t$_1$). The user U1 who receives the key information uses a predetermined notifying unit such as communication between the telephones 100A and 200A to notify the user U2 of the connection apparatus 200 of the key information that is issued by the apparatus registration server 300 (T).

In this case, the predetermined notifying unit that is used to transmit the key information from the user U1 to the user U2 is a notifying unit that safely and securely notifies only a specific counterpart of information. A representative example of the predetermined notifying unit may be a telephone, but the present invention is not limited thereto. As the predetermined notifying unit, in addition to the above example, a method may be used, in which the connection apparatus 200 mounts a modem thereto, the user U2 of the connection apparatus 200 uses the modem to have a direct conversation with the user U1 of the connected apparatus 100 by using a telephone, and the key information is received. In the case of the above method, because of a security issue, it is preferable to prevent the key information from being automatically transmitted through the configuration in which the key information can be received only while the user U2 of the connection apparatus 200 presses a button. If another notifying unit through a user exists, this is one of credit conditions at the time of apparatus registration. Thus, if the notifying unit is configured to have a full automatic type, there is an issue from the viewpoint of security. As still another notifying unit, a method is considered in which a "registration execution file" for executing apparatus registration that is a program created by the connected apparatus 100 is transmitted to the connection apparatus 200 through a unit, such as an E-mail, and the connection apparatus 200 that has received the registration execution file through the E-mail executes the corresponding program.

After the key information is notified, the user U2 inputs the corresponding key information to the connection apparatus 200 (t$_2$). The connection apparatus 200 that has received the key information transmits the corresponding key information and connection information (for example, an IP address, a port number or a URL, and a certificate of the connection apparatus 200) that is needed to have access to the connection apparatus 200 (X4). At this time, when the available period is set to the key information, the input (t$_2$) of the key information by the user U2 and the transmission (X4) of the key information and the connection information of the connection apparatus 200 need to be performed within the corresponding available period. When the input ($t_2$) of the key information or the transmission (X4) of the key information and the connection information of the connection apparatus 200 is not performed within the corresponding available period, the available period is completed and the session SS expires.

After receiving the key information and the connection information of the connection apparatus 200 from the connection apparatus 200, the apparatus registration server 300 collates the key information issued to the connected apparatus 100 and the key information received from the connection apparatus 200. As the collating result, when the two key information are matched with each other, the apparatus registration server 300 determines whether a session SS is established with the connected apparatus 100. When the session SS is established at the time of point of the determination, the apparatus registration server 300 uses the corresponding session SS to transmit the connection information of the connection apparatus 200 to the connected apparatus 100 (X5).

When receiving the connection information of the connection apparatus 200 from the apparatus registration server 300 (X5), the connected apparatus 100 uses the received connection information to have access to the connection apparatus 200, and transmits the connection information (for example, an IP address, a port number or a URL, and a certificate of the connected apparatus 100) of the connected apparatus 100 to the connection apparatus 200 (X6). The connection apparatus 200 executes an apparatus registration process of the connected apparatus 100 after receiving the connection information from the connected apparatus 100.

Further, the connection between the individual apparatuses when the above process is executed in the apparatus registration system 10 can be performed by an SSL that is accompanied with server authentication.

In this way, an apparatus registration process that exchanges connection information of the connected apparatus 100 and the connection apparatus 200 is executed between the connected apparatus 100 and the connection apparatus 200, thereby performing apparatus registration. After the apparatus registration is performed, the connected apparatus 100 and the connection apparatus 200 can directly communicate with each other without using the apparatus registration server 300. The connection between the connected apparatus 100 and the connection apparatus 200 in the communication can be made by the SSL that is accompanied with client authentication and server authentication using the certificates of the counterpart apparatuses that are obtained by the connected apparatus 100 and the connection apparatus 200.

As such, in the apparatus registration system 10, an apparatus registration process between the connected apparatus 100 and the connection apparatus 200 is executed by the apparatus registration server 300 that is connected to the connected apparatus 100 and the connection apparatus 200. However, different from a method using an IM in the related art, an Internet server (apparatus registration server 300 in this embodiment) is used only at the time of first registration. Therefore, a frequency of having access to the Internet server can be reduced. When the available period is set to the key information that is used at the time of apparatus registration, the key information may be held and the session may be maintained during only the corresponding available period. Thus, it is possible to reduce the amount of information that needs to be continuously stored by the Internet server. Accordingly, it is possible to reduce a load of the Internet server in terms of cost.

Further, in the apparatus registration system 10, after the direction communication is enabled between the connected apparatus 100 and the connection apparatus 200 by the apparatus registration through the apparatus registration server 300, it is possible to start an arbitrary application without depending on the apparatus registration.

As such, according to the apparatus registration system 10 according to this embodiment, since the direction communication is enabled between the connected apparatus 100 and the connection apparatus 200 after the apparatus registration, the frequency of having access to the apparatus registration server 300 is reduced to only one time at the time of the apparatus registration, and the load of the apparatus registration server 300 can be alleviated. In addition, since the key information that is issued by the apparatus registration server 300 is held for only the predetermined time, the apparatus registration server 300 may hold connection information of the individual apparatuses (the connected apparatus 100 and the connection apparatus 200) or the key information for only the predetermined time. In addition, the amount of information that is held by the apparatus registration server 300 can be reduced. Further, at the time of the apparatus registration, if the user U2 inputs simple key information (for example, PIN composed of figures of four digits), the user U2 does not need to input information, such as a character string like a URL, a model number, a serial number, and a utilized port. Accordingly, the apparatus registration can be simply performed through the simple work.

The entire configuration of the apparatus registration system 10 as an example of the connection authentication system and the outline of the connection authentication method according to this embodiment have been described. Next, the configuration of each of the apparatuses that constitute the above-described apparatus registration system 10 and a process flow in each of the apparatuses will be described in detail.

(Hardware Configuration of Connected Apparatus 100)

Figure 3:
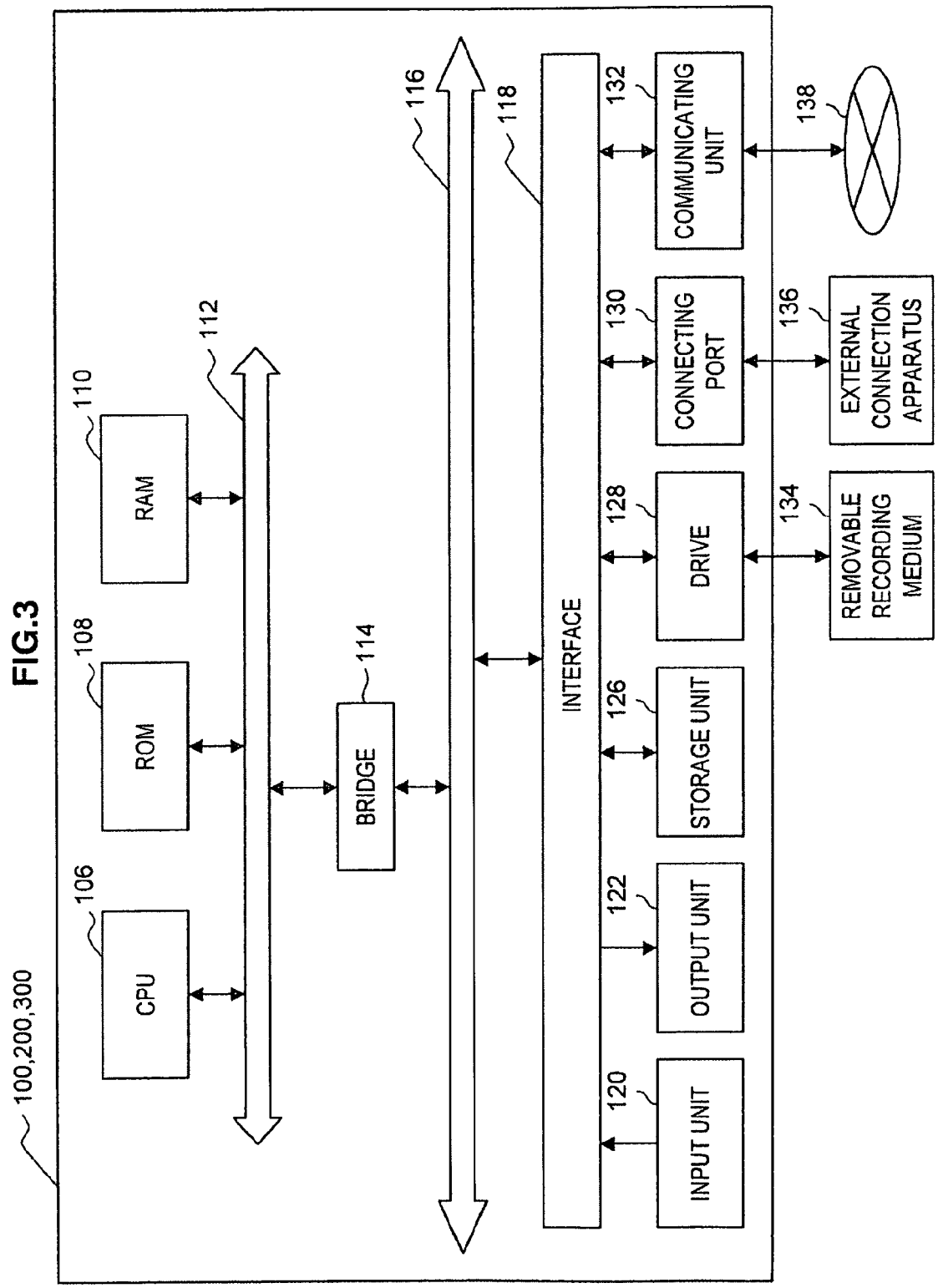
FIG. 3 is a diagram illustrating the hardware configuration of a first terminal apparatus according to the embodiment.

First, based on FIG. 3, the hardware configuration of the connected apparatus 100 will be described. FIG. 3 is a diagram illustrating the hardware configuration of a connected apparatus 100.

As shown in FIG. 3, the connected apparatus 100 mainly includes a central processing unit (CPU) 106, a read only memory (ROM) 108, a random access memory (RAM) 110, a host bus 112, a bridge 114, an external bus 116, an interface 118, an input unit 120, an output unit 122, a storage unit 126, a drive 128, a connecting port 130, and a communicating unit 132.

The CPU 106 functions as, for example, an operation processing device or a control device, and controls the entire operation or the partial operation of the connected apparatus 100 in accordance with various programs that are recorded in the ROM 108, the RAM 110, the storage unit 126 or a removable recording medium 134. The ROM 108 stores data that is used for a program or an operation used by the CPU 106. The RAM 110 temporarily or continuously stores a program that is used in the execution of the CPU 106 or various parameters that appropriately vary at the time of the execution of the CPU 106. These constituent elements are connected to each other by a host bus 112 that is composed of an internal bus, such as a CPU bus, enabling high-speed data transmission, and operate.

The host bus 112 is connected to the external bus 116, such as a peripheral component interconnect/interface bus (PCI bus) through the bridge 114, which has a relatively low data transmission speed.

The input unit 120 is an operating unit, such as a mouse, a keyboard, a touch panel, a button, a switch, and a lever.

Further, the input unit 120 may be a remote control unit (so-called remote controller) using infrared rays or other electric waves, and a mobile phone or a PDA that corresponds to the operation of the connected apparatus 100. Further, the input unit 120 is composed of an input control circuit that generates an input signal based on the information that is input by the user using the operating unit and transmits the corresponding input signal to the CPU 106.

The output unit 122 is a device, such as a display device like a cathode ray tube (CRT), a liquid crystal display (LCD), a plasma display panel (PDP) or an electro-luminescence display (ELD), an audio output device like a speaker or a head phone, a printer, a mobile phone or a facsimile, which can visually or auditorily notify the user of the acquired information.

The storage unit 126 is a device that stores a variety of data. For example, the storage unit 126 is composed of a magnetic storage disk, such as a hard disk drive (HDD), a semiconductor storage device, an optical storage device or a magneto-optical storage device. The storage unit 126 stores a program executed by the CPU 106, key information issued by the apparatus registration server 300, the connection information of the connected apparatus 100, and the connection information of the connection apparatus 200 obtained from the apparatus registration server 300.

The drive 128 reads out information that is recorded in the removable recording medium 134, such as a magnetic disk, an optical disk, a magneto-optical disk or a semiconductor memory or writes information in the removable recording medium 134. The removable recording medium 134 may be composed of DVD media, HD-DVD media, Blu-ray media, CompactFlash (CF) (registered trademark), a memory stick, or an SD memory card (secure digital memory card). In addition, the removable recording medium 134 may be an integrated circuit card (IC card) where a non-contact-type IC chip is mounted or an electronic apparatus.

The connecting port 130 is a port, such as a universal serial bus (USB) port, an IEEE1394 port, a small computer system interface (SCSI), an RS-232C port or an optical audio terminal, which is used for connecting an external connection apparatus 136. For example, the external connection apparatus 136 may be a printer, a portable music player, a digital camera, a digital video camera, or an IC recorder.

The communicating unit 132 is a communication device that is connected to the communication network 138. For example, the communicating unit 132 may a wired or wireless local area network (LAN), a Bluetooth (registered trademark), a communication card for a wireless USB (WUSB), a router for optical communication, a router for an asymmetric digital subscriber line (ADSL), or a modem for various communications. Further, the communication network 138 that is connected to the communicating unit 132 is composed of a wired or wireless network. For example, the communication network 138 may be the Internet, an LAN installed in a home, infrared communication, broadcasting, or satellite communication.

In regards to the hardware configuration, the hardware configuration of the connection apparatus 200 and the apparatus registration server 300 is the same as the hardware configuration of the connected apparatus 100, and thus, the detailed description thereof will be omitted.

(Functional Configuration of Connected Apparatus 100)

Figure 4:
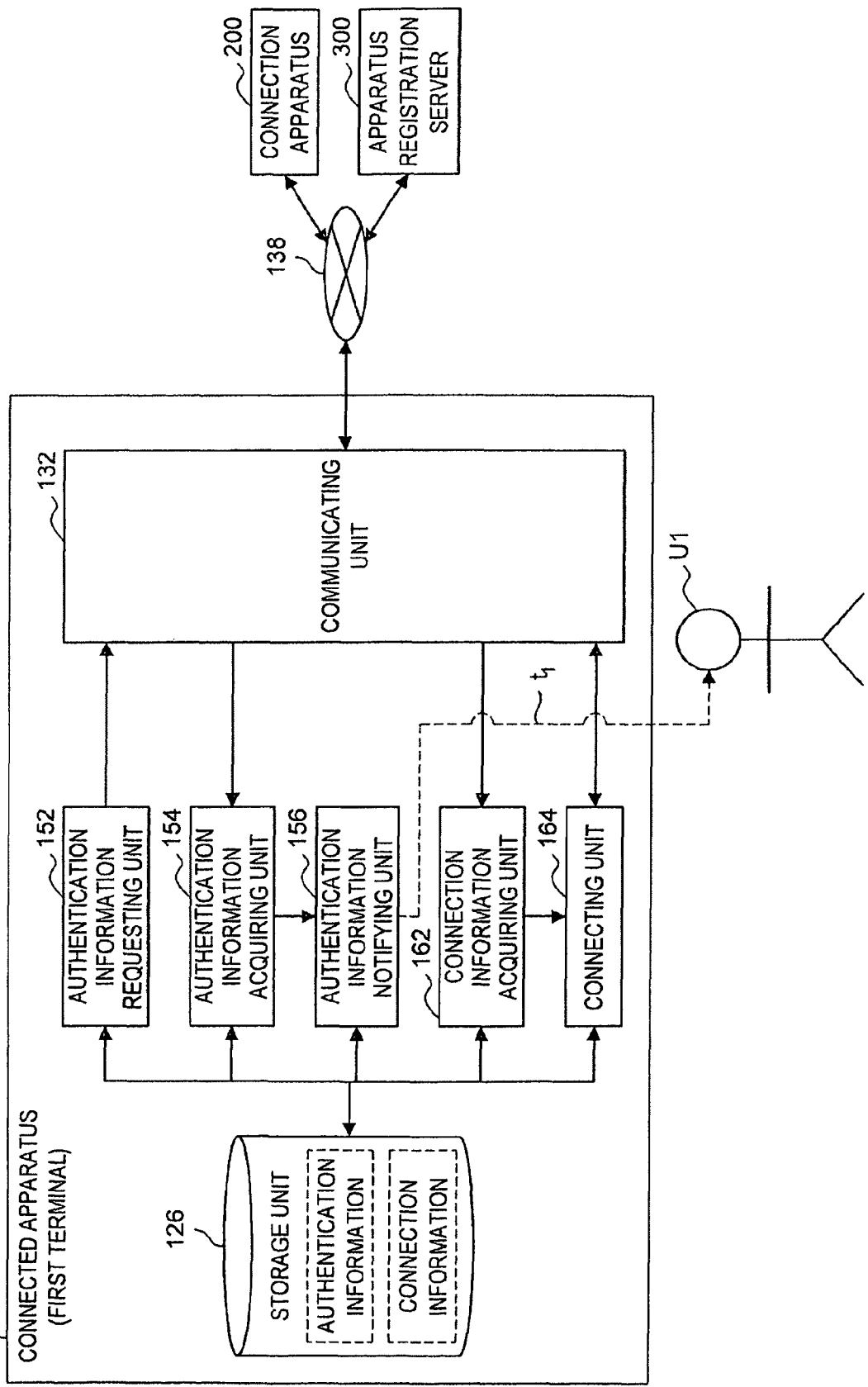
FIG. 4 is a diagram illustrating the functional configuration of the first terminal apparatus according to the embodiment.

Next, based on FIG. 4, the functional configuration of the connected apparatus 100 will be described. FIG. 4 is a diagram illustrating the functional configuration of a connected apparatus 100.

As shown in FIG. 4, the connected apparatus 100 mainly includes a storage unit 126, a key information requesting unit 152, a key information acquiring unit 154, a key information notifying unit 156, a connection information acquiring unit 162, a connecting unit 164, and a communicating unit 132.

The functional configuration of the connected apparatus 100 is realized by the hardware configuration shown in FIG. 3. Further, each functional block shown in FIG. 4 may be realized software-like by the CPU 106 based on a program that can be accessed through the ROM 108, the RAM 110, the storage unit 126, the removable recording medium 134, the external connection apparatus 136, or the communication network 138, and may be configured by dedicated hardware for realizing a function of each block.

The storage unit 126 is a recording unit in which the key information acquired from the apparatus registration server 300 and the connection information of the connection apparatus 200 acquired from the connection apparatus 200 through the apparatus registration server 300 are recorded. Further, the connection information of the connected apparatus 100 itself and information that is needed to have access to the apparatus registration server 300 are stored in the storage unit 126 in advance. Examples of the connection information of the connected apparatus 100 may include an IP address of the connected apparatus 100, a port number or a URL, and a certificate that is used to authenticate the connected apparatus 100. Examples of the information that is needed to have access to the apparatus registration server 300 may include information of a URL or a certificate of the apparatus registration server 300. In this case, the certificate of the apparatus registration server 300 does not need to be information for every apparatus (terminal). A common certificate that is used to have access to the apparatus registration server 300 may be recorded in a plurality of apparatuses in advance (at the time of factory shipment). Further, the detailed contents of the key information or the connection information of the connection apparatus 200 will be described later.

The key information requesting unit 152 extracts information that is stored in the storage unit 126 and needed to have access to the apparatus registration server 300 (for example, a URL and a certificate of the apparatus registration server 300). After the communicating unit 132 has access to the apparatus registration server 300 through the communication network 138, such as the Internet, based on the extracted information, the key information requesting unit 152 transmits an issuing request of the key information (for example, PIN) to the apparatus registration server 300 using the communicating unit 132. Further, the key information acquiring unit 154, which will be described later, may function as the key information requesting unit 152.

The key information acquiring unit 154 acquires the key information, which is issued by the apparatus registration server 300 in accordance with the issuing request of the key information by the key information requesting unit 152, through the communicating unit 132. The key information acquiring unit 154 temporarily records the acquired key information in the storage unit 126 or directly transmits the acquired key information to the key information notifying unit 156.

The key information notifying unit 156 outputs the key information extracted from the storage unit 126 or the key information received from the key information acquiring unit 154 using the output unit 122, and notifies the user U1 of the key information ($t_1$). As a notification method, the following methods may be considered. In one method, a display device is used as the output unit 122, key information is displayed on the display device, and the key information is visually notified to the user U1. In another method, a speaker is used as the output unit 122 and key information is auditorily notified to the user U1 through a voice from a speaker.

After the apparatus registration server 300 acquires the connection information from the connection apparatus 200, the connection information acquiring unit 162 acquires the connection information of the connection apparatus 200 from the apparatus registration server 300 through the communication network 138. The connection information acquiring unit 162 temporarily records the acquired connection information of the connection apparatus 200 in the storage unit 126 or directly transmits the acquired connection information to the connecting unit 164.

The connecting unit 164 is connected to the connection apparatus 200 through the communication network 138, based on the connection information of the connection apparatus 200 extracted from the storage unit 126 or the connection information of the connection apparatus 200 received from the connection information acquiring unit 162. Specifically, the connecting unit 164 has access to the connection apparatus 200 based on the URL of the connection apparatus 200 and executes an authentication process based on the certificate of the connection apparatus 200. When the connection apparatus 200 is authenticated, the connecting unit 164 is connected to the connection apparatus 200 by the SSL. After the connecting unit 164 is connected to the connection apparatus 200, the connecting unit 164 can extract the connection information of the connected apparatus 100 itself from the storage unit 126 and provide the extracted connection information to the connection apparatus 200 through the communicating unit 132. In this way, after the connection information of the connected apparatus 100 and the connection apparatus 200 is exchanged between the connected apparatus 100 and the connection apparatus 200, an apparatus registration process of the connected apparatus 100 is executed by the connection apparatus 200. After the apparatus registration process is executed, the connecting unit 164 of the connected apparatus 100 can directly have access to the connection apparatus 200.

The communicating unit 132 performs transmission of a key information acquisition request with respect to the apparatus registration server 300, reception of the key information from the apparatus registration server 300, reception of the connection information of the connection apparatus 200 from the apparatus registration server 300, and transmission of the connection information of the connected apparatus 100 with respect to the connection apparatus 200.

(Functional Configuration of Connection Apparatus 200)

Figure 5:
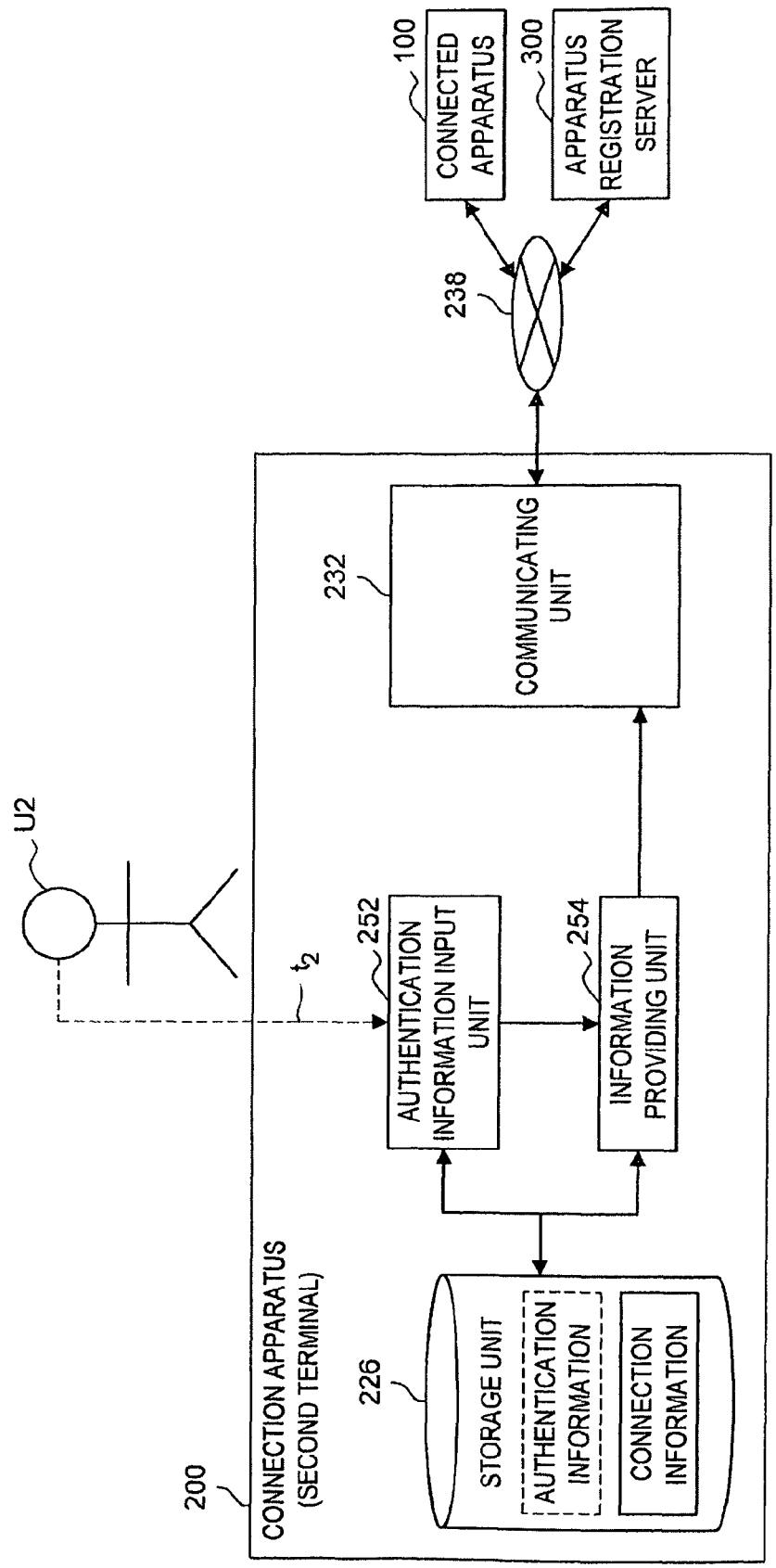
FIG. 5 is a diagram illustrating the functional configuration of a second terminal apparatus according to the embodiment.

Next, based on FIG. 5, the functional configuration of the connection apparatus 200 will be described. FIG. 5 is a diagram illustrating the functional configuration of a connection apparatus 200.

As shown in FIG. 5, the connection apparatus 200 mainly includes a storage unit 226, a key information input unit 252, an information providing unit 254, and a communicating unit 232.

The functional configuration of the connection apparatus 200 may be realized by the hardware configuration shown in FIG. 3, similar to the case of the above-described connected apparatus 100.

The storage unit 226 is a recording unit where the key information input to the key information input unit 252 by the user U2 and the connection information of the connected apparatus 100 acquired from the connected apparatus 100 are recorded. Further, the connection information of the connection apparatus 200 itself and information needed to have access to the apparatus registration server 300 are stored in the storage unit 226 in advance. Examples of the connection information of the connection apparatus 200 may include an IP address of the connection apparatus 200, a port number or a URL, and a certificate used to authenticate the connection apparatus 200. The information that is used to have access to the apparatus registration server 300 is the same as that in the case of the above-described connected apparatus 100. Among them, the certificate of the apparatus registration server 300 may be a certificate that is common to the connected apparatus 100 or a certificate that is different from that of the connected apparatus 100. For example, the certificate may be recorded in the storage unit 226 in advance at the time of factory shipment. The detailed contents of the key information will be described later.

In the key information input unit 252, after the key information is transmitted from the user U1 of the connected apparatus 100 to the user U2 of the connection apparatus 200, the key information is input by the user U2 ($t_2$). As an input method, the following method is considered. That is, a keyboard is used as the input unit 120 when the connection apparatus 200 is a PC, a button or a remote controller is used as the input unit 120 when the connection apparatus 200 is a television, and a button or a touch panel is used as the input unit 120 when the connection apparatus 200 is a game machine, and the user U2 inputs the key information (for example, figures of four digits) notified from the user U1. Further, the key information input unit 252 temporarily records the input key information in the storage unit 226 or directly transmits the input key information to the information providing unit 254.

After the key information and the connection information of the connection apparatus 200 are transmitted to the communicating unit 232, the information providing unit 254 provides the key information and the connection information of the connection apparatus 200 to the apparatus registration server 300 through the communication network 238, such as the Internet. The key information that is provided to the apparatus registration server 300 may be extracted from the storage unit 226 by the information providing unit 254 or may be directly transmitted from the key information input unit 252 to the information providing unit 254. Further, the connection information of the connection apparatus 200 is extracted from the storage unit 226 by the information providing unit 254.

Although not shown in the drawings, similar to the connected apparatus 100, the connection apparatus 200 may include a connection information acquiring unit and a connecting unit. When the certificate of the connection apparatus 200 is transmitted from the connected apparatus 100, the connecting unit of the connection apparatus 200 collates the corresponding certificate and the certificate recorded in the storage unit 226. When the two certificates are matched with each other, the connecting unit connects the connection apparatus 200 to the connected apparatus 100. When the connection apparatus 200 and the connected apparatus 100 are connected, the connection information acquiring unit acquires the connection information of the connected apparatus 100 that is provided by the connected apparatus 100.

The communicating unit 232 performs transmission of the key information and the connection information of the connection apparatus 200 and reception of the connection information of the connected apparatus 100 from the connected apparatus 100.

(Functional Configuration of Apparatus Registration Server 300)

Figure 6:
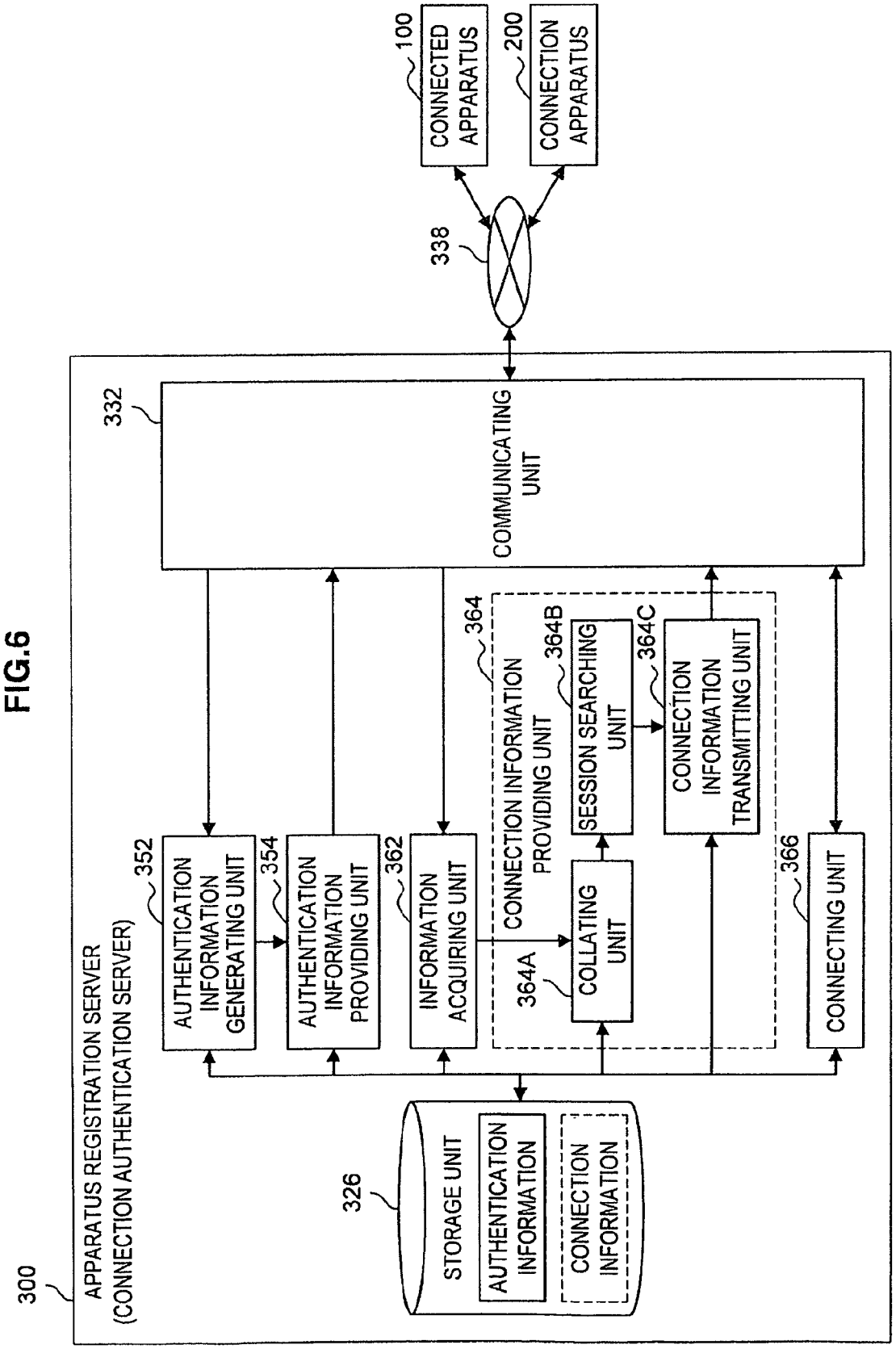
FIG. 6 is a diagram illustrating the functional configuration of a connection authentication server according to the embodiment.

Next, based on FIG. 6, the functional configuration of the apparatus registration server 300 will be described. FIG. 6 is a diagram illustrating the functional configuration of an apparatus registration server 300.

As shown in FIG. 6, the apparatus registration server 300 mainly includes a storage unit 326, a key information generating unit 352, a key information providing unit 354, an information acquiring unit 362, a connection information providing unit 364, a connecting unit 366, and a communicating unit 332.

The functional configuration of the apparatus registration server 300 may be realized by the hardware configuration shown in FIG. 3, similar to the case of the above-described connected apparatus 100.

The storage unit 326 is a recording unit where the connection information of the connection apparatus 200 acquired from the connection apparatus 200 is recorded. Further, the key information that is generated by the key information generating unit 352 and the certificate of the apparatus registration server 300 are stored in the storage unit 326 in advance. The certificate of the apparatus registration server 300 may be generated for every connection counterpart apparatus (for example, the connected apparatus 100 or the connection apparatus 200), but may be common to a plurality of (all) apparatuses.

In this case, as the key information, for example, a PIN (Personal Identification Number) that is composed of figures of several digits may be used. However, the key information is not limited to the specific key information as long as the key information issued to the connected apparatus 100 and the key information held by the connection apparatus 200 that the connected apparatus 100 has access using the issued key information can be collated. For example, it is possible to use alphabets composed of several characters and a combination of figures and alphabets as the key information. As key information that is provided by the key information providing unit 354, which will be described later, it is preferable to use key information (for example, PIN where an available restriction time is short as about five minutes) to which an available period is set, because the amount of information that is held by the apparatus registration server 300 is small and connection safety between the connected apparatus 100 and the connection apparatus 200 is high.

The key information generating unit 352 generates the key information that is to be issued to the connected apparatus 100. The key information generating unit 352 may generate the key information in accordance with a key information acquisition request from the key information requesting unit 152 of the connected apparatus 100 and may be generated at predetermined timing regardless of the key information acquisition request from the key information requesting unit 152. The key information generating unit 352 temporarily records the generated key information in the storage unit 326 or directly transmits the generated key information to the key information providing unit 354.

The key information providing unit 354 provides the key information to the connected apparatus 100 through the communication network 338, such as the Internet. The key information providing unit 354 may directly receive key information that is newly generated by the key information generating unit 352 in accordance with the key information acquisition request of the connected apparatus 100 and provide the received key information. Alternatively, the key information providing unit 354 may selectively extract the key information that is not used with respect to any of the apparatuses among the key information recorded in the storage unit 326 and provide the selected key information.

After the key information providing unit 354 provides the key information to the connected apparatus 100, a signal indicating that the key information is provided is transmitted from the key information providing unit 354 to the connecting unit 366, and the connecting unit 366 establishes a session with the connected apparatus 100 that is a provision destination of the key information. When the available period is set to the key information, the session that is established with the connected apparatus 100 is maintained during only the corresponding available period.

The information acquiring unit 362 acquires from the communicating unit 332 the key information transmitted from the connection apparatus 200 through the communication network 338 and the connection information of the connection apparatus 200. The information acquiring unit 362 temporarily records the acquired key information in the storage unit 326 or directly provides the acquired key information to the connection information providing unit 364 (specifically, a collating unit 364A of the connection information providing unit 364, which will be described later). Further, the information acquiring unit 362 temporarily records the acquired connection information of the connection apparatus 200 in the storage unit 326 or directly transmits the acquired connection information to the connection information providing unit 364 (specifically, a connection information transmitting unit 364C of the connection information providing unit 364, which will be described later).

First, the connection information providing unit 364 collates the key information, which is directly received from the information acquiring unit 362 or extracted from the storage unit 326 and acquired from the connection apparatus 200, and the key information provided from the key information providing unit 354 to the connected apparatus 100. As the collating result, when the two key information are matched with each other, the connection information providing unit 364 provides the connection information of the connection apparatus 200 to the connected apparatus 100 through the communication network 338. The connection information that is provided to the connected apparatus 100 may be extracted from the storage unit 326 or directly received from the information acquiring unit 362.

Further, in order to achieve the above functions, the connection information providing unit 326 mainly includes a collating unit 364A, a session searching unit 364B, and a connection information transmitting unit 364C.

The collating unit 364A collates the key information, which is directly received from the information acquiring unit 362 or extracted from the storage unit 326 and acquired from the connection apparatus 200, and the key information provided from the key information providing unit 354 to the connected apparatus 100. As the collating result, when the two key information are matched with each other, the collating unit 364A transmits a signal indicating that the two key information are matched with each other and the matched key information to the session searching unit 364B. Meanwhile, when the two key information are not matched with each other, the collating unit 364A transmits a signal indicating that the two key information are not matched with each other to the connecting unit 366. The connecting unit 366 that has received the signal completes the session that is established with the connected apparatus 100 and transmits the session completion notification to the connected apparatus 100 and the connection apparatus 200 through the communicating unit 332.

When receiving the signal indicating that the key information acquired from the connection apparatus 200 and the key information provided to the connected apparatus 100 are matched with each other, the session searching unit 364B searches whether the corresponding session exists in the key information received together with the signal. When the corresponding session exists, the session searching unit 364B transmits the signal indicating that the corresponding session exists and information about the corresponding session to the connection information transmitting unit 364C. Meanwhile, when the corresponding session does not exist, the session searching unit 364B transmits the session completion notification to the connection apparatus 200 through the communicating unit 332.

When receiving the signal indicating that the session corresponding to the matched key information exists from the session searching unit 364B, the connection information transmitting unit 364C transmits the connection information of the connection apparatus 200 to an apparatus (connected apparatus 100 in this embodiment) where the corresponding session is established, based on information about the corresponding session received together with the signal. In this case, as described above, the connection information that is provided to the connected apparatus 100 may be extracted from the storage unit 326 or directly received from the information acquiring unit 362. The connection information is transmitted to the connected apparatus 100 through the communicating unit 332.

The communicating unit 332 performs reception of a key information acquisition request from the connected apparatus 100, transmission of key information with respect to the connected apparatus 100, reception of the key information and connection information of the connection apparatus 200 from the connection apparatus 200, and transmission of the connection information of the connection apparatus 200 with respect to the connected apparatus 100.

The functional configuration of each apparatus has been described above. Next, a process flow in each apparatus will be described.

(Process Flow in Connected Apparatus 100)

Figure 7:
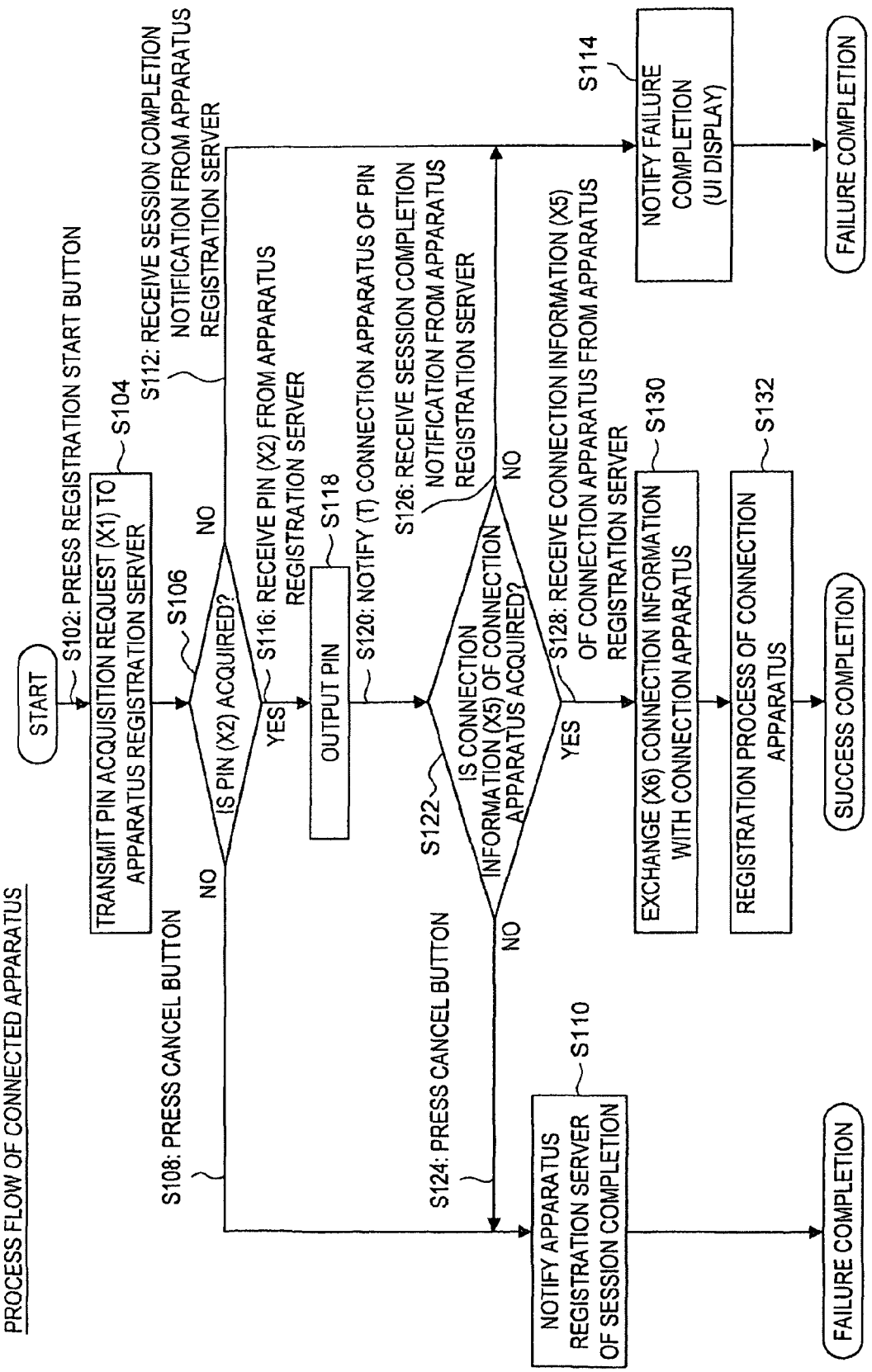
FIG. 7 is a flowchart illustrating a process flow in the first terminal apparatus according to the embodiment.
Figure 8:
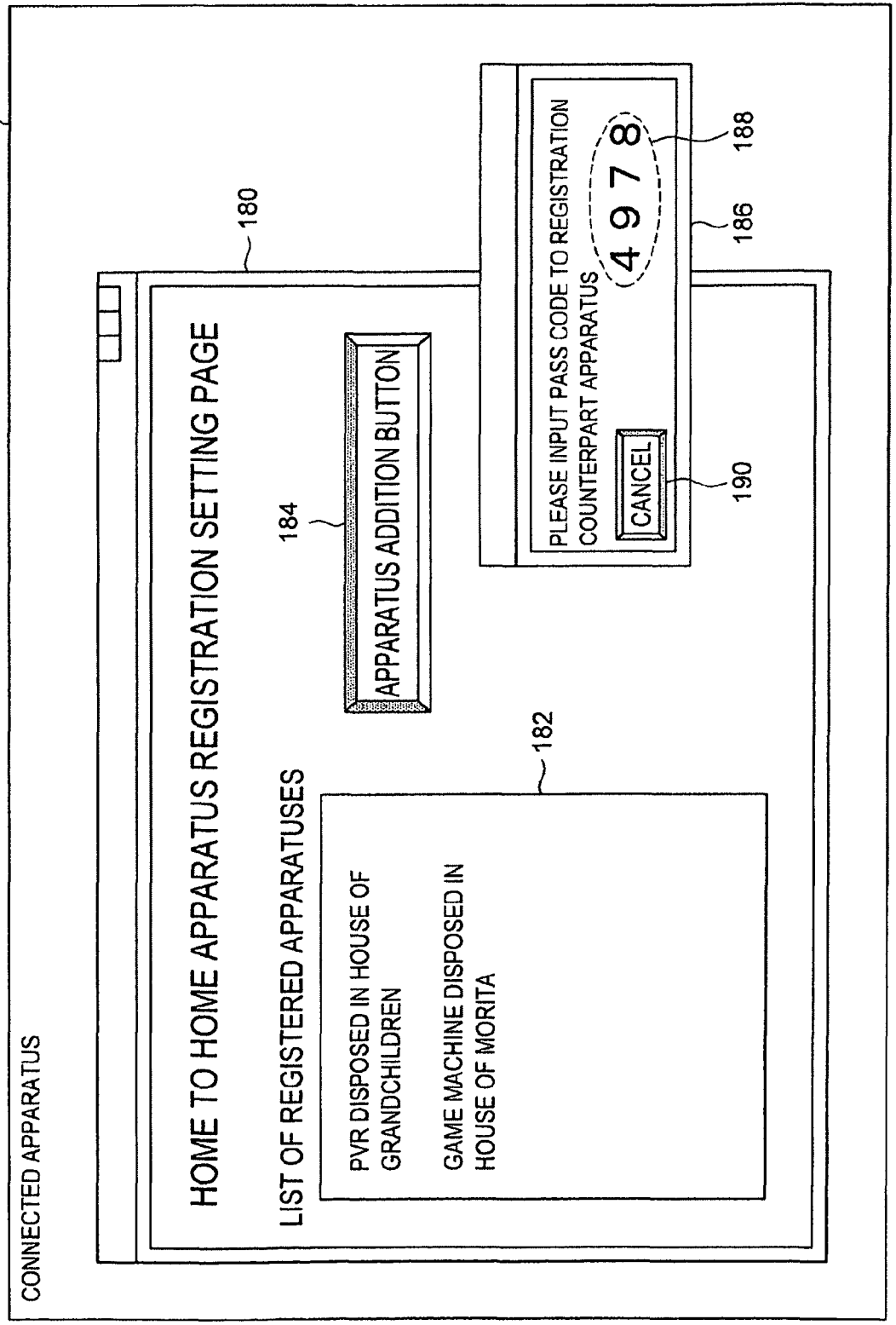
FIG. 8 is a diagram illustrating an example of a display screen when an apparatus registration process is executed in the first terminal apparatus according to the embodiment.

First, based on FIGS. 7 and 8, a process flow in the connected apparatus 100 will be described in detail. FIG. 7 is a flowchart illustrating a process flow in a connected apparatus 100, and FIG. 8 is a diagram illustrating an example of a display screen at the time of an apparatus registration process in a connected apparatus 100. FIG. 7 shows the symbols (X1 to X6 and T) of the individual processes shown in FIG. 1 together. In the below description, the case where a PIN to which an available period is set is used as key information is exemplified.

Before describing the specific process flow in the connected apparatus 100, the description is given to the configuration of a display screen at the time of an apparatus registration process in the connected apparatus 100 shown in FIG. 8.

As shown in FIG. 8, in a display screen 180 at the time of an apparatus registration process in the connected apparatus 100, for example, a list 182 of apparatuses registered in the connected apparatus 100 (hereinafter, referred to as "registered apparatus list"), an apparatus registration start button 184, and a key information display screen 186 are displayed.

In this example, in the registered apparatus list 182, the user U1 is a grandfather and the user U2 is a grandchildren, and a PVR that is disposed in a house of the grandchildren and a game machine that is disposed in a house of Morita are registered in the connected apparatus 100 of the user U1. In this example, in the key information display screen 186, a PIN 188 that is composed of figures of four digits "4978" is displayed as the key information, and a cancel button 190 that is used to cancel an apparatus registration process is displayed. Hereinafter, based on FIG. 7 and with reference to FIG. 8, a specific process flow in the connected apparatus 100 will be described.

As shown in FIG. 7, first, the apparatus registration start button 184 is pressed by the user U1 of the connected apparatus 100 (S102). If the apparatus registration start button 184 is pressed, a signal indicating that the apparatus registration starts is transmitted to the key information requesting unit 152. The key information requesting unit 152 that has received the signal transmits an acquisition request (X1) of the PIN to the apparatus registration server 300 (S104). Next, the CPU 106 of the connected apparatus 100 determines whether the PIN is acquired (X2) from the apparatus registration server 300 (S106). As the determined result, when the PIN is not acquired from the apparatus registration server 300 and the cancel button 190 is pressed by the user U1 of the connected apparatus 100 (S108), the CPU 106 transmits the session completion notification to the apparatus registration server 300 (S110), and completes an apparatus registration process (apparatus registration failure). As the determined result in Step S106, when the PIN is not acquired from the apparatus registration server 300 and the session completion notification is received from the apparatus registration server 300 (S112), the CPU 106 UI-displays a completion notification of the apparatus registration failure on the display screen 180 of the connected apparatus 100 (S114), and completes an apparatus registration process (apparatus registration failure). Meanwhile, as the determined result in Step S106, when the PIN is received (X2) from the apparatus registration server 300 (S116), for example, the PIN 188 is displayed on the key information display screen 186 by the output unit 122 (S118). The output method of the PIN 188 is not limited to the above example, and a method using another output unit may be used. However, the detailed description thereof is omitted because the description is given above.

Next, the user U1 who has visually recognized the PIN 188 displayed on the key information display screen 186 notifies (T) the user U2 of the connection apparatus 200 of the PIN 188, by using a predetermined notifying unit that is capable of notifying only a specific counterpart of information, such as a telephone (S120). The user U2 who has received the PIN 188 inputs the PIN 188 to the connection apparatus 200.

Then, the CPU 106 determines whether the connection information of the connection apparatus 200 is acquired (X5) within an available period of the PIN 188 (for example, within five minutes after the PIN 188 is issued by the apparatus registration server 300) (S122). As the determined result, when the connection information of the connection apparatus 200 is not acquired from the apparatus registration server 300 and the cancel button 190 is pressed by the user U1 (S124), the CPU 106 transmits the session completion notification to the apparatus registration server 300 (S110), and completes an apparatus registration process (apparatus registration failure). As the determined result in Step S122, when the connection information of the connection apparatus 200 is not acquired from the apparatus registration server 300 and the session completion notification is received from the apparatus registration server 300 (S126), the CPU 106 UI-displays the completion notification of the apparatus registration failure on the display screen 180 of the connected apparatus 100 (S114), and completes an apparatus registration process (apparatus registration failure). Meanwhile, as the determined result in Step S122, when the connection information of the connection apparatus 200 is received (X5) from the apparatus registration server 300 (S128), the connected apparatus has access to the connection apparatus 200 based on the received connection information. When authentication is made by a certificate, the connected apparatus 100 is connected to the connection apparatus 200. After the session is established between the connected apparatus 100 and the connection apparatus 200, the connection information of the connected apparatus 100 is transmitted (X6) to the connection apparatus 200, and connection information is exchanged between the connected apparatus 100 and the connection apparatus 200 (S130). After the connection information is exchanged between the connected apparatus 100 and the connection apparatus 200, a registration process of the connection apparatus 200 is executed (S132), and an apparatus registration process of the connection apparatus 200 is completed (apparatus registration success). As such, if the apparatus registration is performed, the connection apparatus 200 is added to the registered apparatus list 182 of the display screen 180.

(Process Flow in Connection Apparatus 200)

Figure 9:
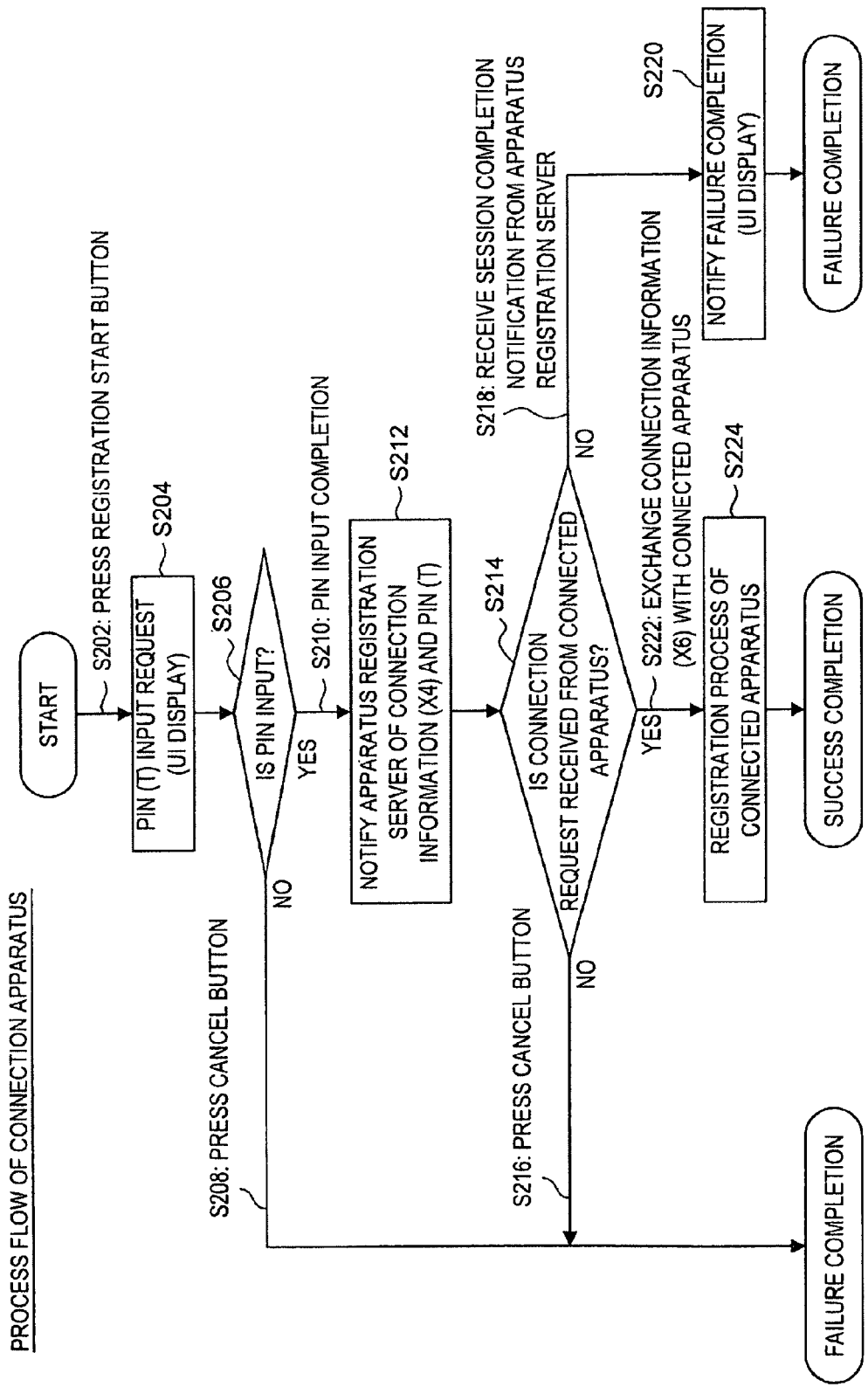
FIG. 9 is a flowchart illustrating a process flow in the second terminal apparatus according to the embodiment.
Figure 10:
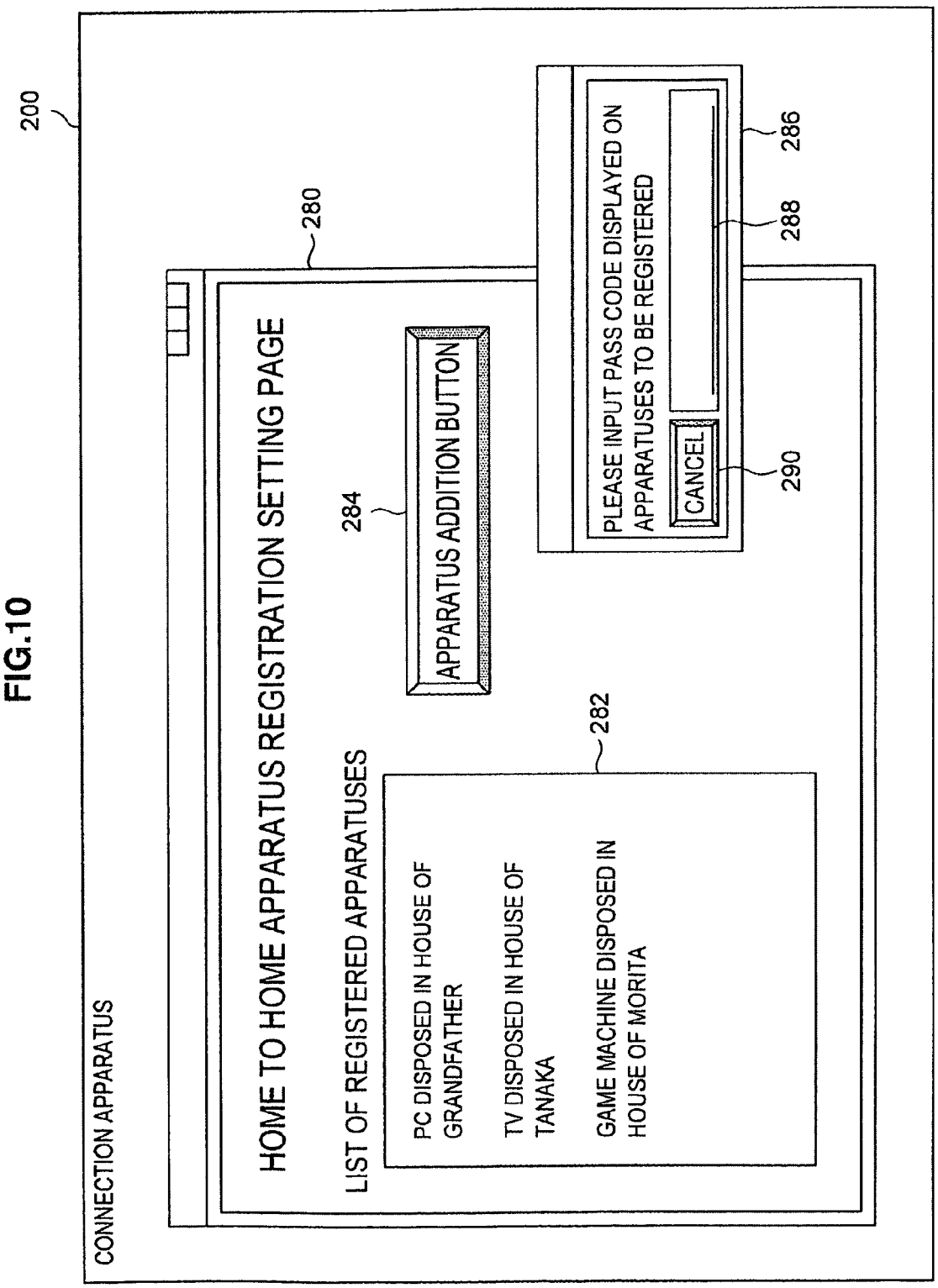
FIG. 10 is a diagram illustrating an example of a display screen when an apparatus registration process is executed in the second terminal apparatus according to the embodiment.

Next, based on FIGS. 9 and 10, a process flow in the connection apparatus 200 will be described in detail. FIG. 9 is a flowchart illustrating a process flow in a connection apparatus 200, and FIG. 10 is a diagram illustrating an example of a display screen at the time of an apparatus registration process in a connection apparatus 200. FIG. 9 shows the symbols (X1 to X6 and T) of the individual processes shown in FIG. 1 together. The case where a PIN to which an available period is set is used as key information is exemplified, similar to the case of the above-described connected apparatus 100.

Before describing the specific process flow in the connection apparatus 200, the description is given to the configuration of a display screen at the time of an apparatus registration process in the connection apparatus 200 shown in FIG. 10.

As shown in FIG. 10, in a display screen 280 at the time of an apparatus registration process in the connection apparatus 200, for example, a list 282 of apparatuses registered in the connection apparatus 200 (hereinafter, referred to as "registered apparatus list"), an apparatus registration start button 284, and a key information input screen 286 are displayed.

In this example, in the registered apparatus list 282, the user U1 is a grandfather and the user U2 is a grandchildren, and a PC that is disposed in a house of the grandfather, a TV that is disposed in a house of Tanaka, and a game machine that is disposed in a house of Morita are all registered in the connection apparatus 200 of the user U2. In this example, in the key information input screen 286, when a PIN 188 that is composed of figures of four digits "4978" as the key information is notified to the user U2 from the user U1, a PIN input column 288 is displayed to allow the user U2 to input the corresponding PIN 188, and a cancel button 290 that is used to cancel an apparatus registration process is displayed. Hereinafter, based on FIG. 9 and with reference to FIG. 10, a specific process flow in the connection apparatus 200 will be described.

As shown in FIG. 9, first, after the PIN 188 is notified to the user U2 of the connection apparatus 200 from the user U1 of the connected apparatus 100, the apparatus registration start button 284 is pressed by the user U2 (S202). If the apparatus registration start button 284 is pressed, a signal indicating that the apparatus registration starts is transmitted to the key information input unit 252. The key information input unit 252 that has received the signal requests the user U2 to input the PIN 188 notified (T) to the user U2 from the user U1 (S204). The PIN input request is made when the output unit 222 of the connection apparatus 200 that has received the corresponding request signal from the key information input unit 252 performs UI display ("please input pass codes displayed on apparatuses to be registered" shown in FIG. 8) on the key information input screen 286. Next, the CPU 206 of the connection apparatus 200 determines whether the user U2 inputs the PIN 188 to the PIN input column 288 as the result of the PIN input request (S206). As the determined result, when the PIN 188 is not input and the cancel button 290 is pressed by the user U2 (S208), the connection apparatus 200 completes an apparatus registration process of the connected apparatus 100 (apparatus registration failure). In this example, since the PIN 188 is information where an available period is set, when the PIN 188 is not input by the user U2 within the available period, the apparatus registration of the connected apparatus 100 is completed as a failure. Meanwhile, as the determined result in Step S206, when the PIN 188 is input by the user U2 (S210), the information providing unit 254 of the connection apparatus 200 notifies the apparatus registration server 300 of the connection information (X4) of the connection apparatus 200 and the PIN (T) (S212).

Then, the CPU 206 determines whether the connection request is received from the connected apparatus 100 that has acquired the connection information of the connection apparatus 200 (S214). As the determined result, the cancel button 290 of the apparatus registration is pressed by the user U2 before the connection request is received from the connected apparatus 100 (S216), the connection apparatus 200 completes an apparatus registration process of the connected apparatus 100 (apparatus registration failure). As the determined result in Step S214, when the connection request is not received from the connected apparatus 100 and the session completion notification is received from the apparatus registration server 300 (S218), the CPU 206 UI-displays the completion notification of the apparatus registration failure on the display screen 280 of the connection apparatus 200 (S220), and completes an apparatus registration process (apparatus registration failure). Meanwhile, as the determined result in Step S214, when the connection request is received from the connected apparatus 100, the CPU 206 executes an authentication process based on the certificate of the connection apparatus 200 that is provided by the connected apparatus 100. When the authentication is made, the connection apparatus 200 is connected to the connected apparatus 100. After the session is established between the connection apparatus 200 and the connected apparatus 100, the connection information of the connected apparatus 100 is received from the connected apparatus 100 (X6), and the connection information is exchanged between the connected apparatus 100 and the connection apparatus 200 (S222). After the connection information is exchanged between the connected apparatus 100 and the connection apparatus 200, the CPU 206 executes a registration process of the connected apparatus 100 (S132), and completes an apparatus registration process of the connected apparatus 100 (apparatus registration success). As such, if the apparatus registration is performed, the connected apparatus 100 is added to the registered apparatus list 282 of the display screen 280.

(Process Flow in Apparatus Registration Server 300)

Figure 11:
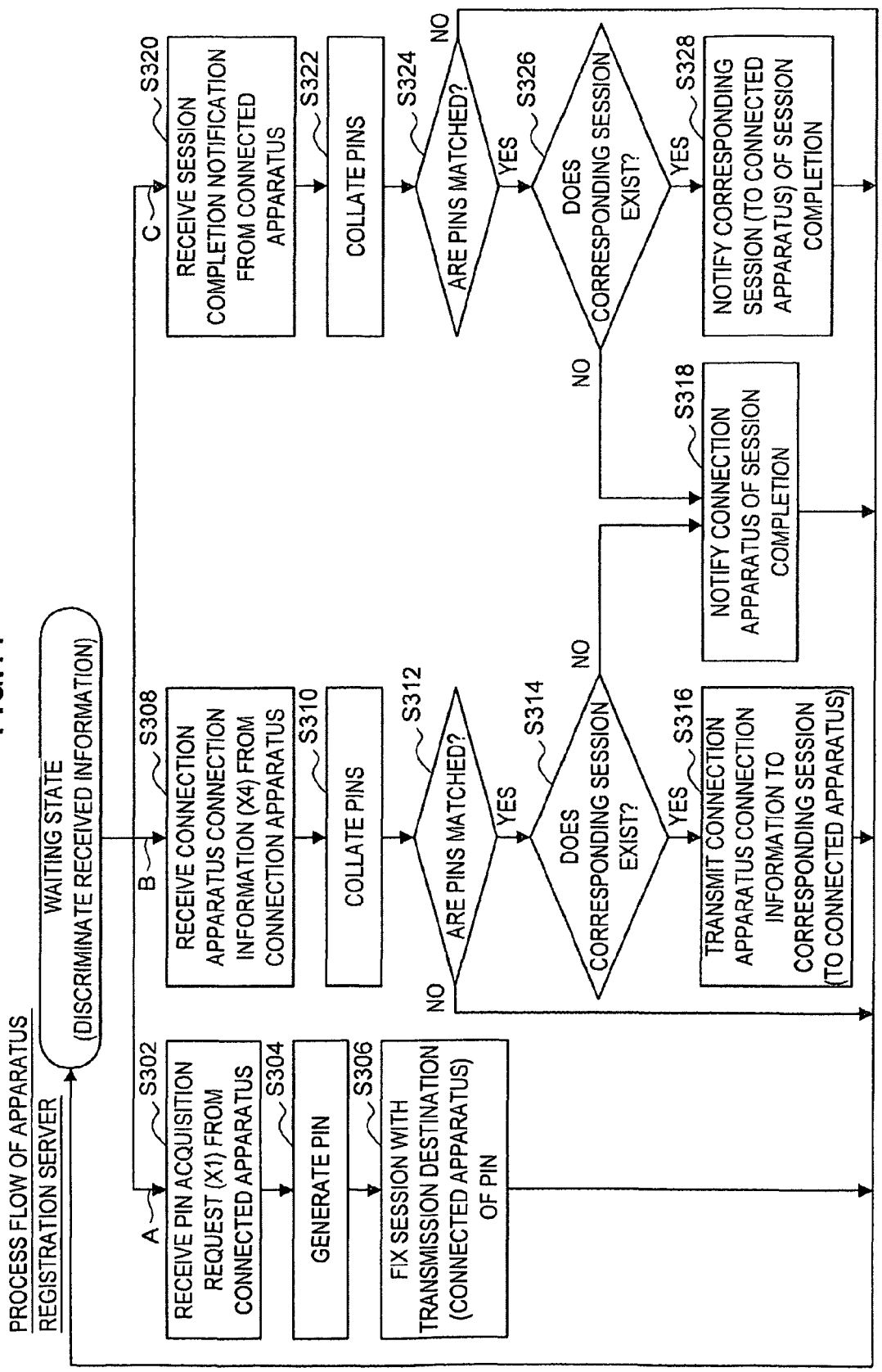
FIG. 11 is a flowchart illustrating a process flow in a connection authentication server according to the embodiment.
Figure 12:
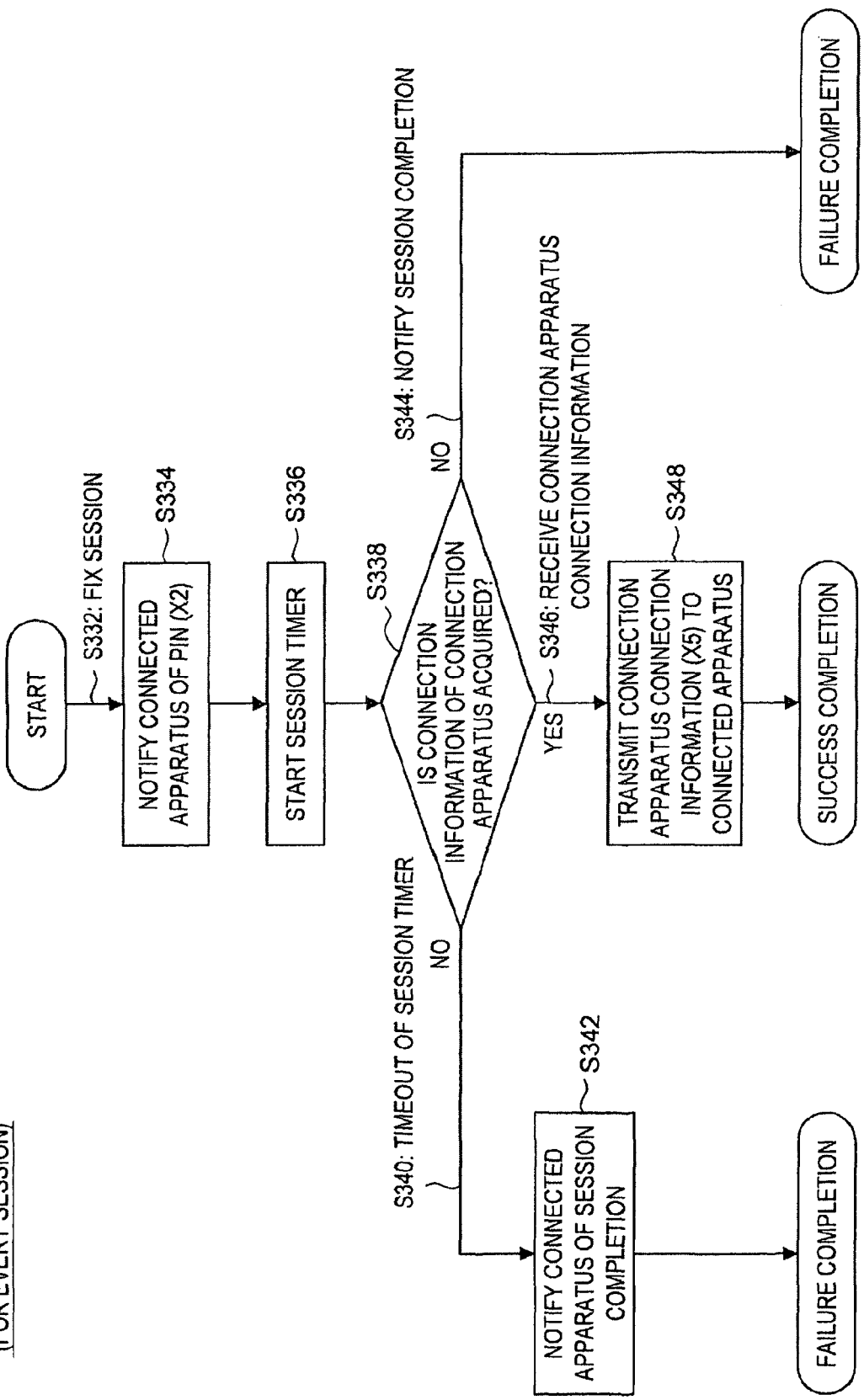
FIG. 12 is a flowchart illustrating a process flow in the connection authentication server according to the embodiment.

Next, based on FIGS. 11 and 12, a process flow in the apparatus registration server 300 will be described in detail. FIG. 11 is a flowchart illustrating the entire process flow of an apparatus registration server 300 that manages a plurality of sessions, among a process flow in the apparatus registration server 300, and FIG. 12 is a flowchart illustrating a process flow for every session among a process flow in an apparatus registration server 300. FIGS. 11 and 12 show the symbols (X1 to X6 and T) of the individual processes shown in FIG. 1 together. The case where a PIN to which an available period is set is used as key information is exemplified, similar to the case of the above-described connected apparatus 100.

First, the entire process flow of the apparatus registration server 300 that manages a plurality of sessions will be described with reference to FIG. 11.

As shown in FIG. 11, the apparatus registration server 300 enters a waiting state when the connected apparatus 100 and the connection apparatus 200 do not have access (connection request) to the apparatus registration server 300. In this waiting state, when receiving arbitrary information from another apparatus (the connected apparatus 100 or the connection apparatus 200 in this embodiment), the apparatus registration server 300 discriminates the contents of the received information. The process proceeds to three channels A to C in accordance with the discriminated result of the received information.

First, when the apparatus registration server 300 receives the PIN acquisition request (X1) from the connected apparatus 100 (S302), the process proceeds to the channel A. In this example, the key information generating unit 352 of the apparatus registration server 300 that has received the PIN acquisition request generates the PIN 188, which is composed of figures of four digits and to which the available period is set (S304). As described above, Step S304 is not necessarily performed after Step S302. That is, the PIN 188 may not be generated in accordance with the PIN acquisition request (X1) of the connected apparatus 100. Alternatively, the PIN 188 may be generated by the key information generating unit 352 in advance, recorded in the storage unit 326 of the apparatus registration server 300, and extracted from the storage unit 326. Next, the apparatus registration server 300 transmits the PIN 188 generated in Step S304 to the connected apparatus 100 and establishes a session with the connected apparatus 100 as a transmission destination of the PIN 188 (S306), and the apparatus registration server 300 reenters a waiting state. The session that is established with the connected apparatus 100 is maintained during the available period of the PIN 188 as long as the apparatus registration server 300 does not receive the session completion notification from the connected apparatus 100.

Second, when the connection information of the connection apparatus 200 is received (X4) from the connection apparatus 200 within the available period of the PIN 188 (S308), the process proceeds to the channel B. The apparatus registration server 300 also receives the PIN 188 when receiving the connection information of the connection apparatus 200, as described above. The collating unit 364A of the apparatus registration server 300 collates the PIN received from the connection apparatus 200 and the PIN 188 issued to the connected apparatus 100 before the PIN is received from the connection apparatus 200 (S310). Next, the CPU 306 of the apparatus registration server 300 determines whether the PIN received from the connection apparatus 200 is matched with the PIN 188 issued to the connected apparatus 100 as the collating result in Step S310 (S312). As the determined result, when the two PINs are not matched with each other, the apparatus registration server 300 reenters a waiting state. Meanwhile, as the determined result in Step S312, when the two PINs are matched with each other, the session searching unit 364B searches whether a session corresponding to the matched PIN 188, that is, in this example, a session established between the apparatus registration server 300 and the connected apparatus 100 exists, and the CPU 306 determines the searched result (S314). As the determined result, when it is determined that the corresponding session exists, the connection information of the connection apparatus 200 is transmitted to a counterpart where the session is established through the corresponding session, that is, in this example, the connected apparatus 100 (S316), and the apparatus registration server 300 reenters a waiting state. Meanwhile, as the determined result in Step S314, when it is determined that the corresponding session does not exist, the session completion notification is transmitted to the connection apparatus 200 (S318), and the apparatus registration server 300 reenters a waiting state.

Third, when the session completion notification (session completion request notification) is received from the connected apparatus 100 (S320), the process proceeds to the channel C. The apparatus registration server 300 also receives the PIN when receiving the session completion notification from the connected apparatus 100. The collating unit 364A of the apparatus registration server 300 collates the PIN received from the connected apparatus 100 and the PIN 188 issued to the connected apparatus 100 before the PIN is received from the connected apparatus 100 (S322). Next, the CPU 306 of the apparatus registration server 300 determines whether the PIN received from the connected apparatus 100 together with the session completion notification is matched with the PIN 188 issued to the connected apparatus 100 as the collating result in Step S322 (S324). As the determined result, when the two PINs are not matched with each other, the apparatus registration server 300 reenters a waiting state. Meanwhile, as the determined result in Step S324, when the two PINs are matched with each other, the session searching unit 364B searches whether a session corresponding to the matched PIN 188, that is, in this example, a session established between the apparatus registration server 300 and the connected apparatus 100 exists, and the CPU 306 determines the searched result (S326). As the determined result, when it is determined that the corresponding session exists, the session completion notification (notification indicating that the session is actually completed) is transmitted to a counterpart where the session is established through the corresponding session, that is, in this example, the connected apparatus 100 (S328), and the apparatus registration server 300 reenters a waiting state. Meanwhile, as the determined result in Step S326, when it is determined that the corresponding session does not exist, the session completion notification is transmitted to the connection apparatus 200 (S318), and the apparatus registration server 300 reenters a waiting state.

Next, a process flow for every session of the apparatus registration server 300 that manages a plurality of sessions will be described with reference to FIG. 12. In the below description, a process flow in the session that is established between the apparatus registration server 300 and the connected apparatus 100 is exemplified.

As shown in FIG. 12, after establishing the session with the connected apparatus 100 (S332), the apparatus registration server 300 notifies the connected apparatus 100 of the PIN 188 (X2) through the established session (S334). In this example, since the PIN 188 is information where the available period is set, a session timer starts from a point of time when the session is notified to the connected apparatus 100 (S336). Next, the CPU 306 determines whether the information acquiring unit 362 acquires the connection information of the connection apparatus 200 within the restriction time of the session timer (S338). As the determined result, when it is determined that the connection information of the connection apparatus 200 is not acquired and the session timer becomes timeout (S340), the apparatus registration server 300 notifies the connected apparatus 100 of the session completion (S342) and completes an apparatus registration process (apparatus registration failure). In addition, as the determined result in Step S338, when it is determined that the session completion is notified to the connection apparatus 200 (S344), the apparatus registration process is completed (apparatus registration failure). Meanwhile, as the determined result in Step S338, when it is determined that the connection information of the connection apparatus 200 is received (S346), the apparatus registration server 300 transmits the connection information (X5) of the connection apparatus 200, which is received from the connection apparatus 200, to the connected apparatus 100 (S348), and completes an apparatus registration process (apparatus registration success).

Connection Authentication System According to a Second Embodiment of the Present Invention Next, a connection authentication system according to a second embodiment of the present invention will be described in detail. In the below description, as an example of the connection authentication system according to this embodiment, exemplified is a URL notification system 700 that notifies a user of addresses (for example, URL; Uniform Resource Locator) of contents on a network as connection information, as an application of the function of the above-described apparatus registration server 300. In particular, the URL notification system 700 according to this embodiment is suitably used when addresses of relatively private Web contents set so as not to be searched using a search engine are notified to a terminal apparatus having no E-mail function.

First, before describing the URL notification system 700 according to this embodiment in detail, a specific issue to be solved by the connection authentication system according to this embodiment and a specific object to be achieved by the connection authentication system will be described.

Similar to the case of the connection authentication system according to the first embodiment described above, in this embodiment, an application subject is an apparatus (hereinafter, a home server; for example, a content serve that is configured based on a DLNA) that is connected to a home network and used. In particular, in the case of this embodiment, the configuration of an apparatus that is needed when a technology of the apparatus registration server 300 is applied to an apparatus serving as a Web server is specified. That is, the technology of the URL notification system 700 according to this embodiment is preferably applied to an apparatus that is connected to a wide area network (WAN) such as the Internet and has a Web server function.

As described above, when the apparatus that is used as the home server is used as the Web server, how to transmit addresses of contents provided by the corresponding Web server to the viewer is one important issue. In addition, the contents are reproduced through a browser that is included in the terminal apparatus of the viewer. However, since a URL indicating an address of the contents is long, it is difficult to accurately input the address to an input column of the browser. In particular, since the home server generally uses a dynamic domain name server (DDNS) that is associated with a domain name and an IP address, the URL is complicated and long.

In the related art, since a general-purpose apparatus, such as a PC, a mobile phone or an information terminal, is used in order to view the Web contents, the above-described issue is resolved by transmitting an URL to a mailer included in the general-purpose apparatus. That is, the above-described issue is resolved by a link function between the mailer and the browser in which contents indicated by the URL are displayed through the browser by clicking the URL transmitted by the mailer. However, the method that uses the above-described link function to transmit the URL is rarely applied to an apparatus that does not have the mailer or the E-mail function. In recent years, household electrical appliances, such as a game machine or a television, also have a multi-function, and are mounted with a browser. Therefore, it is possible to view the Web contents using the household electrical appliances.

Accordingly, with respect to an apparatus that does not have the mailer or the E-mail function, the URL notification system 700 according to this embodiment provides a function that allows the Web contents indicated by an address of a complicated and long URL to be simply viewed.

(Configuration of URL Notification System 700 and Outline of URL Notification Method)

Figure 13:
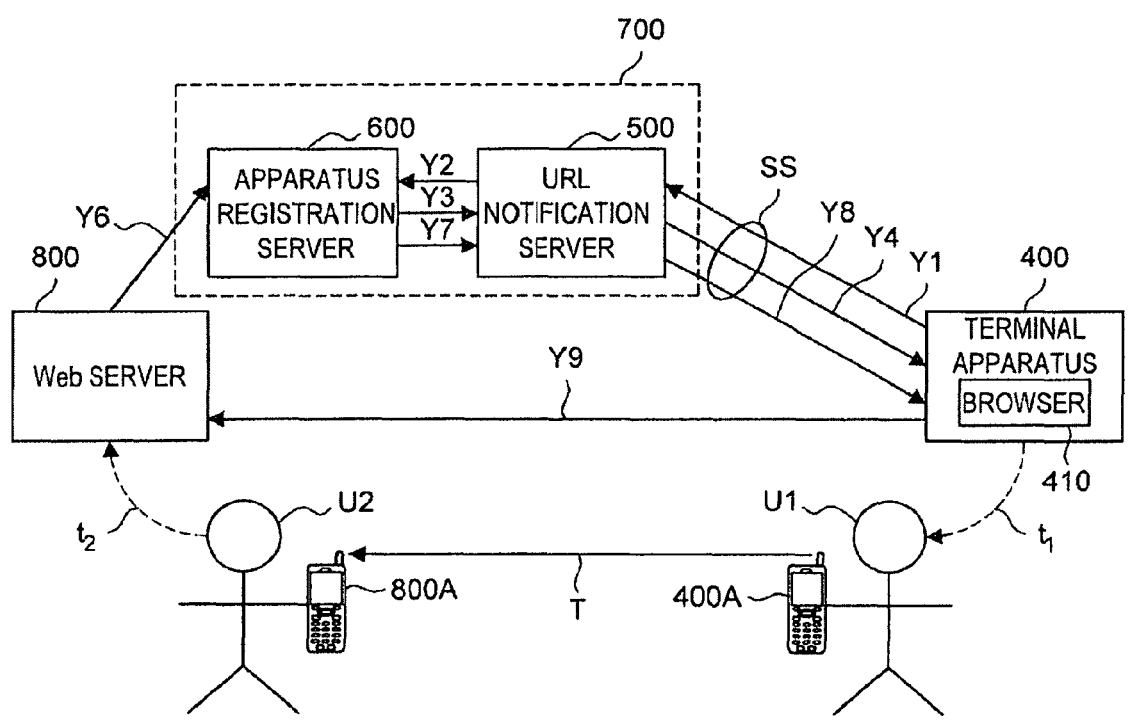
FIG. 13 is a diagram illustrating the entire configuration of a connection authentication system according to a second embodiment of the present invention.

Next, based on FIG. 13, the configuration of the URL notification system 700, a terminal apparatus 400 connected to the URL notification system 700, and a Web server 800 and the outline of the URL notification method will be described. FIG. 13 is a diagram illustrating the entire configuration of a URL notification system 700 according to this embodiment.

As shown in FIG. 13, the URL notification system 700 mainly includes a URL notification server 500 that is an example of an information acquiring apparatus according to this embodiment and an apparatus registration server 600. In addition, the URL notification sever 500 is connected to the terminal apparatus 400 including a browser 410 that is as an example of an authentication information notifying apparatus according to this embodiment. Meanwhile, the apparatus registration server 600 is connected to the Web server 800. Further, the terminal apparatus 400 and the Web server 800 are connected to each other through a wide area network (WAN), such as the Internet. Hereinafter, the functions of the URL notification server 500 and the apparatus registration server 600 will be simply described while considering a relationship between the terminal apparatus 400 and the Web server 800.

(URL Notification Server 500)

The URL notification server 500 has a function of relaying a PIN (key information) display request, which is received from the terminal apparatus 400 through the browser 410, to the apparatus registration server 600, and displaying a PIN issued by the apparatus registration server 600 through the browser 410. In addition, the URL notification server 500 has a function of notifying the terminal apparatus 400 of the URL of the web server 800 transmitted through the predetermined sequence and process or redirecting (changing a reference destination) a reference destination of the browser 410 to the Web contents indicated by the corresponding URL. At this time, the browser 410 is configured to periodically update a page.

In order to provide the above functions, the URL notification server 500 provides an input/display interface to the user U1 of the terminal apparatus 400. For example, the URL notification server 400 provides an input interface, such as a PIN issuing request button used to request issuing of the PIN or a cancel button used to cancel PIN issuing or a URL notification process, and a display interface used to display the PIN, to the browser 410. At the time of communication between the URL notification server 500 and the terminal apparatus 400, it is possible to use an authentication technology, such as an SSL. In addition, after the session is established with the terminal apparatus 400, the URL notification server 500 can maintain the corresponding session for only the predetermined time and remove the session after the predetermined time passes. The format of the session is not limited to the specific format. For example, the URL notification server 500 on the network can have a CGI to manage a state.

(Apparatus Registration Server 600)

The apparatus registration server 600 has a function of issuing a PIN in accordance with a PIN issuing request transmitted from the URL notification server 500 and transmitting the PIN to the URL notification server 500. In addition, the apparatus registration server 600 holds the issued PIN for only a predetermined time, collates the PIN transmitted from the Web server 800 and the PIN held at the corresponding point of time, and detects a transmission destination of the URL transmitted from the Web server 800 together with the PIN. In addition, when the transmission destination exists, the apparatus registration server 600 transmits the URL to the URL notification server 500. In addition, the apparatus registration server 600 can provide an interface used to input the PIN and the URL to the Web server 800. For example, the apparatus registration server 600 provides a setting pages that includes at least a PIN input column and a URL input column, thereby transmitting the PIN and the URL though the browser that is included in the Web server 800.

(URL Notification Method)

In this case, with reference to FIG. 13, a sequence until the browser 410 is redirected to the URL transmitted by the Web server 800 will be simply described. First, the user U1 of the terminal apparatus 400 uses the browser 410 to have access to the contents provided by the Web server 800. At this time, the user U1 has access to a page that is provided by the URL notification server 500 (Y1). For example, the user U1 needs to have access to the corresponding page by designating a link registered in the browser 410 at the time of shipment of the terminal apparatus 400 or have access to the corresponding page using a searching engine.

Next, the user U1 presses a start button that is provided in the page of the URL notification server 500. As a result, the PIN is displayed through the browser 410 (Y4). Next, the user U1 uses a communicating unit such as a telephone to transmit the PIN displayed through the browser 410 to the manager U2 of the Web server 800 (or URL or contents indicated by the URL) (T). Next, the manager U2 inputs the PIN transmitted from the user U1 through a telephone and the URL (or a folder location in the Web server) of the contents provided by the Web server 800 to the PIN input column and the URL input column of the setting page provided by the apparatus registration server 600 (Y6). For example, the setting page may be provided with a "E-mail address input column" used to transmit the URL through an E-mail, a "QR code output button" used to output a QR code indicating a URL to a screen, and a "PIN input column" used to input a PIN to the screen.

If the PIN and the URL are input by the manager U2, a predetermined process is executed in the URL notification system 700 and a reference destination of the browser 410 is redirected based on the corresponding URL (Y8). At this time, if the user U1 adds the redirected URL of the contents to his or her Favorites list, the URL notification process does not to be executed whenever the user U1 has access to the contents.

The configuration of the URL notification system 700 and the outline of the URL notification method according to this embodiment have been described. If the above configuration is applied, even though the corresponding apparatus does not have an E-mail function, it is possible to redirect a reference destination to the desired contents without inputting the long and complicated URL. Therefore, it is possible to simply view the contents that are provided by the home server as the Web server.

(Functional Configuration of URL Notification Server 500)

Figure 14:
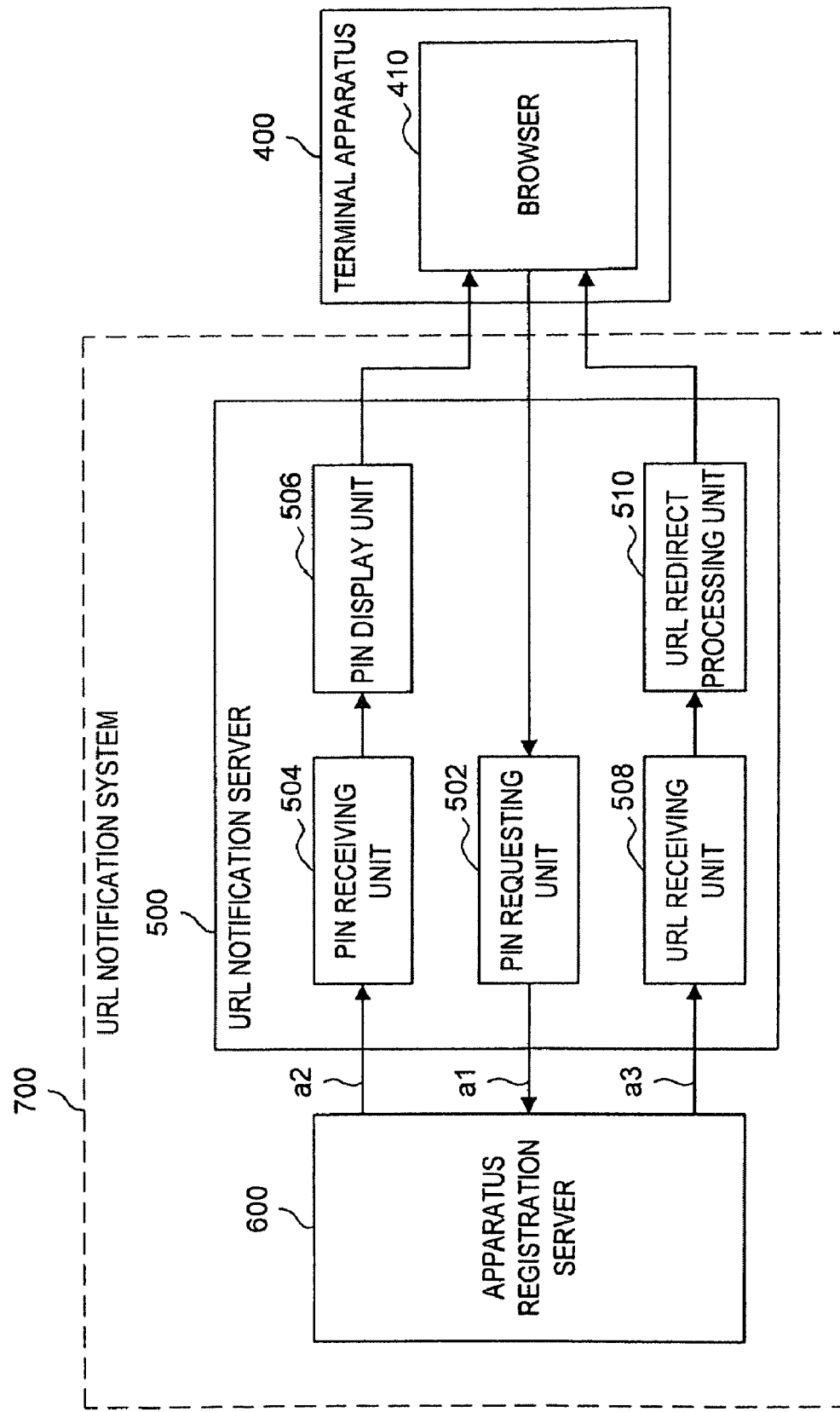
FIG. 14 is a diagram illustrating the functional configuration of a URL notification server according to the embodiment.

Next, based on FIG. 14, the functional configuration of the URL notification server 500 according to this embodiment will be described. FIG. 14 is a diagram illustrating the functional configuration of a URL notification server 500 according to this embodiment.

As shown in FIG. 14, the URL notification server 500 mainly includes a PIN requesting unit 502, a PIN receiving unit 504, a PIN display unit 506, a URL receiving unit 508, and a URL redirect processing unit 510.

When the PIN issuing button that is displayed through the browser 410 of the terminal apparatus 400 is pressed, the PIN requesting unit 502 transmits a PIN issuing request to the apparatus registration server 600. It is assumed that a page of the URL notification server 500 is displayed through the browser 410.

The PIN receiving unit 504 receives a PIN that is issued by the apparatus registration server 600 in accordance with the PIN issuing request transmitted from the PIN requesting unit 502, and transmits the PIN to the PIN display unit 506. In addition, the PIN display unit 506 displays the PIN acquired from the PIN receiving unit 504 through the browser 410 of the terminal apparatus 400.

The URL receiving unit 508 receives the URL from the apparatus registration server 600. Specifically, when the same PIN as the PIN that is displayed through the browser 410 of the terminal apparatus 400 by the PIN display unit 506 is input to the apparatus registration server 600, the URL notification server 500 receives the URL transmitted from the apparatus registration server 600 through the URL receiving unit 508. In addition, the URL redirect processing unit 510 redirects the reference destination of the browser 410 of the terminal apparatus 400 to the corresponding URL based on the URL that is transmitted from the URL receiving unit 508. The corresponding redirect process is executed based on a predetermined script that is held by the URL notification server 500.

As described above, the URL notification server 500 functions as an intermediary between the terminal apparatus 400 and the apparatus registration server 600, and executes a transmission process of the PIN information, a transmission process of the URL information, and a reference destination redirect process of the browser 410. If the above configuration is applied, the URL notification server 500 can manage an input/output page of PIN/URL information opened to the browser 410 of the plurality of terminal apparatuses 400 on the network and a process on the browser 410, such as a reference destination redirect process of the browser 410. As a result, it is possible to prevent the functional configuration of the apparatus registration server 600 from being excessively complicated. In addition, it is possible to easily execute a distribution process by separately configuring the apparatus registration server 600 and the URL notification server 500. Of course, it is possible to improve convenience at the time of managing the server.

(Functional Configuration of Apparatus Registration Server 600)

Figure 15:
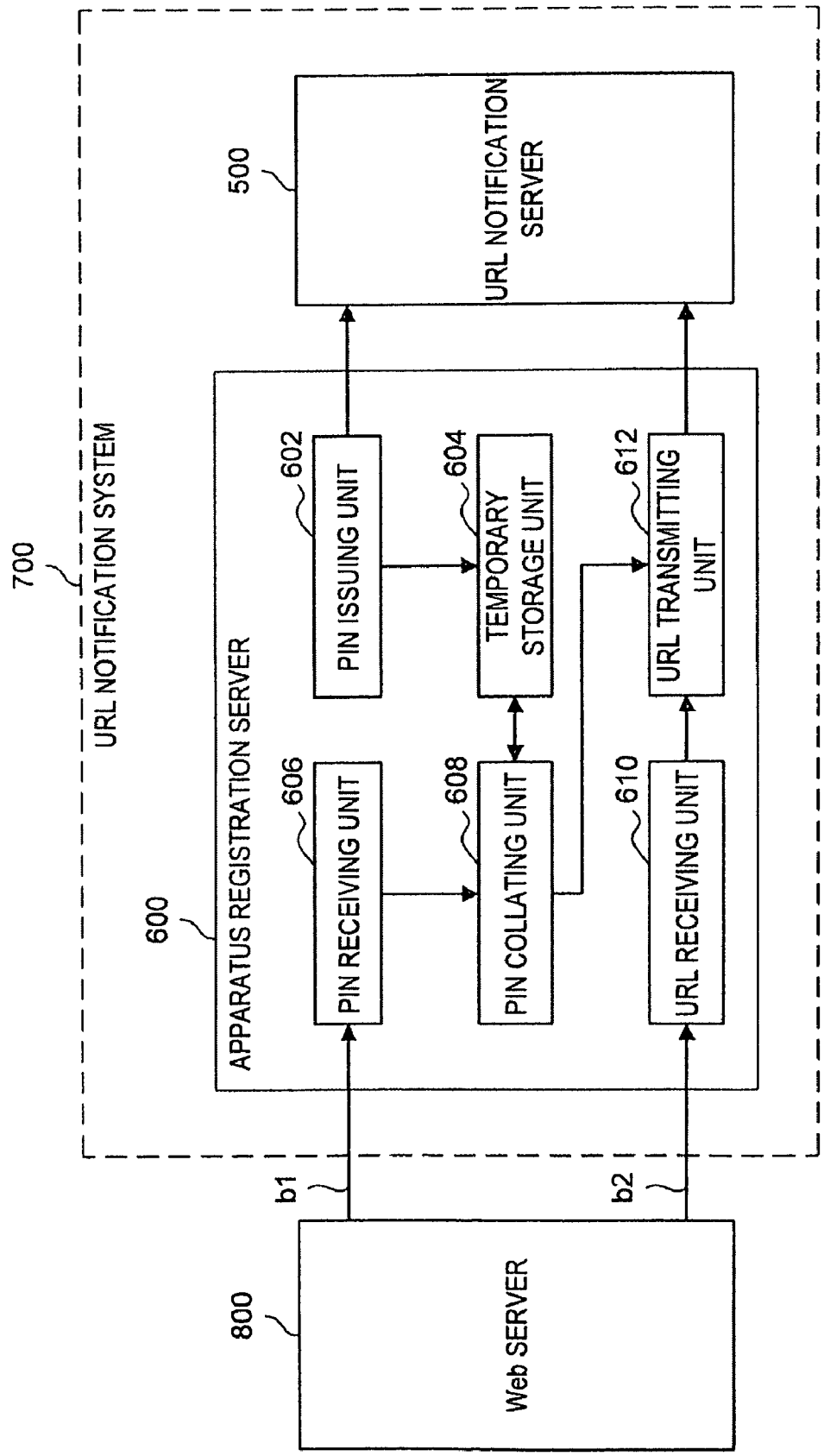
FIG. 15 is a diagram illustrating the functional configuration of an apparatus registration server according to the embodiment.

Next, based on FIG. 15, the functional configuration of the apparatus registration server 500 according to this embodiment will be described. FIG. 15 is a diagram illustrating the functional configuration of an apparatus registration server 500 according to this embodiment.

As shown in FIG. 15, the apparatus registration server 500 mainly includes a PIN issuing unit 602, a temporary storage unit 604, a PIN receiving unit 606, a PIN collating unit 608, a URL receiving unit 610, and a URL transmitting unit 612.

The PIN issuing unit 602 generates a PIN in accordance with a PIN issuing request that is transmitted from the PIN requesting unit 502 of the URL notification server 500. In addition, the PIN issuing unit 602 transmits the generated PIN to the PIN receiving unit 504 of the URL notification server 500. Further, the PIN issuing unit 602 holds the generated PIN in the temporary storage unit 604. The temporary storage unit 604 may be a non-volatile memory, but may be a volatile memory that can hold storage data only when power is supplied to the apparatus registration server 600. Further, when the session with the URL notification server 500 is cut, when a cancel request of the URL notification process is received from the URL notification server 500, or when a predetermined time passes and the URL notification process becomes timeout, the PIN issuing unit 602 can delete recorded data (for example, a PIN or information of the terminal apparatus 400 that issues the PIN) that is recorded in the temporary storage unit 604.

The PIN receiving unit 606 receives the PIN from the Web server 800 and transmits the PIN to the PIN collating unit 608. The PIN collating unit 608 collates the PIN received from the PIN receiving unit 606 and the PIN held in the temporary storage unit 604, and determines whether the PIN transmitted from the Web server 800 is a PIN issued by the PIN issuing unit 602. As a result, when a PIN that is matched with the PIN transmitted from the Web server 800 exists in the temporary storage unit 604, the PIN collating unit 608 notifies the URL transmitting unit 612 (which will be described later) of a URL transmission request. At this time, the PIN collating unit 608 acquires information (for example, being communicated or communication interruption) about communication states of the URL notification server 500 and the browser 410 from the URL notification server 500 and notifies the URL transmission request in the case of being communicated.

The URL receiving unit 610 receives the URL from the Web server 800 and transmits the URL to the URL transmitting unit 612. At this time, the URL that is transmitted from the Web server 800 is transmitted together with the PIN: and the PIN received by the PIN receiving unit 606 and the URL received by the URL receiving unit 610 are associated with each other. In addition, the URL transmitting unit 612 transmits the URL acquired from the URL receiving unit 610 to the URL notification server 500. As described above, the URL transmitting unit 612 transmits the corresponding URL to the URL notification server 500 in accordance with the URL transmission request notified from the PIN collating unit 608.

The main functional configuration of the apparatus registration server 600 according to this embodiment has been described. According to this configuration, a PIN exchange process between the user U1 of the terminal apparatus 400 and the manager (or user) U2 of the Web server 800 is authenticated, and the URL can be transmitted to the URL notification server 500. Further, if the configuration of deleting the held PIN in accordance with a display state of the browser 410 of the terminal apparatus 400 or the configuration of holding the PIN for only a predetermined time is applied, it is possible to delete information of the PIN or the like that is to be held by the apparatus registration server 600. In addition, it is possible to reduce a load that is needed to manage the corresponding information. The apparatus registration server 600 according to this embodiment is specified to the URL transmission, as compared with the apparatus registration server 300 according to the first embodiment. However, it should be noted that, in the basic technical spirit, the apparatus registration server 600 according to this embodiment is almost the same as the apparatus registration server 300 according to the first embodiment.

(Functional Configuration of Web Server 800)

Figure 16:
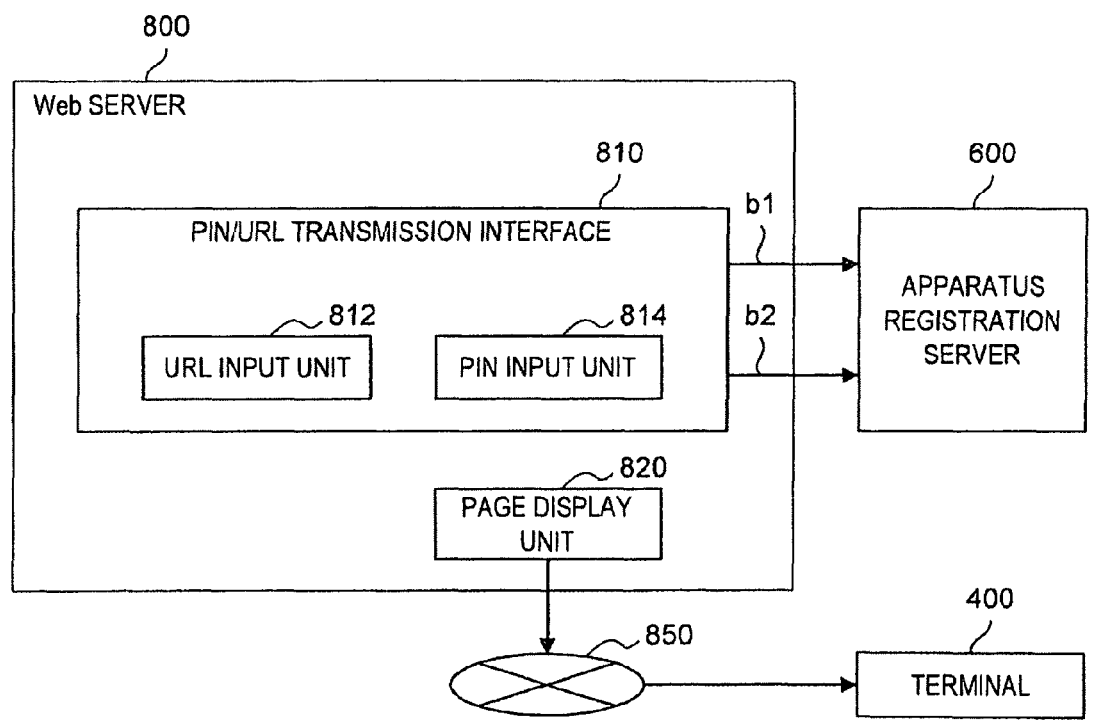
FIG. 16 is a diagram illustrating the functional configuration of a Web server according to the embodiment.

Next, based on FIG. 16, the functional configuration of the Web server 800 according to this embodiment will be described. FIG. 16 is a diagram illustrating the functional configuration of a Web server 800 according to this embodiment.

As shown in FIG. 16, the Web server 800 mainly includes a PIN/URL transmission interface 810 and a page display unit 820. Further, the PIN/URL transmission interface 810 is provided with a URL input unit 812 and a PIN input unit 814.

The PIN/URL transmission interface 810 is connected to the apparatus registration server 600, and transmits information (a URL and a PIN), which are respectively input to the URL input unit 812 and the PIN input unit 814, to the apparatus registration server 600. The PIN/URL transmission interface 810 provides a user interface (UI) that is used when the user U2 or the manager (hereinafter, referred to as manager) of the apparatus registration server 810 transmits information to the apparatus registration server 600. For this reason, the UI may be a dedicated UI or an interface using a Web browser. In this case, the PIN/URL transmission interface 810 is a display screen of the Web browser where a page of the apparatus registration server 600 is displayed. The PIN/URL transmission interface 810 can transmit and receive authentication information that is used for connection for the apparatus registration server 600.

Further, the URL input unit 812 is an input interface that is used to input a URL that the manager U2 of the Web server 800 notifies the terminal apparatus 400. For example, the URL input unit 812 can include an input column used to input texts, a pull-down menu where predetermined URLs are listed up, or a URL transmission button associated with the predetermined URLs. Meanwhile, the PIN input unit 814 is an interface that is used to input the PIN notified from the user U1 of the terminal apparatus 400. For example, the PIN input unit 814 may include an input column used to input texts or a selection interface that is connected to a portable terminal such as a mobile phone or a PDA and selectively displays the PIN information input to the Web server 800.

The page display unit 820 has a function of being connected to the network 850 and displaying a page through the browser 410 of the terminal apparatus 400. For example, the page display unit 820 may be composed of a module that realizes a Web server function, such as Apache or IIS. Accordingly, when the browser 410 of the terminal apparatus 400 has access to a page of the Web server 800 through a predetermined URL notification process step, the page display unit 820 displays the page. As an example, the configuration of the page display unit 820 that displays the page is shown, but the application range of this embodiment is not limited thereto. For example, instead of the page display unit 820, various content servers, such as a video server that reproduces video contents or a music server that reproduces music contents, may be used.

As described above, the Web server 800 according to this embodiment can transmit the URL and the PIN to the apparatus registration server 600 in order to notify the URL transmitted to the user U1 of the terminal apparatus 400 through the URL notification system 700. Further, the Web server 800 can display the page through the browser 410 of the terminal apparatus 400 in accordance with the page display request from the terminal apparatus 400. In the above description, the configuration that displays the page of the Web server 800 is mainly described in order to allow the technical characteristic of this embodiment to be easily apprehended, but the technology according to this embodiment can be applied to another configuration.

For example, an address of an opened directory in the Web server 800 and connection authentication information used to have access to the corresponding address are notified instead of the URL, and having access to the opened directory is enabled using a FTP function or an SSH function that is included in the terminal apparatus 400. In this case, instead of the page display unit 820, an FTP server or an SSH server is used. This modification is exemplary and it can be understood by those skilled in the art that the technical characteristic according to this embodiment can be applied to the configuration other than the exemplified configuration.

(Display Configuration of Browser 410)

Figure 17:
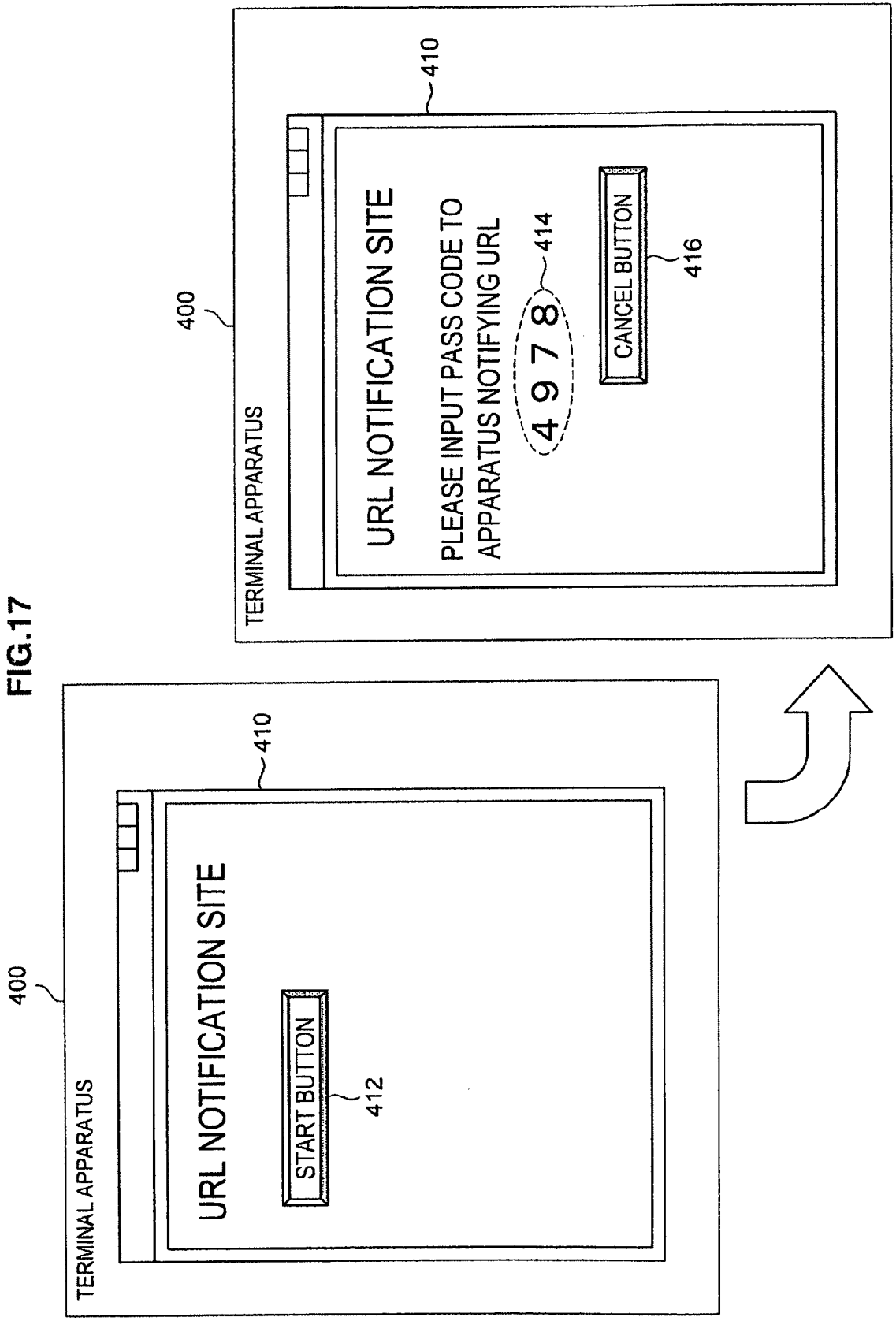
FIG. 17 is a diagram illustrating an example of a PIN issuing request and a PIN display screen that are displayed through a browser according to the embodiment.

In this case, based on FIG. 17, a PIN display screen and a PIN issuing request screen that are displayed through the browser 410 of the terminal apparatus 400 are simply described. FIG. 17 is a diagram illustrating an example of a PIN issuing request and a PIN display screen that are displayed through a browser 410.

First, referring to the left diagram of FIG. 17, a display screen of the browser 410 that is connected to a page of the URL notification server 500 is shown. In this example, a PIN issuing request button (start button) 412 is displayed on the display screen of the browser 410. If the user U1 of the terminal apparatus 400 presses the PIN issuing request button 412, the user U1 can receive a PIN issued from the URL notification server 500. If the PIN issuing request button is pressed, a PIN display screen is displayed as shown in the right diagram of FIG. 17. In the right diagram of FIG. 17, a PIN 414 issued by the URL notification server 500 and a cancel button 416 used to interrupt a URL notification process are displayed. The user U1 of the terminal apparatus 400 transmits the PIN 414 displayed through the browser 410 to the manager U2 of the Web server 800, thereby requesting a URL notification process.

At this time, the user U1 of the terminal apparatus 400 transmits, to the manager U2 of the Web server 800, the PIN 414 using another communication path different from a network 850 used to connect the terminal apparatus 400 and the Web server 800. Examples of another communication path may include a transmission path of voice information using a telephone, or a transmission path of text information, such as an E-mail or chatting. If the above configuration is applied, a method is considered in which the user U1 of the terminal apparatus 400 notifies the manager U2 of the Web server 800 of the PIN 414 through a conversation using a telephone, or notifies the manager U2 of the Web server 800 of the PIN 414 using a mailer of a mobile phone. Further, if the configuration where the URL notification sever 500 displays a QR code corresponding to the PIN 414 through the browser 410 of the terminal apparatus 400 is applied, the user U1 of the terminal apparatus 400 uses a mobile phone to photograph the QR code displayed through the browser 410 so as to acquire the PIN 414, and transmits the PIN 414 to the manager U2 of the Web browser 800. However, the present invention is not limited thereto, and it can be conceived by those skilled in the art that another communication path and another transmission method may be used.

(Display Configuration of PIN/URL Communication Interface 810)

Figure 18:
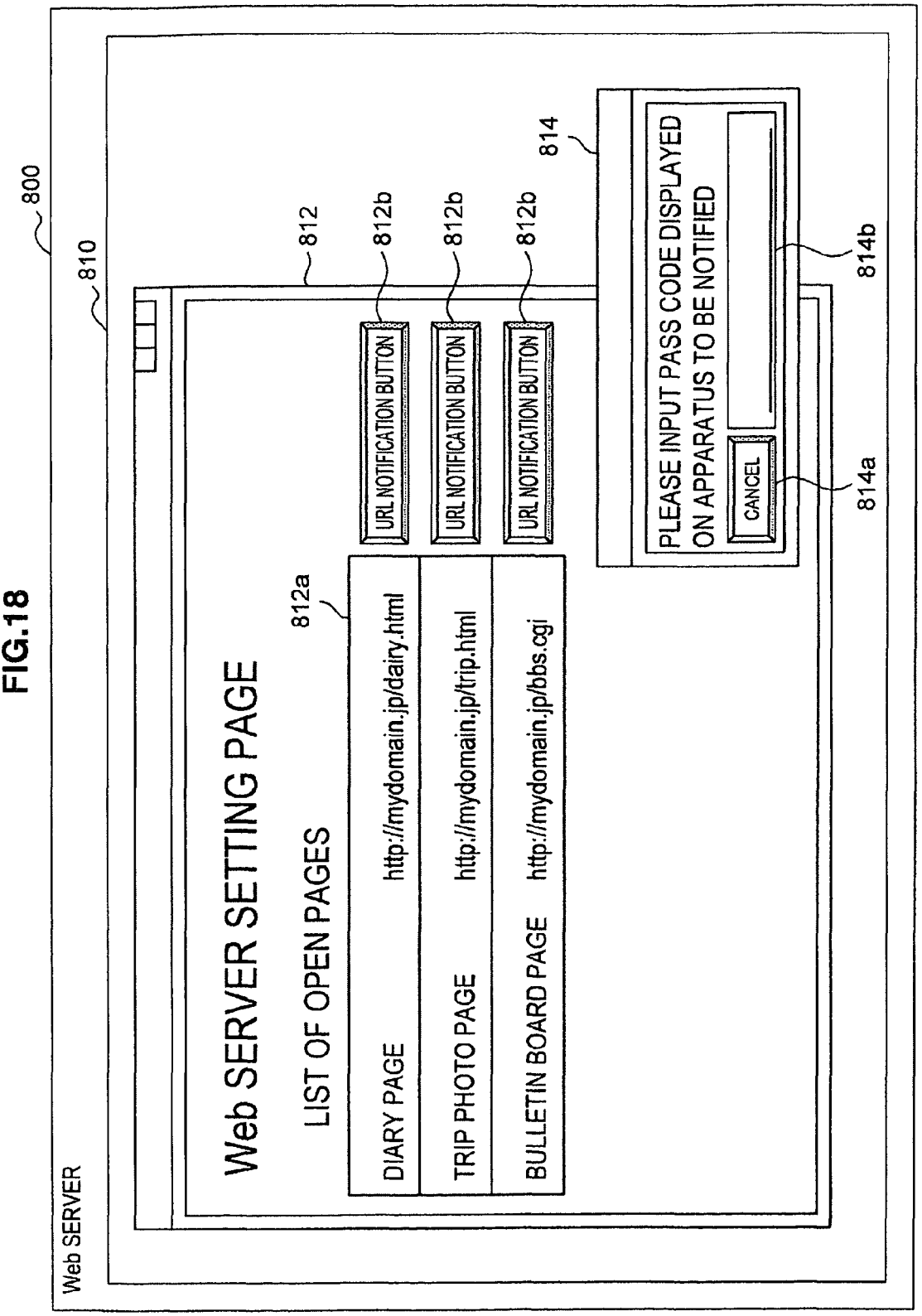
FIG. 18 is a diagram illustrating the display configuration of a PIN/URL transmission interface according to the embodiment.

In this case, based on FIG. 18, the display configuration of the PIN/URL transmission interface 810 that is used when the Web server 800 transmits the PIN and the URL to the apparatus registration server 600 will be simply described. FIG. 18 is a diagram illustrating the display configuration of a PIN/URL transmission interface 810.

As shown in FIG. 18, in the PIN/URL transmission interface 810, for example, a setting page of the apparatus registration server 600 is displayed. Accordingly, the URL input unit 812 may include a browser that is used to display the setting page of the apparatus registration server 600. Referring to the example of FIG. 18, the URL input unit 812 includes a page list 812a where URLs of pages displayed through the browser 410 of the terminal apparatus 400 are arranged and a URL notification button 812b used to notify the apparatus registration server 600 of a predetermined URL. It is needless to say that a page list is displayed using a pull-down menu or a transmitted URL is designated by providing a check box in the URL input unit 812. Further, the multifunctional page list configuration that a URL displayed as a search result of a time table site is listed up can be applied to the page list 812a.

In FIG. 18, the PIN input unit 814 is exemplified. The PIN input unit 814 includes a cancel button 814a and a text input column 814b. The manager U2 of the Web server 800 inputs the PIN notified from the user U1 of the terminal apparatus 400 to the text input column 814b, thereby transmitting the PIN to the apparatus registration server 600. Meanwhile, when the URL notification process itself is interrupted, it is possible to cancel the URL notification process by pressing the cancel button 814a. For example, when the PIN is notified from the user U1 of the arbitrary terminal apparatus 400 but a proper page that can be opened at the corresponding point of time does not exist, the URL notification process may be interrupted.

The specific configuration example of the input/output interface between the user U1 of the terminal apparatus 400 at the side that receives the URL and the manager U2 of the Web server 800 at the side that notifies the URL has been described with reference to FIGS. 17 and 18. If the configuration is applied, it is possible to realize the URL notification process according to this embodiment. However, the configuration of the interface portion that is used by the user U1 or the manager U2 can be realized by using the known technologies or technologies to be mainly used in the future. That is, according to the technical characteristic according to this embodiment, information is input and output using the interface and the process is executed based on the corresponding information. Thus, it is preferable to configure the interface that can improve convenience of the user U1 or the manager U2.

The function configuration of each apparatus has been described. Next, a process flow in each apparatus will be described.

(Flow of URL Notification Process in Terminal Apparatus 400)

Figure 19A:
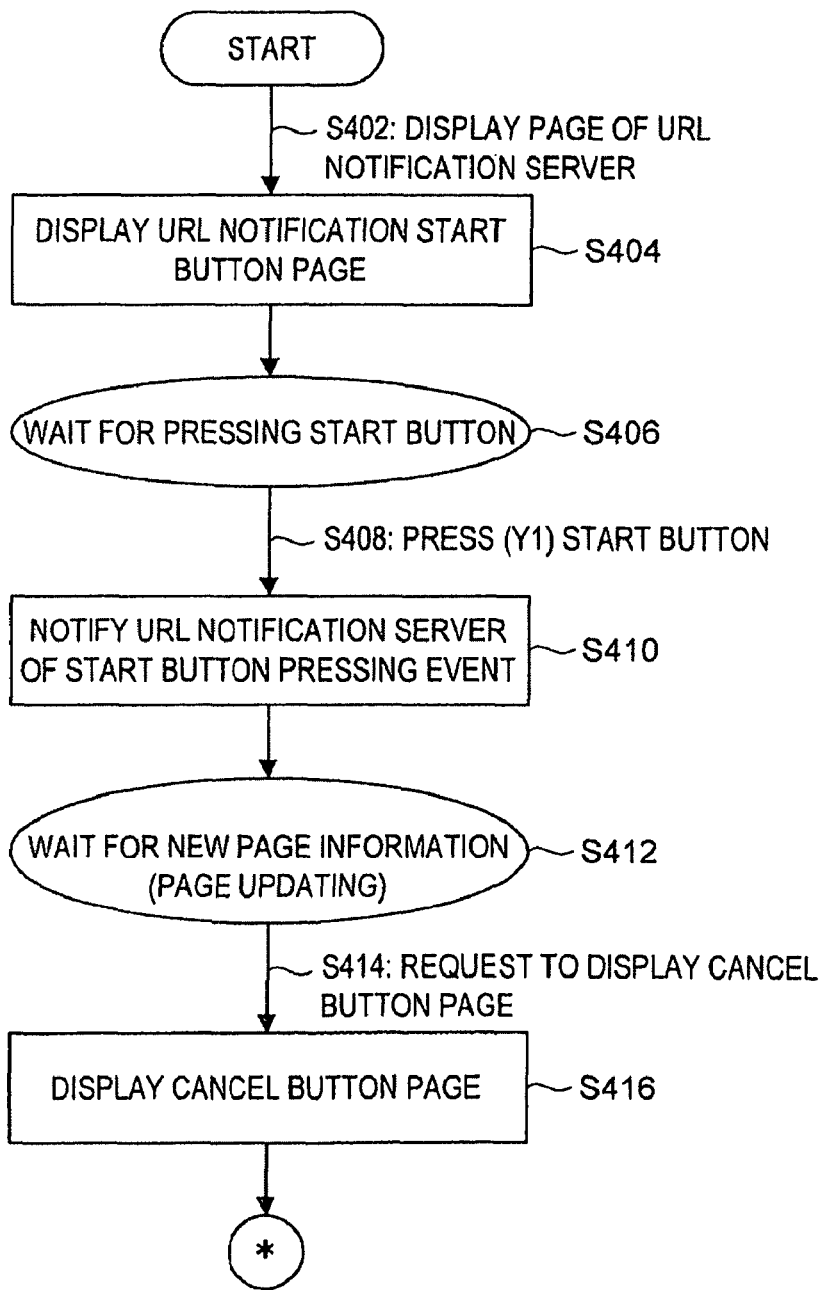
FIG. 19A is a flowchart illustrating a URL notification process flow in a terminal apparatus according to the embodiment.

First, based on FIGS. 19A and 19B, a flow of a URL notification process in the terminal apparatus 400 will be described in detail. FIGS. 19A and 19B are flowcharts illustrating a flow of a URL notification process in a terminal apparatus 400. FIGS. 19A and 19B show the symbols (Y1 to Y8 and T) of the individual processes shown in FIG. 13 together. In the below description, the case where a PIN is held for only a predetermined time is exemplified.

As shown in FIG. 19A, first, a page of the URL notification server 500 is displayed on the terminal apparatus 400 using the browser 410 of the terminal apparatus 400 (S402). As described above, in the page of the URL notification server 500, a page including a start button 412 of URL notification is displayed (S404). The terminal apparatus 400 waits for pressing the start button by the user U1 (S406). If the start button is pressed (Y1) by the user U1 (S408), a start button pressing event is notified to the URL notification server 500 (S410). Then, the process enters a new page information waiting state (page updating information waiting state) (S412). In this state, the terminal apparatus 400 requests the URL notification server 500 to display the cancel button page displayed by the cancel button 416 (S414). In accordance with the display request, the cancel button page is displayed on the terminal apparatus 400 (S416).

Next, as shown in FIG. 19B, the terminal apparatus 400 determines which page updating event is performed (S418).

According to the determined result, the process proceeds to the following three channels a to c.

First, when the cancel button pressing event is performed (S420), the process proceeds to the channel a. If the cancel button pressing event is performed, first, the terminal apparatus 400 notifies the URL notification sever 500 of the cancel button pressing event (S422). Next, the terminal apparatus 400 displays a URL notification completion page including display indicating that the URL notification is failed (S424), and completes a URL notification process (URL notification failure).

Second, when the PIN and an updating request to the cancel button page are received (Y4) from the URL notification server 500 (S426), the process proceeds to the channel b. First, the terminal apparatus 400 displays the PIN received from the URL notification server 500 and a cancel button page according to the updating request (S428). Next, the terminal apparatus 400 determines which page updating event is performed (S430), and the process proceeds to the channels d, e, and f in accordance with the determined result.

First, when the cancel button pressing event is performed (S432), the process proceeds to the channel d. If the cancel button pressing event is performed, first, the terminal apparatus 400 notifies the URL notification server 500 of the cancel button pressing event (S422). Next, the terminal apparatus 400 displays a URL notification completion page including display indicating that the URL notification is failed (S424), and completes the URL notification process (URL notification failure). Further, when the terminal apparatus 400 receives (Y8) an updating request to a transition confirmation page of a URL notified from the URL notification server 500 (S434), the process proceeds to the channel e. After receiving the updating request to the transition confirmation page of the URL notified from the URL notification server 500, the terminal apparatus 400 displays a transition confirmation button page (S436).

Next, the terminal apparatus 400 determines which button event is performed in the displayed transition confirmation button page (S438). As the determined result, when the cancel button is pressed by the user U1 like the channel g (S440), the terminal apparatus 400 display a URL notification completion page including display indicating that the URL notification is failed (S424), and completes the URL notification process (URL notification failure). Meanwhile, as the determined result in Step S438, when the transition confirmation button is pressed by the user U1 like the channel h (S442), the terminal apparatus 400 performs a transition (Y9) operation to the URL notified from the URL notification server 500 (S444), and completes a URL notification process (URL notification success).

Third, as the determined result in Step S418, when the updating request to the failure completion page is received from the URL notification server 500 (S446), the process proceeds to the channel c. In this case, the terminal apparatus 400 displays the failure completion page (S448) and completes a URL notification process (URL notification failure).

Further, as the determined result in Step S430, when the updating request to the failure completion page is received from the URL notification server 500 (S450), the process proceeds to the channel f. Similar to the case of Step S446, the terminal apparatus 400 displays the failure completion page (S448) and completes a URL notification process (URL notification failure).

(Flow of URL Notification Process in URL Notification Server 500)

Figure 20:
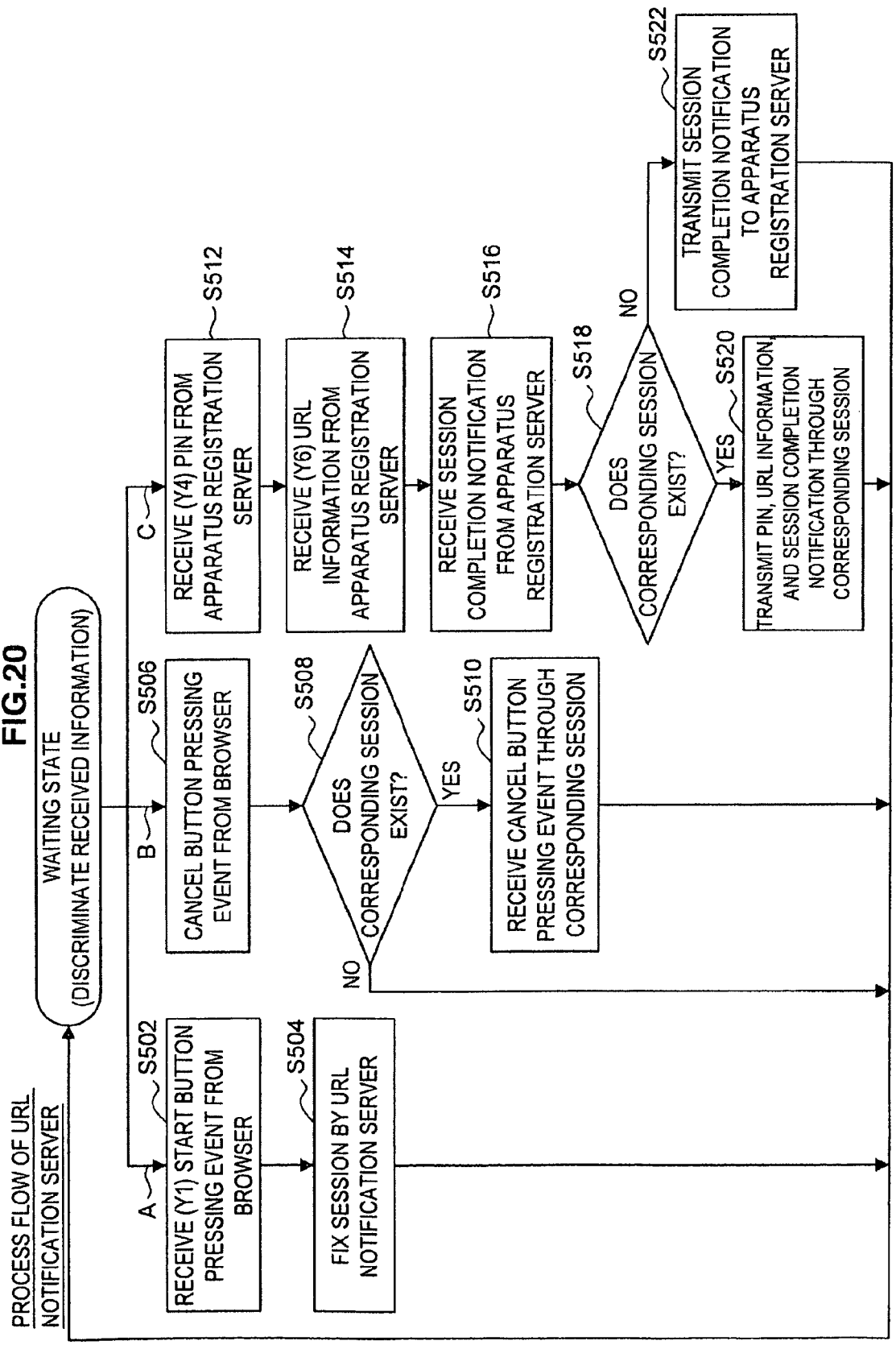
FIG. 20 is a flowchart illustrating a URL notification process flow in a URL notification server according to the embodiment.
Figure 21:
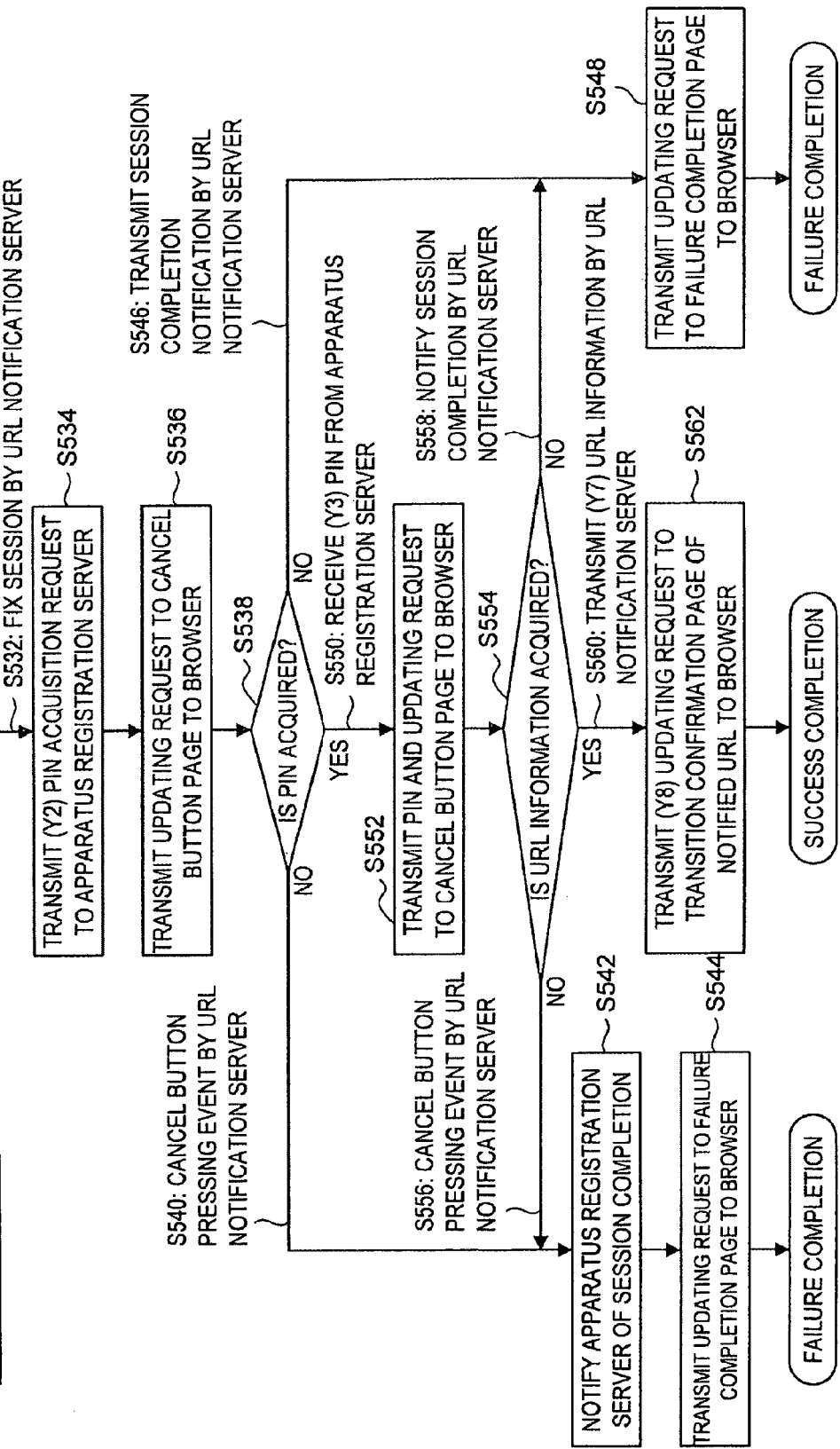
FIG. 21 is a flowchart illustrating a URL notification process flow in the URL notification server according to the embodiment.

Next, based on FIGS. 20 and 21, a flow of a URL notification process in a URL notification server 500 will be described in detail. FIG. 20 is a flowchart illustrating the entire process flow of a URL notification server 500 that manages a plurality of sessions, among a process flow in the URL notification server 500, and FIG. 21 is a flowchart illustrating a process flow for every session among a process flow in a URL notification server 500. FIGS. 20 and 21 show the symbols (Y1 to Y8 and T) of the individual processes shown in FIG. 13 together.

First, the entire process flow of the URL notification server 500 that manages the plurality of sessions will be described with reference to FIG. 20.

As shown in FIG. 20, when the URL notification server 500 does not receives an event or information from the terminal apparatus 400 and the apparatus registration server 600, the URL notification server 500 is in a waiting state. In the waiting state, when the URL notification server 500 receives arbitrary information from another apparatus (the terminal apparatus 400 or the apparatus registration server 600 in this embodiment), the URL notification server 500 discriminates contents of the received information. The process proceeds to the three channels A to C in accordance with the discriminated result of the received information.

First, when a URL notification start button pressing event exists in the browser 410 of the terminal apparatus 400 and the URL notification server 500 receives (Y1) a PIN issuing request from the browser 410 (S502), the process proceeds to the channel A. After receiving the PIN issuing request from the browser 410, the URL notification server 500 issues the PIN to the terminal apparatus 400, and establishes a session with the terminal apparatus 400 (S504). The URL notification server 500 reenters a waiting state after establishing the session.

Second, when a cancel button pressing event exists in the browser 410 of the terminal apparatus 400 and the URL notification server 500 receives a cancel request of a URL notification process from the browser 410 (S506), the process proceeds to the channel B. When receiving the cancel request from the browser 410, the URL notification server 500 receives a PIN together with the cancel request, and determines whether the received PIN and the PIN held by the URL notification server 500 are matched with each other. As a result, when the two PINs are matched with each other, the URL notification server 500 determines whether a session corresponding to the matched PIN exists (S508). As the determined result, when it is determined that the corresponding session does not exist, the URL notification server 500 reenters a waiting state. Meanwhile, as the determined result in Step S508, when it is determined that the corresponding session exists, the URL notification server 500 receives a cancel button pressing event through the corresponding session (S510).

Third, when the PIN is received (Y4) from the apparatus registration server 600 (S512), the process proceeds to the channel C. When receiving the PIN from the apparatus registration server 600, the URL notification server 500 transmits the PIN to the terminal apparatus 400, and the received PIN is displayed through the browser 410 of the terminal apparatus 400. Then, the PIN is notified from the user U1 of the terminal apparatus 400 to the manager U2 of the Web server 800 within an available period of the PIN (while the PIN is held by the URL notification server 500). When the desired URL information is notified from the Web server 800 to the apparatus registration server 600 using the notified PIN, the URL notification server 500 receives the URL information (Y6) from the apparatus registration server 600 (S514). Then, the URL notification server 500 receives the session completion notification from the apparatus registration server 600 (S516). When receiving the session completion notification from the apparatus registration server 600, the URL notification server 500 receives the PIN together with the session completion notification, and determines whether the received PIN and the PIN held by the URL notification server 500 are matched with each other. As a result, when the two PINs are matched with each other, the URL notification server 500 determines whether a session corresponding to the matched PIN exists (S508). As the determined result, when it is determined that the corresponding session exists, the URL notification server 500 transmits the PIN, the URL information, and the session completion notification to the apparatus registration server 600 through the corresponding session (S520), and reenters a waiting state. Meanwhile, as the determined result in Step S518, when it is determined that the corresponding session does not exist, the URL notification server 500 transmits the session completion notification to the apparatus registration server 600 (S522), and reenters a waiting state.

Next, a process flow for every session of the URL notification server 500 that manages a plurality of sessions will be described with reference to FIG. 21. In the below description, a process flow in a session that is established between the URL notification server 500 and the terminal apparatus 400 is exemplified.

As shown in FIG. 21, after the URL notification server 500 establishes the session with the terminal 400 (S532), the URL notification server 500 transmits the PIN acquisition request (Y2) to the apparatus registration server 600 (S534). The URL notification server 500 that has transmitted the PIN acquisition request transmits an updating request to a cancel button page to the browser 410 (S536). Then, the URL notification server 500 determines whether or not to acquire the PIN from the apparatus registration server 600 (S538). As the determined result, when it is determined that the URL notification server 500 does not acquire the PIN and a cancel button pressing event is received from the browser 410 in the URL notification server 500 (S540), the URL notification server 500 transmits the session completion notification to the apparatus registration server 600 (S542). Meanwhile, the URL notification server 500 transmits an updating request to a failure completion page to the browser 410 (S544) and completes a URL notification process (URL notification failure). Further, as the determined result in Step S538, when it is determined that the URL notification server 500 does not acquire the PIN and the session completion notification is transmitted to the browser 410 in the URL notification server 500 (S546), the URL notification server 500 transmits an updating request to the failure completion page to the browser 410 (S548), and completes a URL notification process (URL notification failure). As the determined result in Step S538, when it is determined that the PIN is received (Y3) from the apparatus registration server 600 and the PIN is acquired (S550), the URL notification server 500 transmits the PIN acquired from the apparatus registration server 600 and an updating request to the cancel button page to the browser 410 (S552).

Further, the URL notification server 500 determines whether or not to acquire URL information that the Web server 800 desires to transmit from the apparatus registration server 600 (S554). As the determined result, when it is determined that the URL notification sever 500 does not acquire the URL information and a cancel button pressing event is received from the browser 410 in the URL notification server 500 (S556), the URL notification server 500 transmits a session completion notification to the apparatus registration server 600 (S542). Meanwhile, the URL notification server 500 transmits an updating request to a failure completion page to the browser 410 (S544), and completes the URL notification process (URL notification failure). Further, as the determined result in Step S554, when it is determined that the URL notification server 500 does not acquire the URL information and the session completion notification is transmitted to the browser 410 in the URL notification server 500 (S558), the URL notification server 500 transmits an updating request to the failure completion page to the browser 410 (S548), and completes a URL notification process (URL notification failure). Meanwhile, as the determined result in Step S554, when it is determined that the URL information is received from the apparatus registration server 600 and the URL information is acquired (S560), the URL notification server 500 transmits an updating request (Y8) to a transition confirmation page of the notified URL to the browser 410 (S562), and completes a URL notification process (URL notification success).

(Flow of a URL Notification Process in an Apparatus Registration Server 600)

Figure 22:
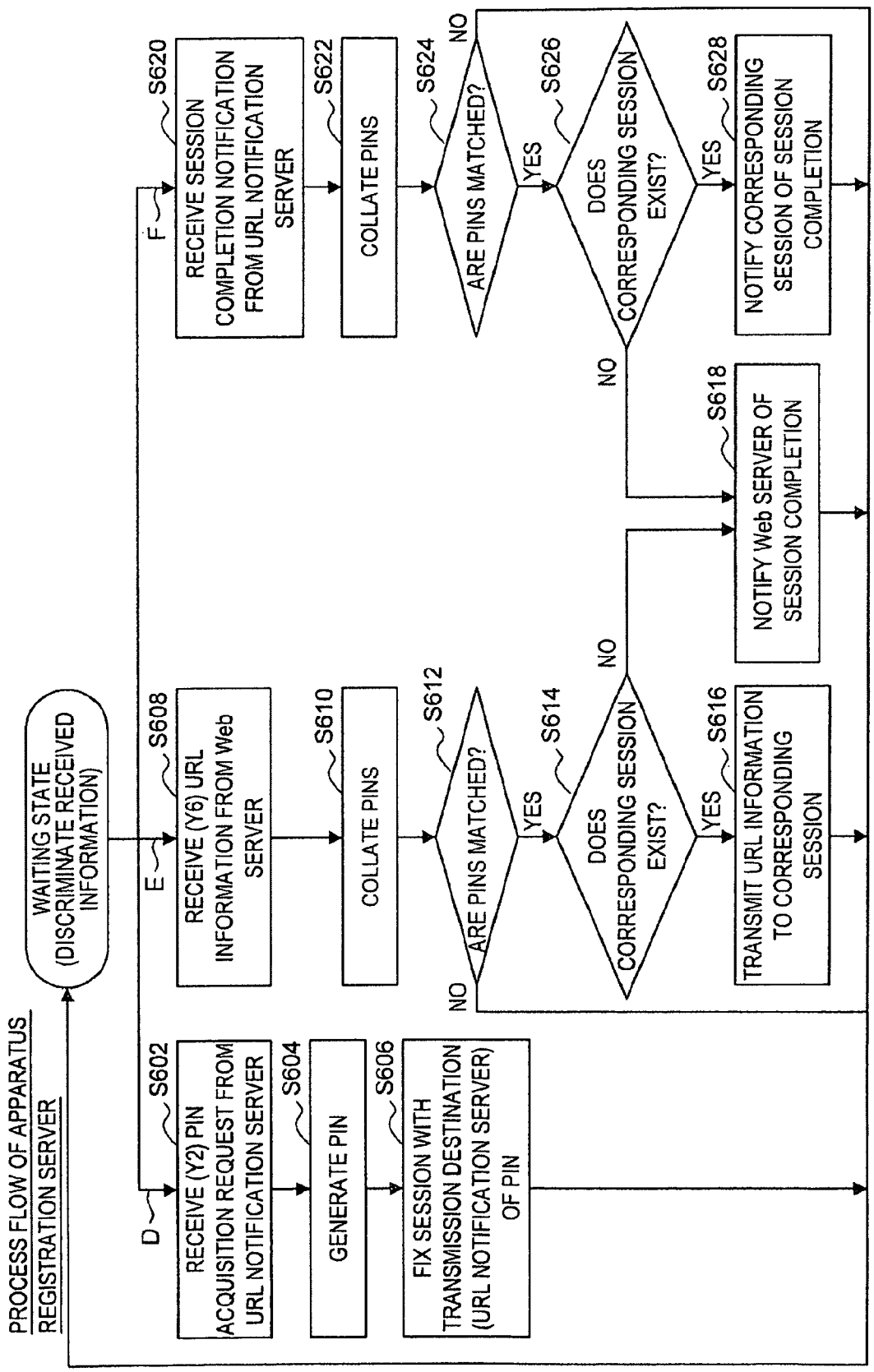
FIG. 22 is a flowchart illustrating a process flow in an apparatus registration server according to the embodiment.
Figure 23:
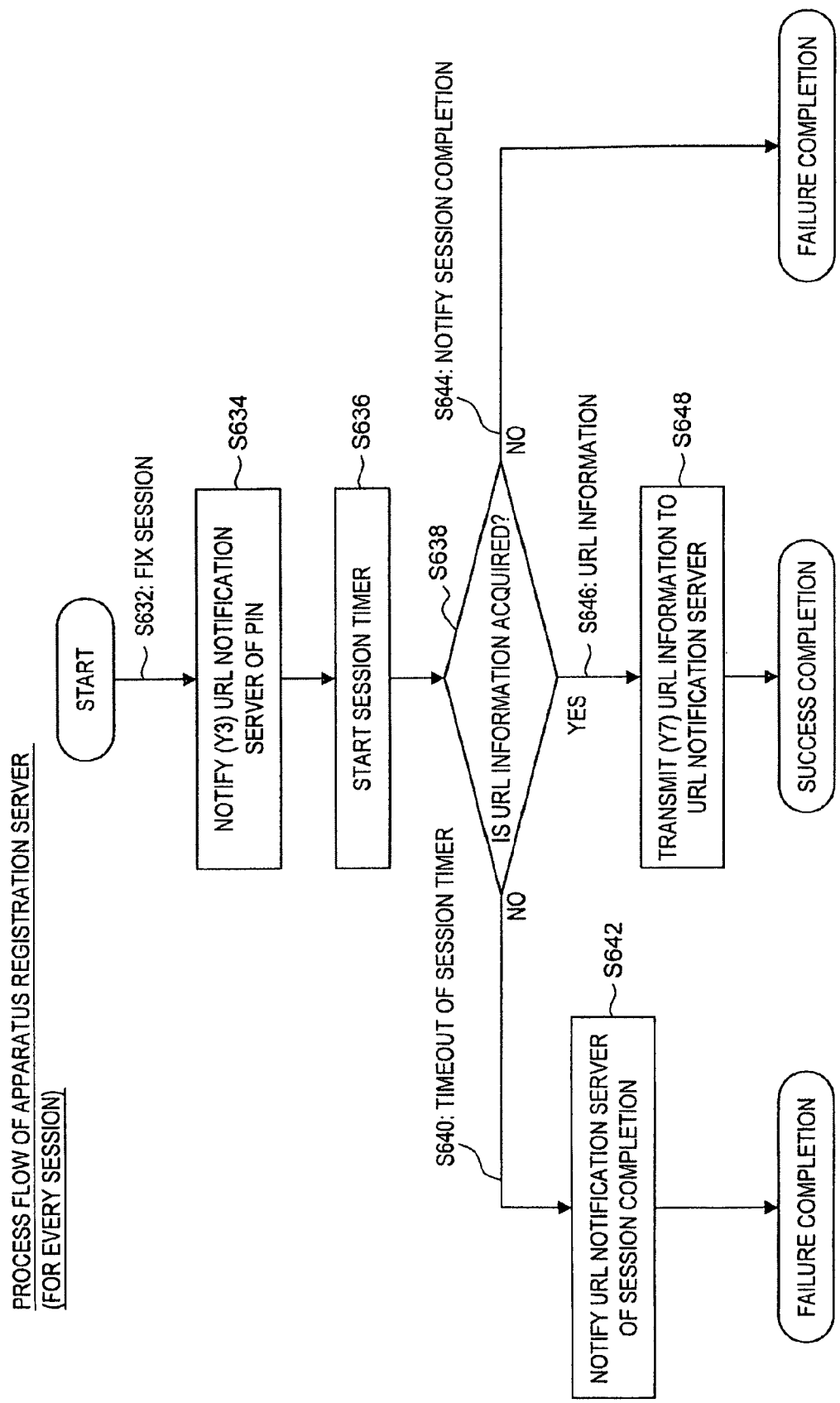
FIG. 23 is a flowchart illustrating a process flow in the apparatus registration server according to the embodiment.

Next, based on FIGS. 22 and 23, a process flow in an apparatus registration server 600 will be described in detail. FIG. 22 is a flowchart illustrating the entire process flow of an apparatus registration server 600 that manages a plurality of sessions, among a process flow in the apparatus registration server 600, and FIG. 23 is a flowchart illustrating a process flow for every session among a process flow in an apparatus registration server 600. FIGS. 22 and 23 show the symbols (Y1 to X8 and T) of the individual processes shown in FIG. 13 together.

First, the entire process flow of the apparatus registration server 600 that manages the plurality of sessions will be described with reference to FIG. 22.

As shown in FIG. 22, when the access is not made from the URL notification server 500 and the Web server 800, the apparatus registration server 600 is in a waiting state. In the waiting state, when the apparatus registration server 600 receives arbitrary information from another apparatus (the URL notification server 500 and the Web server 800 in this embodiment), the apparatus registration server 600 discriminates contents of the received information. The process proceeds to the three channels D to F in accordance with the discriminated result of the received information.

First, when the apparatus registration server 600 receives the PIN acquisition request (Y2) from the URL notification server 500 (S602), the process proceeds to the channel D. The PIN issuing unit 602 of the apparatus registration server 600 that has received the PIN acquisition request generates a PIN where an available period is set (which is held for only a predetermined time) (S604). Next, the apparatus registration server 600 transmits the PIN that is generated in Step S604 to the URL notification sever 500 and establishes a session with the URL notification server 500 as a transmission destination of the PIN (S606), and reenters a waiting state. The session that is established with the URL notification server 500 is maintained during the available period of the PIN.

Second, when the desired URL information is received (Y6) from the Web server 800 within the available period of the PIN that is issued to the URL notification server 500 (S608), the process proceeds to the channel E. The apparatus registration server 600 also receives the PIN when receiving the URL information from the Web server 800. The PIN collating unit 608 of the apparatus registration server 600 collates the PIN received from the Web server 800 and the PIN issued to the URL notification server 500 (which is held in the apparatus registration server 600) (S610). Next, the apparatus registration server 600 determines whether the PIN received from the Web server 800 is matched with the PIN held by the URL notification server 500, as the collating result in Step S610 (S612). As the determined result, when the two PINs are not matched with each other, the apparatus registration sever 600 reenters a waiting state. Meanwhile, as the determined result in Step S612, when the two PINs are matched with each other, the apparatus registration server 600 determines whether a session corresponding to the matched PIN, that is, in this example, a session established between the apparatus registration server 600 and the URL notification server 500 exists (S614). As the determined result, when it is determined that the corresponding session exists, the Web server 800 transmits the desired URL information to a counterpart where the session is established, that is, in this example, the URL notification server 500 through the corresponding session (S616), and the apparatus registration server 600 reenters a waiting state. Meanwhile, as the determined result in Step S614, when it is determined that the corresponding session does not exist, the apparatus registration server 600 transmits the session completion notification to the Web server 800 (S618) and reenters a waiting state.

Third, when the session completion notification (notification of a session completion notification) is received from the URL notification server 500 (S620), the process proceeds to the channel F. The apparatus registration server 600 also receives the PIN when receiving the session completion notification from the URL notification server 500. The PIN collating unit 608 of the apparatus registration server 600 collates the PIN received from the URL notification server 500 and the PIN held by the apparatus registration server 600 (S622). Next, the apparatus registration server 600 determines whether the PIN received from the URL notification server 500 together with the session completion notification is matched with the PIN held by the apparatus registration server 600, as the collating result in Step S622 (S624). As the determined result, when the two PINs are not matched with each other, the apparatus registration sever 600 reenters a waiting state. Meanwhile, as the determined result in Step S624, when the two PINs are matched with each other, the apparatus registration server 600 determines whether a session corresponding to the matched PIN, that is, in this example, a session established between the apparatus registration server 600 and the URL notification server 500 exists (S626). As the determined result, when it is determined that the corresponding session exists, the apparatus registration server 600 transmits the session completion notification (notification indicating that the session is actually completed) to a counterpart where the session is established, that is, in this example, the URL notification server 500 through the corresponding session (S628). Then, the apparatus registration server 600 reenters a waiting state. Meanwhile, as the determined result in Step S626, when it is determined that the corresponding session does not exist, the apparatus registration server 600 transmits the session completion notification to the Web server 800 (S618) and reenters a waiting state.

Next, a process flow for every session of the apparatus registration server 600 that manages a plurality of sessions will be described with reference to FIG. 23. In the below description, a process flow in a session that is established between the apparatus registration server 300 and the URL notification server 500 and the terminal apparatus 400 is exemplified.

As shown in FIG. 23, after the apparatus registration server 600 establishes the session with the URL notification server 500 (S632), the apparatus registration server 600 notifies the URL notification server 500 (of the PIN (Y3) through the established session (S634). In this example, since the PIN is information where an available period is set, a session timer starts from a point of time when the apparatus registration server 600 notifies the URL notification server 500 of the session (S636). Next, the apparatus registration server 600 determines whether the URL receiving unit 610 acquires the URL information from the Web server 800 within a restriction time of the session timer (S638). As the determined result, when the URL information is not acquired from the Web server 800 and the session timer becomes timeout (S640), the apparatus registration server 600 notifies the URL notification server 500 of the session completion (S642), and completes the URL notification process (URL notification failure). In addition, as the determined result in Step S638, even when it is determined that the session completion is notified to the Web server 800 (S644), the apparatus registration server 600 completes a URL notification process (URL notification failure). Meanwhile, as the determined result in Step S638, when it is determined that the URL information is received from the Web server 800 (S646), the apparatus registration server 600 transmits the URL information (Y7), which is received from the Web server 800, to the URL notification server 500 (S648), and completes a URL notification process (URL notification success).

(Flow of URL Notification Process in Web Server 800)

Figure 24:
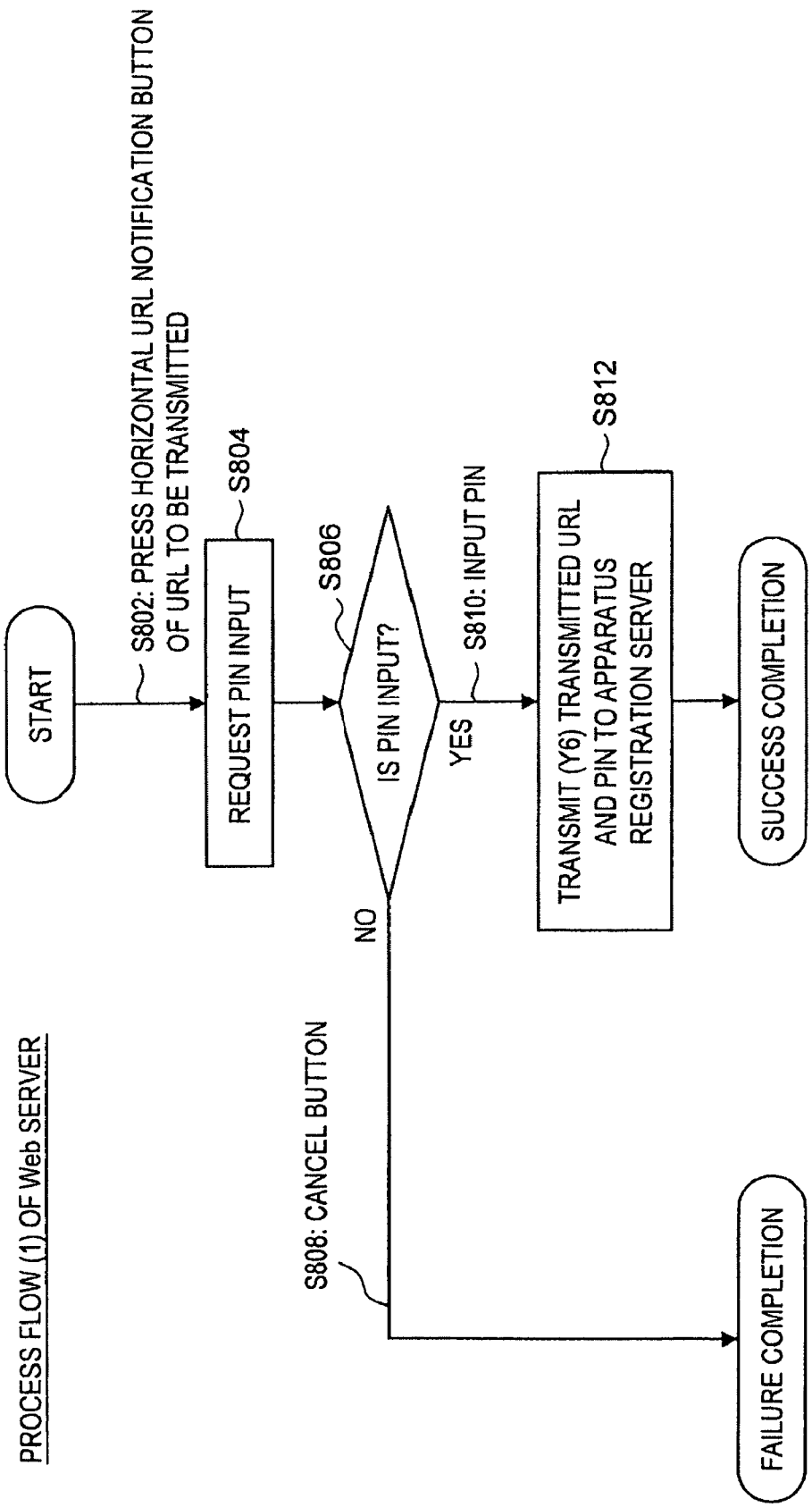
FIG. 24 is a flowchart illustrating a process flow in a Web server according to the embodiment.
Figure 25:
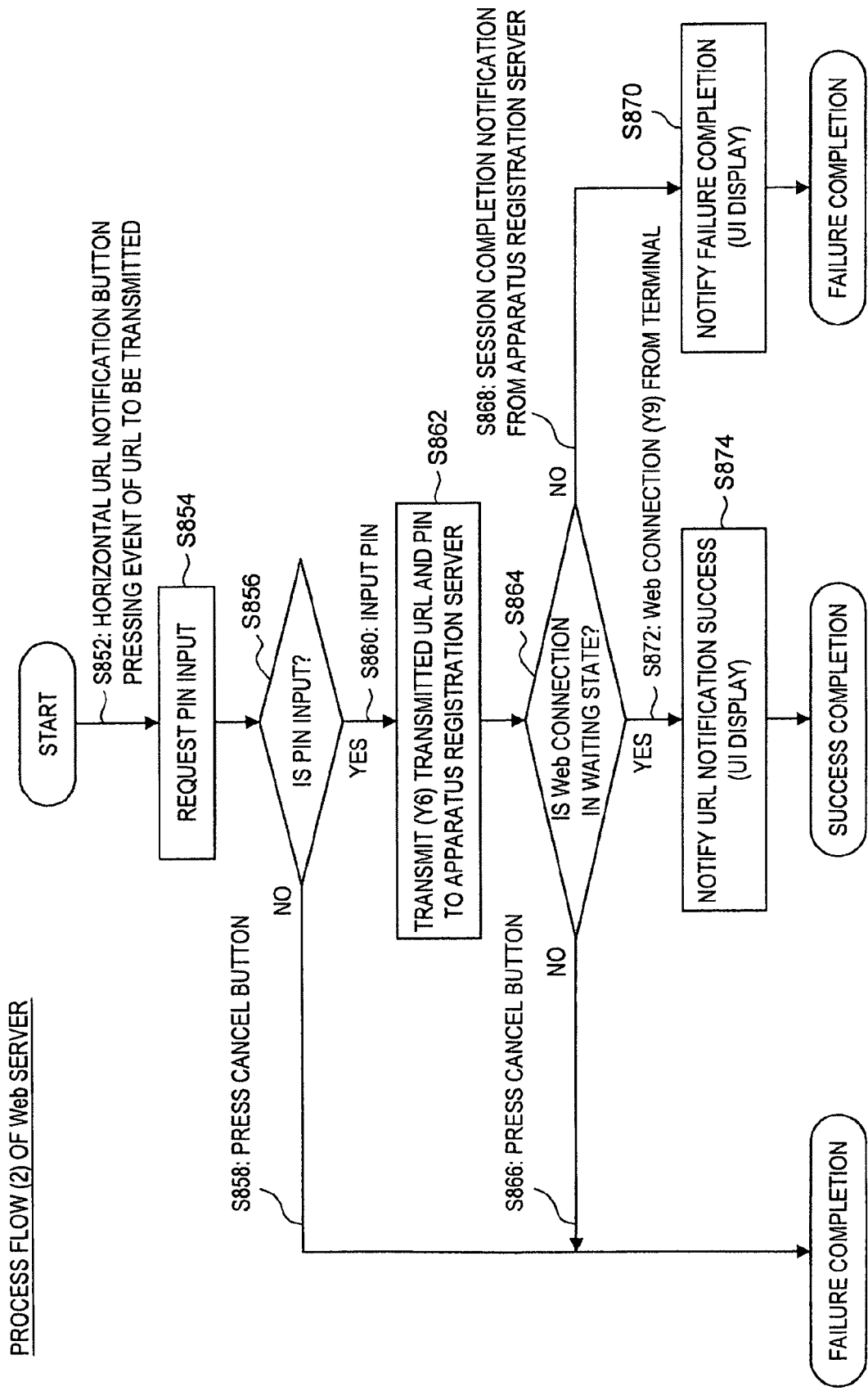
FIG. 25 is a flowchart illustrating a process flow in the Web server according to the embodiment.

Next, based on FIGS. 24 and 25, a process flow in the Web server 800 will be described in detail. FIG. 24 is a flowchart illustrating the case where a URL to be transmitted is not a URL of a Web server 800 itself among a process flow in the Web server 800, and FIG. 25 is a flowchart illustrating the case where a URL to be transmitted is a URL of a Web server 800 itself among a process flow in the Web server 800. FIGS. 24 and 25 show the symbols (Y1 to X8 and T) of the individual processes shown in FIG. 13 together.

First, with reference to FIG. 24, a description is given to a flow of a URL notification process of a Web server 800 in the case where a URL to be transmitted is not a URL of the Web server 800 itself.

As shown in FIG. 24, first, if a horizontal URL notification button 812b of a URL 812a to be transmitted is pressed by a manager U2 of the Web server 800 in a URL input unit 812 of an interface 810 of the Web server 800 shown in FIG. 18 (S802), a PIN input request (for example, "please input pass codes displayed on a notified apparatus") is displayed in the PIN input unit 814 of the interface 810 (S804). Next, the Web server 800 determines whether the PIN is input to the PIN input unit 814 by the manager U2 in accordance with the PIN input request (S806). As the determined result, when the PIN is not input and the cancel button 814a is pressed by the manager U2 (S808), the Web server 800 completes a URL notification process (URL notification process failure). Meanwhile, as the determined result in Step S806, when the PIN is input by the manager U2 (S810), the Web server 800 transmits the URL information to be transmitted to the apparatus registration server 600 and the PIN (Y6) (S812), and completes a URL notification process (URL notification success).

Next, with reference to FIG. 25, a description is given to a flow of a URL notification process of a Web server 800 in the case where a URL to be transmitted is a URL of the Web server 800 itself.

Since the processes from Step S852 to Step S862 shown in FIG. 25 are the same as the processes from Step S802 to Step S812 shown in FIG. 24, the detailed description thereof will be omitted herein. Hereinafter, the processes starting from Step S864 will be described in detail.

As shown in FIG. 25, after the Web server 800 transmits the URL information to be transmitted and the PIN (Y6) to the apparatus registration server 600 in Step S862, the Web server 800 determines whether a Web connection from the terminal apparatus 400 is made (S864). As the determined result, when the Web connection is not made from the terminal apparatus 400 and the cancel button 814a is pressed by the manger U2 of the Web server 800 (S866), the Web server 800 completes a URL notification process (URL notification process failure). In addition, as the determined result in Step S864, when the Web connection is not made from the terminal apparatus 400 and the session completion notification is received from the apparatus registration server 600 (S868), the completion notification of the URL notification failure is UI-displayed in the interface 810 of the Web server 800 (S870), and a URL notification process is completed (URL notification failure). Meanwhile, as the determined result in Step S864, when the Web connection (Y9) is made from the terminal apparatus 400 (S872), the notification of the URL notification success is UI-displayed in the interface 810 of the Web server 800 (S874), and the URL notification process is completed (URL notification success).

In the above-described method, if the URL is notified from the Web server 800 to the terminal apparatus 400, it is possible to redirect a reference destination to desired contents without inputting a long and complicated URL, even in an apparatus that does not have an E-mail function. Therefore, it is possible to simply view the contents that are provided by the home server as the Web server.

Connection Authentication System According to a Third Embodiment of the Present Invention Next, a connection authentication system according to a third embodiment of the present invention will be described. In the connection authentication system according to this embodiment, when two terminals having no connection information are connected to each other through the Internet, the connection authentication system according to this embodiment executes an authentication process using key information that is issued to one terminal by an Internet server, and the Internet server acts as an intermediary when the two terminals exchange connection information with each other. These characteristics are the same as those of the first embodiment.

However, in the case of the first embodiment that has been described above, when another apparatus other than the connected apparatus 100 and the connection apparatus 200 continuously input proper PIN codes, another apparatus may accidentally input the same PIN codes as the PIN codes that are issued to the connected apparatus 100. In this case, another apparatus may become the connection apparatus 200 and acquire the connection information of the connected apparatus 100. For this reason, there is room for the improvement from the viewpoint of security.

Accordingly, in the connection authentication system according to this embodiment, when the key information is notified from the connection apparatus to the connection authentication server, a confirmation process needs to be executed to confirm whether an apparatus that has notified the key information is a connection apparatus that exchanges connection information with the connected apparatus. Specifically, when the key information is notified from the connection apparatus to the connection authentication server, the connection authentication server issues confirmation information used to execute the confirmation process (for example, PIN where the available period is set) to both the connected apparatus and the connection apparatus. In addition, the fact that the confirmation information issued to both the connected apparatus and the connection apparatus is the same is confirmed between the connected apparatus and the connection apparatus. After the notification indicating the confirmation is notified (confirmation process) from the connected apparatus to the connection authentication server, the connection authentication server provides connection information of a connection counterpart to the connected apparatus and the connection apparatus.

That is, in this embodiment, when the connection information is provided, the connection authentication server provides the connection information to both the connection apparatus and the connected apparatus. The connection information is provided only after the confirmation process is executed using the confirmation information, thereby further improving security. Hereinafter, the connection authentication system according to the third embodiment will be described in detail.

(Entire Configuration of Connection Authentication System and Outline of Connection Authentication Method According to a Third Embodiment)

Figure 26:
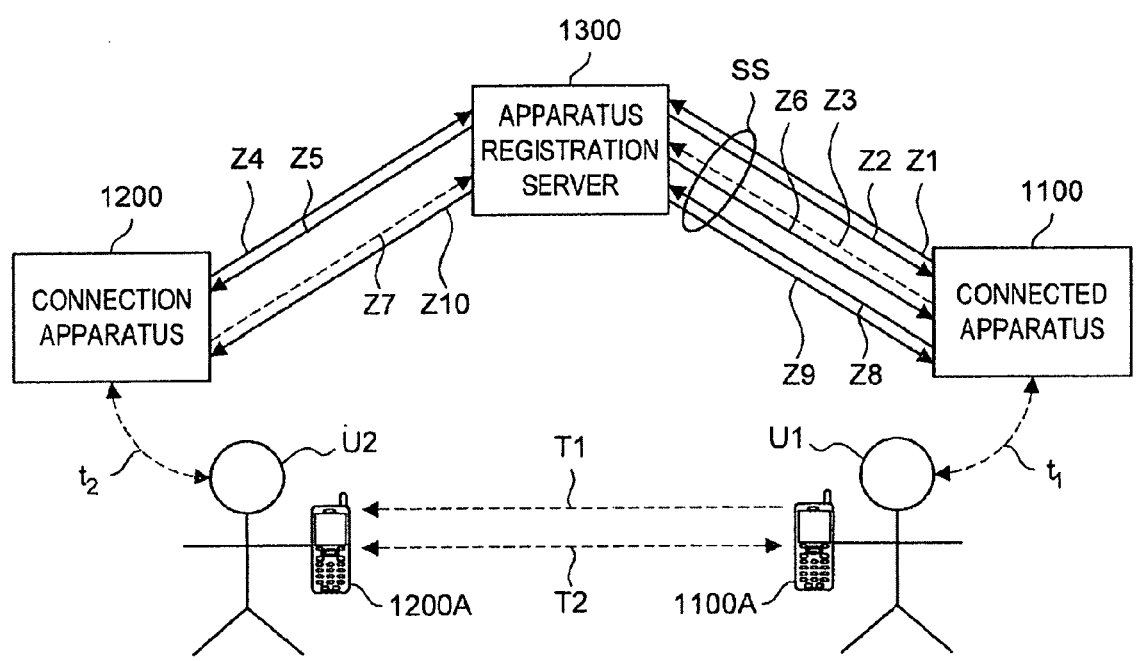
FIG. 26 is a diagram illustrating the entire configuration of a connection authentication system according to a third embodiment of the present invention.

First, based on FIG. 26, the entire configuration of a connection authentication system and the outline of a connection authentication method according to this embodiment will be described. FIG. 26 is a diagram illustrating the entire configuration of a connection authentication system according to this embodiment.

In the below description of the connection authentication system, as an example of a connection authentication system according to this embodiment, an apparatus registration system 30 is exemplified.

As shown in FIG. 26, the apparatus registration system 30 includes a connected apparatus 1100 that is an example of a first terminal apparatus according to this embodiment, a connection apparatus 1200 that is an example of a second terminal apparatus according to this embodiment, and an apparatus registration server 130 that is an example of a connection authentication server according to this embodiment.

In the apparatus registration system 30, when each of the connected apparatus 1100 and the connection apparatus 1200 does not have connection information (for example, a URL, an IP address, a port number, a certificate of each apparatus, and the like) on a counterpart apparatus, an exchange of connection information between the connected apparatus 1100 and the connection information 1200 (hereinafter, it may be called "apparatus registration") is performed through the apparatus registration server 1300. That is, the apparatus registration server 1300 is connected to the connected apparatus 1100 and the connection apparatus 1200 through a network, performs connection authentication and an authentication process thereon between the connected apparatus 1100 and the connection apparatus 1200, and provides to the connection apparatus 1200 and the connected apparatus 1100 the connection information acquired from the connection apparatus 1200 to the connected apparatus 1100.

Examples of the connected apparatus 1100 and the connection apparatus 1200 may include a personal computer (PC), a personal video recorder (PVR), a television tuner, a set top box (STB), a digital camera, a digital video camera, a mobile phone, a personal digital assistants (PDA), a game machine, a stereo set, or a digital music device, which is an apparatus that is connected to a home network standardized by a digital living network (DLNA) and used. However, the connected apparatus 1100 and the connection apparatus 1200 are not limited to an electronic apparatus that constitutes the home network according to the standard, such as the DLNA, and may be a refrigerator or a rice cooker. Further, an information processing apparatus, such as a PC, may be exemplified as the apparatus registration server 1300.

Each of the connected apparatus 1100 and the connection apparatus 1200 previously has information (for example, a URL, a server certificate, and the like) that is needed to have access to the apparatus registration server 1300. Based on the above information, the connected apparatus 1100 and the connection apparatus 1200 can be connected to the apparatus registration server 1300. Hereinafter, the outline of an apparatus registration method in the apparatus registration system 30 will be described.

First, based on the information, such as a URL or a certificate of the apparatus registration server 1300, the connected apparatus 1100 has access to the apparatus registration server 1300 and transmits (Z1) of an issuing request of key information (for example, registration codes of a PIN or the like) for an apparatus that is needed to register the connection apparatus 1200. After receiving the issuing request of the key information from the connected apparatus 1100, the apparatus registration server 1300 newly generates key information or issues key information that is not used among key information possessed by the apparatus registration server 1300, and transmits the key information to the connected apparatus 1100 (Z2). At this time, as the issued key information, it is preferable to use key information having a set available period (for example, PIN in which an available period is short as about five minutes), because the amount of information that is possessed by the apparatus registration server 1300 is small and network safety between the connected apparatus 1100 and the connection apparatus 1200 is high. Further, the apparatus registration sever 1300 establishes a session SS with a transmission destination (connected apparatus 1100 in this embodiment) of the key information. When the available period is set to the issued key information, the session SS is maintained for only the available period.

Next, the key information that is acquired by the connected apparatus 1100 in the above-described method is notified to the user U1 of the connected apparatus 1100 ($t_1$). The user U1 who receives the key information uses a predetermined notifying unit such as communication between the telephones 100A and 200A to notify the user U2 of the connection apparatus 1200 of the key information that is issued by the apparatus registration server 1300 by using a predetermined notifying unit, such as communication between a telephone 1100A and a telephone 1200A (T1).

In this case, the predetermined notifying unit that is used to transmit the key information from the user U1 to the user U2 is a notifying unit that safely and securely notifies only a specific counterpart of information. A representative example of the predetermined notifying unit may be a telephone, but the present invention is not limited thereto. As the predetermined notifying unit, in addition to the above example, a method may be used, in which the connection apparatus 1200 mounts a modem thereto, the user U2 of the connection apparatus 1200 uses the modem to have a direct conversation with the user U1 of the connected apparatus 1100 by a telephone, and the key information is exchanged with the users. In the case of the above method, because of a security issue, it is preferable to prevent the key information from being automatically transmitted through the configuration in which the key information is received only while the user U2 of the connection apparatus 1200 presses a button. If another notifying unit through a user exists, this is one of credit conditions at the time of apparatus registration. Thus, if the notifying unit has a full automatic type, there is an issue in terms of security. As another notifying unit, a method is considered in which a "registration execution file" for executing apparatus registration that is a program created by the connected apparatus 1100 is transmitted to the connection apparatus 1200 through a unit, such as an E-mail, and the connection apparatus 1200 that receives the registration execution file through the E-mail executes the corresponding program.

In addition, when the key information is notified from the connection apparatus to the connection authentication server after the key information is acquired, the connected apparatus 1100 starts polling to acquire confirmation information that is used when a confirmation process is executed on whether an apparatus that performs the notification of the key information is a connection apparatus that exchanges connection information with the connected apparatus (Z3). However, the acquisition information of the confirmation information is not limited to only the polling. For example, the key information may be transmitted once from the connected apparatus 1100 to the apparatus registration server 1300, and the apparatus registration server 1300 may transmit the confirmation information at the proper point of time while maintaining the session (for example, TCP connection) with the connected apparatus 1100.

After the key information is notified, the user U2 inputs the corresponding key information to the connection apparatus 1200 ($t_2$). The connection apparatus 1200 that has received the key information transmits the corresponding key information and connection information (for example, an IP address, a port number, a URL, and a certificate of the connection apparatus 200) that is needed to have access to the connection apparatus 1200 (Z4). At this time, when the available period is set to the key information, the input ($t_2$) of the key information by the user U2 and the transmission (Z4) of the key information and the connection information of the connection apparatus 1200 need to be performed within the corresponding available period. When the input ($t_2$) of the key information and the transmission (X4) of the key information and the transmission (Z4) of the connection information of the connection apparatus 1200 are not performed within the corresponding available period, the available period is finished and the session SS expires.

After receiving the key information and the connection information of the connection apparatus 1200 from the connection apparatus 1200, the apparatus registration server 1300 collates the key information issued to the connected apparatus 1100 and the key information received from the connection apparatus 1200. As the collating result, when the two key information are matched with each other, the apparatus registration server 1300 issues confirmation information in response to a notification of the key information from the connection apparatus 1200 (Z5). When the connection apparatus 1200 receives confirmation information from the apparatus registration server 1300 (Z5), the connection apparatus 1200 notifies the user U2 of the connection information ($t_2$).

In addition, after issuing the confirmation information to the connection apparatus 1200, the apparatus registration server 1300 issues the same confirmation information as the confirmation information issued to the connection apparatus 1200 in response to the polling of the confirmation information acquisition first received from the connected apparatus 110 (Z6). When the confirmation information is issued to the connected apparatus 1100, first, the apparatus registration server 1300 determines whether a session SS is established with the connected apparatus 1100. When the session SS is established at the time of point of the determination, the apparatus registration server 1300 uses the session SS to transmit the confirmation information to the connected apparatus 1100. In addition, because connection safety between the connected apparatus 1100 and the connection apparatus 1200 is high, similar to the key information, it is preferable to use information where an available period is set (for example, PIN where an available restriction time is short as about five minutes) as the confirmation information.

Further, after receiving the confirmation information, the connection apparatus 1200 starts polling to acquire connection information (for example, an IP address, a port number, a URL, and a certificate of the connected apparatus 100) that is needed to have access to the connected apparatus 1100 (Z7). However, the acquisition information of the connection information of the connected apparatus 1100 is not limited to only the polling. For example, the key information may be transmitted once from the connection apparatus 1200 to the apparatus registration server 1300, and the apparatus registration server 1300 may transmit the connection information of the connected apparatus 1100 at the proper point of time while maintaining the session (for example, TCP connection) with the connection apparatus 1200.

When receiving (Z6) the confirmation information from the apparatus registration server 1300, the connected apparatus 1100 notifies the user U1 of the confirmation information ($t_1$). The user U1 who has received the confirmation information uses a predetermined notifying unit such as communication between the telephones 1100A and 1200A with the user U2 of the connection apparatus 1200 to confirm whether the authentication information issued from the apparatus registration server 1300 is the same in the connected apparatus 1100 and the connection apparatus 1200 (T2). In this case, similar to the notifying unit that notifies the key information from the user U1 to the user U2, the predetermined unit that is used to confirm whether the confirmation information is the same between the users U1 and U2 is a notifying unit that safely and securely notifies only a specific counterpart of information. A representative example of the predetermined notifying unit may be a telephone, but the present invention is not limited thereto. As the predetermined notifying unit, in addition to the above example, a method may be used, in which the connection apparatus 1200 mounts a modem thereto, the user U2 of the connection apparatus 1200 uses the modem to have a direct conversation with the user U1 of the connected apparatus 1100 by a telephone, and the key information is exchanged with the users. In the case of the above method, because of a security issue, it is preferable to prevent the key information from being automatically transmitted through the configuration in which the key information is received only while the user U2 of the connection apparatus 1200 presses a button. If another notifying unit through a user exists, this is one of credit conditions at the time of apparatus registration. Thus, if the notifying unit has a full automatic type, there is an issue in terms of security. As another notifying unit, a method is considered in which a "registration execution file" for executing apparatus registration that is a program created by the connected apparatus 1100 is transmitted to the connection apparatus 1200 through a unit, such as an E-mail, and the connection apparatus 1200 that receives the registration execution file through the E-mail executes the corresponding program.

As the confirmation result between the user U1 and the user U2, when it is determined that the confirmation information is not the same, the connected apparatus 1100 notifies the apparatus registration server 1300 of the confirmation result (Z8). The apparatus registration server 1300 that has received from the confirmation result does not provide the connection information of the connected apparatus 1100 to the apparatus that has notified the key information. Meanwhile, as the confirmation result between the user U1 and the user U2, when it is determined that the confirmation information is the same, the connected apparatus 1100 notifies the apparatus registration server 1300 of the message indicating that the confirmation information is confirmed to be the same (Z8). Further, at the time of the notification of Z8, the connected apparatus 1100 transmits the connection information of the connected apparatus 1100 (for example, an IP address, a port number, a URL, and a certificate of the connection apparatus 1100) (Z8). After receiving the confirmation notification and the connection information of the connected apparatus 1100, the apparatus registration server 1300 transmits the connection information of the connection apparatus 1200 to the connected apparatus 1100 in response to the received information (Z9).

When receiving (Z9) the connection information of the connection apparatus 1200 from the apparatus registration server 1300, the connected apparatus 1100 executes an apparatus registration process on the connection apparatus 1200 based on the received connection information.

Further, after receiving the confirmation notification from the connected apparatus 1100, the apparatus registration server 1300 transmits the connection information of the connected apparatus 1100 in response to the polling of the connection information acquisition of the connected apparatus 1100 that is first received from the connection apparatus 1200 (Z10). When the connection information of the connected apparatus 1100 is transmitted to the connection apparatus 1200, first, it is determined whether the session SS is established with the connection apparatus 1200. When the session SS is established at the point of time of the determination, the confirmation information is transmitted to the connection apparatus 1200 using the session SS.

When receiving the connection information of the connected apparatus 1100 from the apparatus registration server 1300 (Z10), the connection apparatus 1200 executes an apparatus registration process on the connected apparatus 1100 based on the received connection information.

The connection between the individual apparatuses when the above process is executed in the apparatus registration system 30 can be performed by an SSL that is accompanied with server authentication.

In this way, an apparatus registration process that exchanges connection information of the connected apparatus 1100 and the connection apparatus 1200 with each other is executed between the connected apparatus 100 and the connection apparatus 200, thereby executing an apparatus registration process. After the apparatus registration process is executed, the connected apparatus 1100 and the connection apparatus 1200 directly communicate with each other without using the apparatus registration server 1300. The connection between the connected apparatus 1100 and the connection apparatus 1200 in the communication can be made by the SSL that performs client authentication and server authentication using the certificates of the counterpart apparatuses that are obtained by the connected apparatus 1100 and the connection apparatus 1200.

As such, in the apparatus registration system 30, an apparatus registration process between the connected apparatus 1100 and the connection apparatus 1200 is executed by the apparatus registration server 300 that is connected to the connected apparatus 1100 and the connection apparatus 1200. However, different from a method using an IM in the related art, an Internet server (apparatus registration server 1300 in this embodiment) is used only at the time of initial registration. Therefore, a frequency of having access to the Internet server can be reduced. When the available period is set to the key information that is used at the time of apparatus registration, the key information may be held during only the effective period, and the session may be maintained. Thus, it is possible to reduce the amount of information that needs to be continuously stored by the Internet server. Accordingly, it is possible to reduce a load of the Internet server in terms of cost.

Further, in the apparatus registration system 30, after the direction communication is enabled between the connected apparatus 1100 and the connection apparatus 1200 by the apparatus registration though the apparatus registration server 1300, it is possible to start an arbitrary application without depending on the apparatus registration.

As such, according to the apparatus registration system 30 according to this embodiment, since the direction communication is enabled between the connected apparatus 1100 and the connection apparatus 1200 after the apparatus registration, the frequency of having access to the apparatus registration server 1300 can be reduced to one time at the time of the apparatus registration, and the load of the apparatus registration server 1300 can be alleviated. In addition, since the key information that is issued by the apparatus registration server 1300 can be held for only the predetermined time, the apparatus registration server 1300 may hold connection information of the individual apparatuses (the connected apparatus 1100 and the connection apparatus 1200) or the key information for only the predetermined time. In addition, the amount of information that is held by the apparatus registration server 1300 can be reduced. Further, at the time of the apparatus registration, if the user U2 inputs simple key information (for example, PIN composed of several digits), the user U2 does not need to input information, such as a character string such as a URL, a model number, a serial number, and a utilized port. Accordingly, the apparatus registration can be simply performed through the simple work.

In addition, according to the apparatus registration system 30, only after it is confirmed that the confirmation information is the same between the connected apparatus 1100 and the connection apparatus 1200, the connection information can be provided between the connected apparatus 1100 and the connection apparatus 1200. Accordingly, security can be further improved, as compared with the apparatus registration system 10 according to the first embodiment. Different from the case of the first embodiment, the provision of the connection information of the connected apparatus 1100 and the connection apparatus 1200 is made by the apparatus registration server 1300. Thus, a relationship of a server and a client is not fixed between the connected apparatus 1100 and the connection apparatus 1200. For this reason, a variety of information can be easily exchanged.

The entire configuration of the apparatus registration system 30 as an example of the connection authentication system and the outline of the connection authentication method according to this embodiment have been described. Next, the configuration of each of the apparatuses that constitute the above-described apparatus registration system 30 and a process flow in each of the apparatus will be described in detail.

In regards to the hardware configuration, the connected apparatus 1100, the connection apparatus 1200, and the apparatus registration server 1300 according to this embodiment are the same as the connected apparatus 100, the connection apparatus 200, and the apparatus registration server 300 according to the above-described first embodiment, and thus the detailed description thereof will be omitted.

(Functional Configuration of Connected Apparatus 1100)

Figure 27:
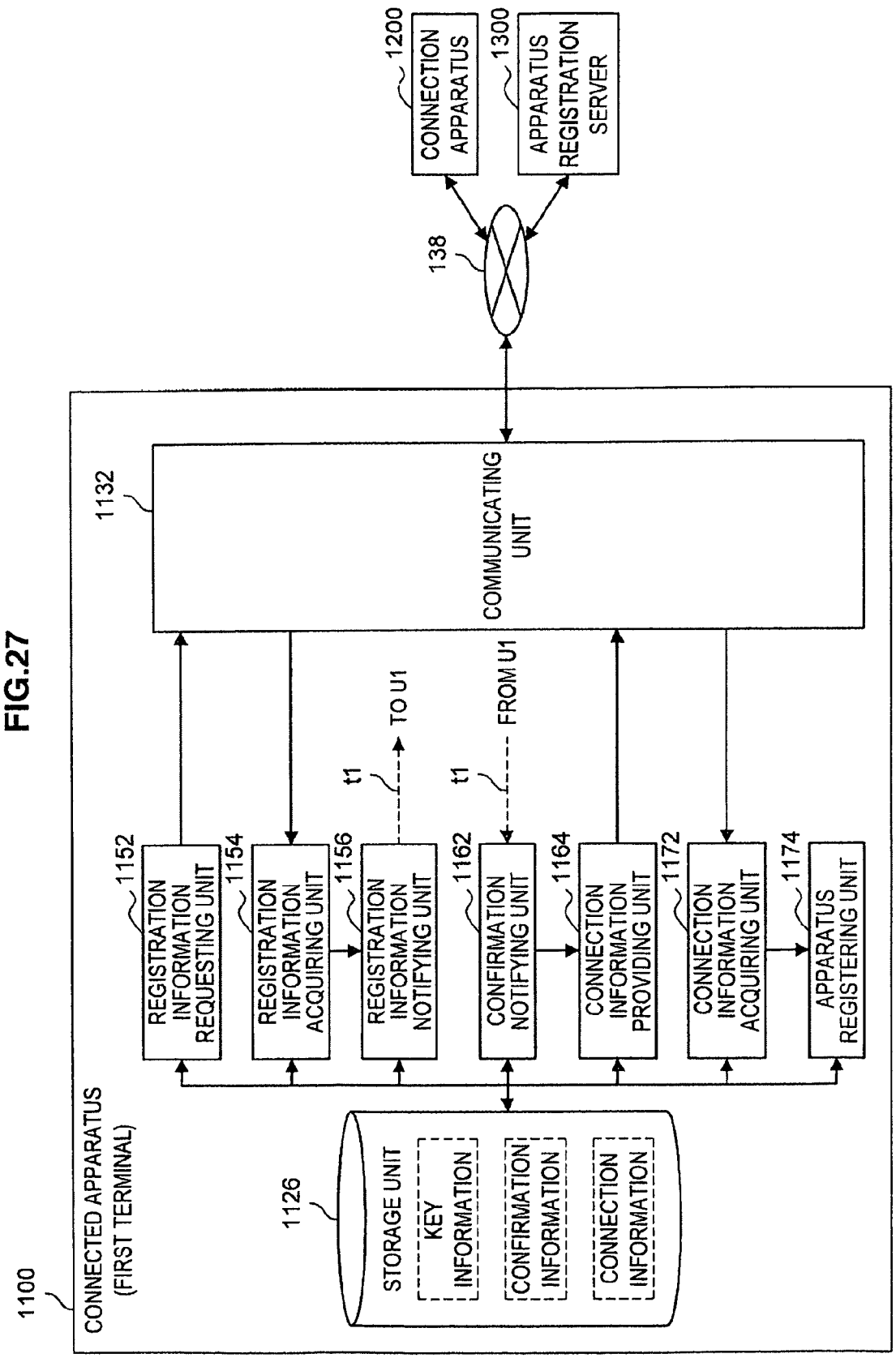
FIG. 27 is a diagram illustrating the functional configuration of a first terminal apparatus according to the embodiment.

Next, based on FIG. 27, the hardware configuration of the connected apparatus 1100 will be described. FIG. 27 is a diagram illustrating the hardware configuration of a connected apparatus 1100.

As shown in FIG. 27, the connected apparatus 1100 mainly includes a storage unit 1126, a registration information requesting unit 1152, a registration information acquiring unit 1154, a registration information notifying unit 1156, a confirmation notifying unit 1162, a connection information providing unit 1164, a connection information acquiring unit 1172, an apparatus registering unit 1174, and a communicating unit 1132.

The functional configuration of the connected apparatus 110 is realized by the hardware configuration shown in FIG. 3. Further, each functional block shown in FIG. 27 may be realized software-like by the CPU 106 based on the program that can be accessed through the ROM 108, the RAM 110, the storage unit 126, the removable recording medium 134, the external connection apparatus 136, or the communication network 138, and may be composed of dedicated hardware for realizing a function of each program.

The storage unit 1126 is a storage unit in which the key information acquired from the apparatus registration server 1300, confirmation information acquired from the apparatus registration server 1300, and the connection information of the connection apparatus 1200 acquired from the connection apparatus 1200 through the apparatus registration server 1300 are recorded. Further, the connection information of the connected apparatus 1100 itself and information that is needed to have access to the apparatus registration server 300 are stored in the storage unit 1126 in advance. Examples of the connection information of the connected apparatus 1100 may include an IP address of the connected apparatus 1100, a port number or a URL, and a certificate that is used to authenticate the connected apparatus 1100. Examples of the information that is needed to have access to the apparatus registration server 1300 may include information of a URL or a certificate of the apparatus registration server 1300. In this case, the certificate of the apparatus registration server 1300 does not need to be information for every apparatus (terminal). A common certificate that is used to have access to the apparatus registration server 1300 may be stored in a plurality of apparatuses in advance (at the time of factory shipment). Further, the detailed contents of the key information, the confirmation information, and the connection information of the connection apparatus 1200 will be described in detail later.

The registration information requesting unit 1152 extracts information that is stored in the storage unit 1126 and needed to have access to the apparatus registration server 1300 (for example, a URL and a certificate of the apparatus registration server 1300). After the communicating unit 1132 has access to the apparatus registration server 1300 through the communication network 138, such as the Internet, based on the extracted information, the registration information requesting unit 1152 transmits an issuing request of the key information (for example, PIN) to the apparatus registration server 1300 using the communicating unit 132. Further, the registration information acquiring unit 1154, which will be described later, may function as the registration information requesting unit 1152. Further, after the registration information acquiring unit 1154 acquires the key information, the registration information requesting unit 1152 starts polling to acquire the confirmation information. In this case, the confirmation information is information (for example, codes of the PIN or the like) that is used to execute a confirmation process that confirms whether an apparatus that has notified the key information is the connection apparatus 1200 exchanging with the connection information with the connected apparatus 1100, when the key information is notified from the connection apparatus 1200 to the apparatus registration server 1300. However, the acquisition information of the confirmation information by the registration information requesting unit 1152 is not limited to only the polling. For example, the key information may be transmitted once from the connected apparatus 1100 to the apparatus registration server 1300, and the apparatus registration server 1300 may transmit the confirmation information at the proper point of time while maintaining the session (for example, TCP connection) with the connected apparatus 1100.

The registration information acquiring unit 1154 acquires the key information or the confirmation information, which is issued by the apparatus registration server 1300 in accordance with the issuing request of the key information or the confirmation information by the key information requesting unit 1152, through the communicating unit 1132. The registration information acquiring unit 1154 temporarily records the acquired key information or the confirmation information in the temporary storage unit 1126 or directly transmits the acquired key information to the registration information notifying unit 1156.

The registration information notifying unit 1156 outputs the key information extracted from the storage unit 1126 or the key information or the confirmation information received from the registration information acquiring unit 1154 using the output unit 122 (refer to FIG. 3), and notifies the user U1 of the key information or the confirmation information ($t_1$). As a notification method, the following methods may be considered. In one method, a display device is used as the output unit 122, key information or the confirmation information is displayed on the display device, and the key information or the confirmation information is visually notified to the user U1. In another method, a speaker is used as the output unit 122 and key information or the confirmation information is auditorily notified to the user U1 through a voice from a speaker.

The confirmation notifying unit 1162 notifies the apparatus registration server of a result obtained by confirming (confirming process) whether the confirmation information issued from the apparatus registration server 1300 is the same in the connected apparatus 1100 and the connection apparatus 1200. The confirmation process is executed between the user U1 of the connected apparatus 1100 and the user U2 of the connection apparatus 1200 using a predetermined communication unit, such as a telephone. In this case, the predetermined communication unit that is used to confirm whether the confirmation information is the same between the user U1 and the user U2 is a notifying unit that safely and securely notifies only a specific counterpart of information. A representative example of the predetermined notifying unit may be a telephone, but the present invention is not limited thereto. Further, the confirmation notifying unit 1162 notifies the apparatus registration server 1300 of the result of the confirmation process input to the input unit 120 (refer to FIG. 3) by the user U1. When the confirmation information is the same in the connected apparatus 1100 and the connection apparatus 1200 as the result of the confirmation process, the confirmation notifying unit 1162 notifies the connection information providing unit 1164 of the result.

When receiving the notification indicating that the confirmation information is the same in the connected apparatus 1100 and the connection apparatus 1200 from the confirmation notifying unit 1162, the connection information providing unit 1164 transmits the connection information of the connected apparatus 1100 (for example, an IP address, a port number or a URL, and a certificate of each apparatus) to the apparatus registration server 1300.

When the confirmation information is the same in the connected apparatus 1100 and the connection apparatus 1200, the connection information of the connected apparatus 1100 (for example, an IP address, a port number or a URL, and a certificate of each apparatus) from the apparatus registration server 1300 having received the confirmation notification through the communication network 138. The connection information acquiring unit 1172 records the acquired connection information of the connection apparatus 1200 in the temporary storage unit 1126 or transmits the acquired connection information to the apparatus registration server 1174.

The apparatus registering unit 1174 executes an apparatus registration process on the connection apparatus 1200 based on the connection information of the connection apparatus 1200 extracted from the storage unit 1126 or the connection information of the connection apparatus 1200 transmitted from the connection information acquiring unit 1172. After the apparatus registration process is executed, the connected apparatus 1100 can directly have access to the connection apparatus 1200.

The communicating unit 1132 performs transmission of a key information (confirmation information) acquisition request with respect to the apparatus registration server 1300, reception of the key information (and confirmation information) from the apparatus registration server 1300, reception of the connection information of the connection apparatus 1200 from the apparatus registration server 1300, and transmission of the connection information of the connected apparatus 1100 with respect to the apparatus registration server 1300.

(Functional Configuration of Connection Apparatus 1200)

Figure 28:
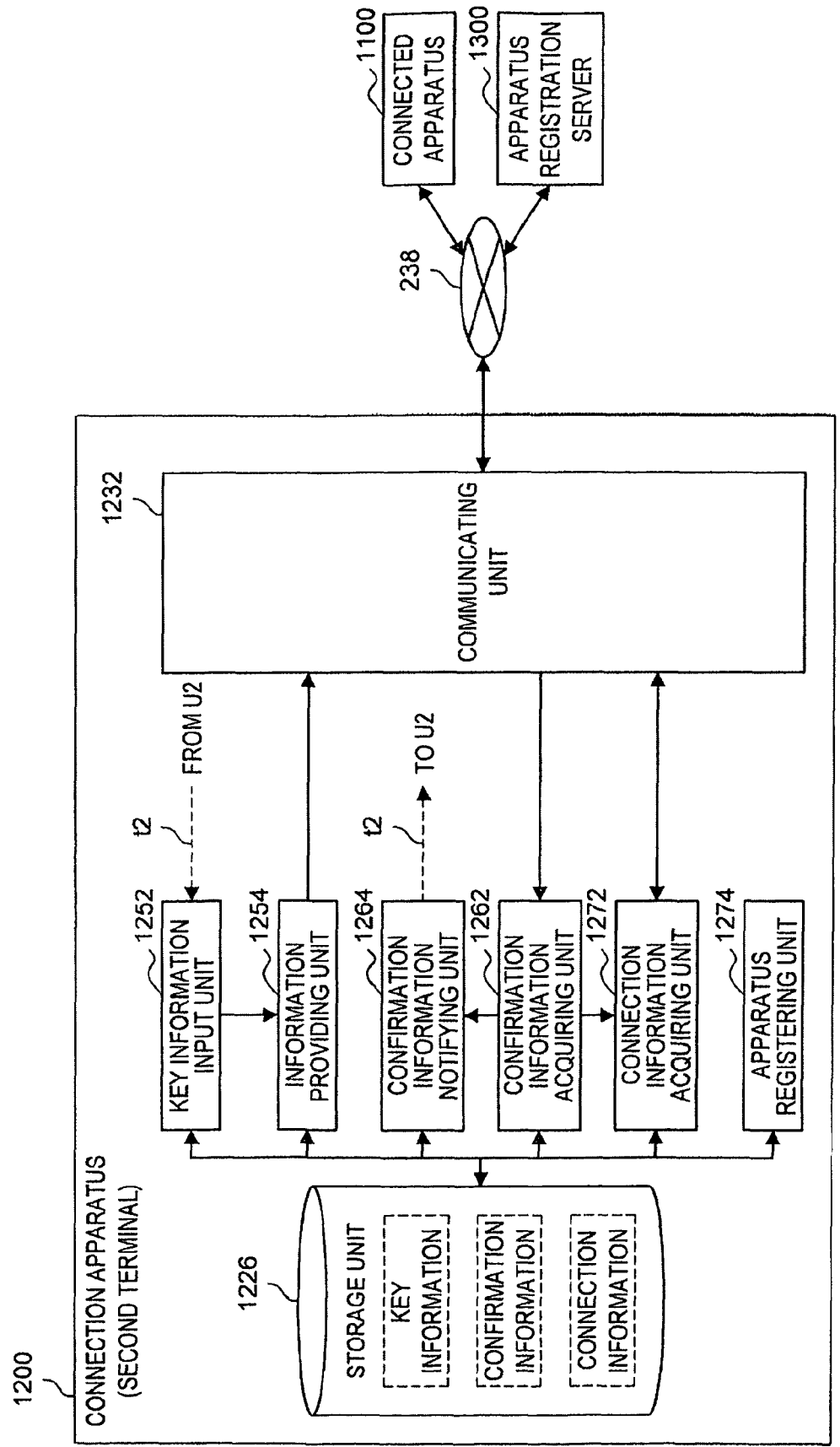
FIG. 28 is a diagram illustrating the functional configuration of a second terminal apparatus according to the embodiment.

Next, based on FIG. 28, the functional configuration of the connection apparatus 1200 will be described. FIG. 28 is a diagram illustrating the functional configuration of a connection apparatus 1200.

As shown in FIG. 28, the connection apparatus 1200 mainly includes a storage unit 1226, a key information input unit 1252, an information providing unit 1254, a confirmation information acquiring unit 1264, and a communicating unit 1232.

The functional configuration of the connection apparatus 1200 can be realized by the hardware configuration shown in FIG. 3, similar to the case of the above-described connected apparatus 1100.

The storage unit 1226 is a storage unit where the key information input to the key information input unit 1252 by the user U2, the confirmation information acquired from the apparatus registration server 1300, and the connection information of the connected apparatus 1100 acquired from the connected apparatus 1100 are recorded. Further, in the storage unit 1226, the connection information of the connection apparatus 1200 itself and information needed to have access to the apparatus registration server 1300 are stored in advance. Examples of the connection information of the connection apparatus 1200 may include an IP address of the connection apparatus 1200, a port number or a URL, and a certificate used to authenticate the connection apparatus 1200. The information that is used to have access to the apparatus registration server 1300 is the same as that in the case of the above-described connected apparatus 1100. Among them, the certificate of the apparatus registration server 1300 may be a certificate that is common to the connected apparatus 1100 or a certificate that is different from that of the connected apparatus 1100. For example, the certificate may be recorded in advance in the storage unit 1226 at the time of factory shipment. The details of contents of the key information will be described in detail later.

In the key information input unit 1252, after the key information is transmitted from the user U1 of the connected apparatus 1100 to the user U2 of the connection apparatus 1200, the key information is input by the user U2 ($t_2$). As an input method, the following methods are considered. In one method, a key board is used as the input unit 120 when the connection apparatus 1200 is a PC, a button or a remote controller is used as the input unit 120 when the connection apparatus 1200 is a television as the input unit 120, and a button or a touch panel is used as the input unit 120 when the connection apparatus 200 is a game machine, and the user U2 inputs the key information (for example, figures of several digits) notified from the user U1. In another method, the key information input unit 1252 temporarily records the input key information in the storage unit 1226 or directly transmits the input key information to the information providing unit 1254.

After the key information and the connection information of the connection apparatus 1200 are transmitted to the communicating unit 1232, the information providing unit 1254 provides the key information and the connection information of the connection apparatus 200 to the apparatus registration server 1300 through the communication network 138, such as the Internet. The key information that is provided to the apparatus registration server 1300 may be extracted from the storage unit 1226 by the information providing unit 1254 or may be directly transmitted from the key information input unit 1252 to the information providing unit 1254. Further, the connection information of the connection apparatus 1200 is extracted from the storage unit 1226 by the information providing unit 1254.

After the information providing unit 1254 transmits the key information to the apparatus registration server 1300, when the collating of the corresponding key information is performed in the apparatus registration server 1300 and the corresponding key information is matched with the key information issued to the connected apparatus 1100 as the collating result, the confirmation information acquiring unit 1262 acquires the confirmation information that is issued to the apparatus registration server 1300. The confirmation information acquiring unit 1262 records the acquired confirmation information to in the temporary storage unit 1226 or transmits the acquired confirmation information to the confirmation information notifying unit 1264. Further, the confirmation information acquiring unit 1262 transmits the notification indicating that the confirmation information is acquired to the connection information acquiring unit 1272.

The confirmation information notifying unit 1264 outputs the key information extracted from the storage unit 1226 or the authentication information received from the confirmation information acquiring unit 1262 using the output unit 122 (refer to FIG. 3), and notifies the user U2 of the confirmation information ($t_2$). As a notification method, the following methods may be considered. In one method, a display device is used as the output unit 122, key information or confirmation information is displayed on the display device, and the key information or confirmation information is visually notified to the user U2. In another method, a speaker is used as the output unit 122 and the key information or the confirmation information is auditorily notified to the user U2 through a voice from a speaker.

After receiving the notification indicating that the authentication information is acquired from the confirmation information acquiring unit 1262, the connection information acquiring unit 1272 starts polling to acquire the connection information that is used to have access to the connected apparatus 1100. However, the acquisition information of the connection information of the connected apparatus 1100 is not limited to only the polling. For example, the key information may be transmitted once from the connection apparatus 1200 to the apparatus registration server 1300, and the apparatus registration server 1300 may transmit the confirmation information of the connected apparatus 1100 at the proper point of time while maintaining the session (for example, TCP connection) with the connection apparatus 1200. When the connection information acquiring unit 1272 performs polling after the result of the confirmation process is notified from the confirmation notifying unit 1162 of the connected apparatus 1100 to the apparatus registration server 1300, the connection information acquiring unit 1272 acquires connection information (for example, an IP address, a port number or a URL, and a certificate of each apparatus) that is needed to have access to the connected apparatus 1100 from the apparatus registration server 1300. In addition, the connection information acquiring unit 1272 records the acquired connection information of the connected apparatus 1100 in the temporary storage unit 1226 or transmits the acquired connection information to the apparatus registering unit 1274.

The apparatus registering unit 1274 executes an apparatus registration process on the connected apparatus 1100 based on the connection information of the connected apparatus 1100 acquired from the storage unit 1226 or the connection information of the connected apparatus 1100 transmitted from the connection information acquiring unit 1272. After the apparatus registration process is executed, the connection apparatus 1200 can have direct access to the connected apparatus 1100.

The communicating unit 1232 performs transmission of an acquisition request of key information, connection information of the connection apparatus 1200, and connection information of the connected apparatus 1100 with respect to the apparatus registration server 1300, and reception of the confirmation information from the apparatus registration server 300 and the connection information of the connected apparatus 1100.

(Functional Configuration of Apparatus Registration Server 1300)

Figure 29:
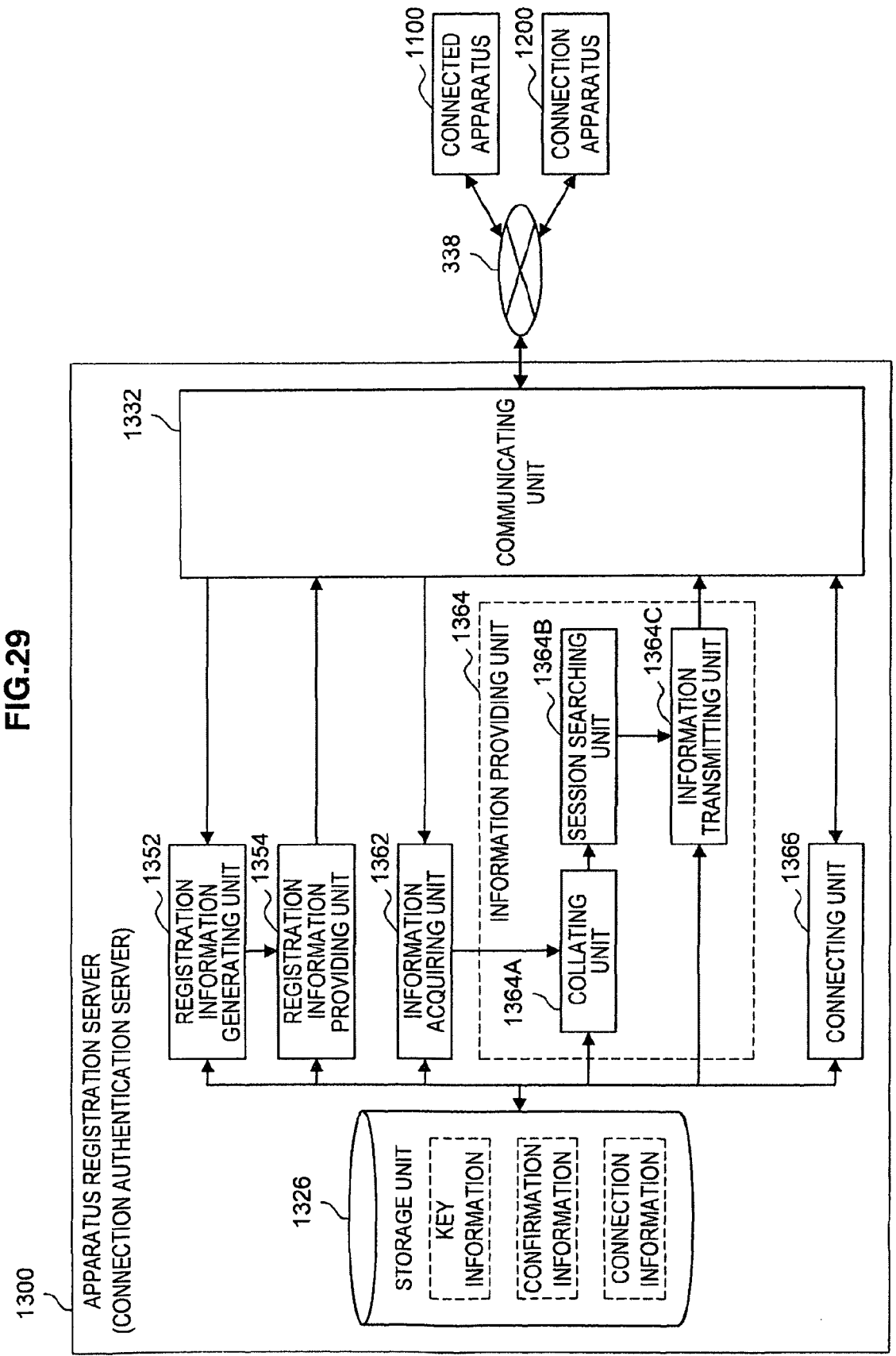
FIG. 29 is a diagram illustrating the functional configuration of a connection authentication server according to the embodiment.

Next, based on FIG. 29, the functional configuration of the apparatus registration server 1300 will be described. FIG. 29 is a diagram illustrating the functional configuration of an apparatus registration server 1300.

As shown in FIG. 29, the apparatus registration server 1300 mainly includes a storage unit 1326, a registration information generating unit 1352, a registration information providing unit 1354, an information acquiring unit 1362, an information providing unit 1364, a connecting unit 1366, and a communicating unit 1332.

The functional configuration of the apparatus registration server 1300 can be realized by the hardware configuration shown in FIG. 3, similar to the case of the above-described connected apparatus 100.

The storage unit 1326 is a storage unit where the connection information of the connected apparatus 1100 acquired from the connected apparatus 1100 and the connection information of the connection apparatus 1200 from the connection apparatus 1200 are recorded. Further, in the storage unit 1326, the key information or the confirmation information that is generated by the registration information generating unit 1352 and the certificate of the apparatus registration server 1300 are stored in advance. The certificate of the apparatus registration server 1300 may be generated for every connection counterpart apparatus (for example, the connected apparatus 1100 or the connection apparatus 1200), but may be common to a plurality of (all) apparatuses.

In this case, as the key information, for example, a PIN (Personal Identification Number) that is composed of figures of several digits can be used. However, the key information is not limited to the specific key information as long as the key information issued to the connected apparatus 1100 and the key information held by the connection apparatus 1200 accessed using the key information can be collated. For example, it is possible to use alphabets composed of several characters and a combination of figures and alphabets. As the authentication information, for example, a PIN that can be composed of figures of several digits can be used, but is not limited thereto, as long as the user U1 of the connected apparatus 1100 and the user U2 of the connection apparatus 1200 can confirm whether the connection information is the same using a communication unit, such as a telephone. As the key information or the confirmation information that is provided by the registration information providing unit 1354, which will be described in detail below, it is preferable to use key information or confirmation information (for example, PIN where an available restriction time is short as about five minutes) to which an available period is set, because the amount of information that is held by the apparatus registration server 1300 is small and the connection safety between the connected apparatus 1100 and the connection apparatus 1200 is high.

The registration information generating unit 1352 generates the key information that is to be issued to the connected apparatus 1100 and confirmation information that is to be issued to the connected apparatus 1100 and the connection apparatus 1200. The registration information generating unit 1352 may generate the key information in accordance with a key information acquisition request from the registration information requesting unit 1152 of the connected apparatus 1100 or may generate the key information at predetermined timing regardless of the key information acquisition request from the registration information requesting unit 1152. Further, the registration information generating unit 1352 may generate the confirmation information when the notification of the key information is received from the registration information requesting unit 1152 from the connection apparatus 1200 or may generate the confirmation information at predetermined timing regardless of the notification of the key information from the connection apparatus 1200. The registration information generating unit 1352 temporarily record the generated key information and authentication information in the temporary storage unit 1326 or directly transmit the generated key information and authentication information to the registration information providing unit 1354.

The registration information providing unit 1354 provides the key information to the connected apparatus 1100 through the communication network 338, such as the Internet. The registration information providing unit 1354 may directly receive key information that is newly generated by the registration information generating unit 1352 in accordance with the key information acquisition request of the connected apparatus 1100 and provide the key information. Alternatively, the registration information providing unit 1354 may selectively extract the key information that is not used with respect to any of the apparatuses among the key information recorded in the storage unit 1326 and provide the key information. Further, the registration information providing unit 1354 may directly receive confirmation information that is newly generated by the registration information generating unit 1352 in accordance with the notification of the key information of the connection apparatus 1200 and provide the key information. Alternatively, the registration information providing unit 1354 may selectively extract the confirmation information that is not used with respect to any of the apparatuses among the confirmation information recorded in the storage unit 1326 and provide the key information. The registration information providing unit 1354 issues to the connected apparatus 1100 the same confirmation information as the confirmation information issued to the connection apparatus 1200 in response to polling of the first confirmation information acquisition after the notification of the key information is made from the connection apparatus 1200.

After the registration information providing unit 1354 provides the key information to the connected apparatus 1100, a signal indicating that the key information is to be provided is transmitted from the registration information providing unit 1354 to the connecting unit 1366, and the connecting unit 1366 establishes a session with the connected apparatus 1100 that is a provision destination of the key information. When the available period is set to the key information, the session that is established with the connected apparatus 1100 is maintained during only the corresponding available period.

The information acquiring unit 1362 acquires the notification of the result of the confirmation process and the connection information of the connected apparatus 1100 from the connected apparatus 1100. Further, the information acquiring unit 1362 acquires the key information, the connection information of the connection apparatus 1200, and the acquisition request of the connection information of the connected apparatus 1100 from the connection apparatus 1200. The information acquiring unit 1362 temporarily records the acquired key information in the storage unit 1326 or directly provides the acquired key information to the information providing unit 1364 (specifically, a collating unit 1364A of the information providing unit 1364, which will be described later). Further, the information acquiring unit 1362 temporarily records the acquired connection information of the connected apparatus 1100 and the connection information of the connection apparatus 1200 in the storage unit 1326 or directly transmits the acquired connection information to the information providing unit 1364 (specifically, an information transmitting unit 1364C of the information providing unit 1364, which will be described later). In addition, the information acquiring unit 1362 transmits the notification of the result of the confirmation process and the acquisition request of the connection information of the connected apparatus 1100 to the information providing unit 1364 (specifically, the information transmitting unit 1364C of the information providing unit 1364, which will be described later).

First, the information providing unit 1364 collates the key information acquired from the connection apparatus 1200, which is directly received from the information acquiring unit 1362 or extracted from the storage unit 1326 and acquired from the connection apparatus 200, and the key information provided from the registration information providing unit 1354 to the connected apparatus 1100. As the collating result, when the two key information are matched with each other, the information providing unit 1364 transmits the notification indicating that the two key information are matched with each other to the registration information generating unit 1352. The registration information generating unit 1352 that has received the notification generates confirmation information.

As the result of the confirmation process from the connected apparatus 1100, when the information providing unit 1364 receives the notification indicating that the authentication information is the same from the information acquiring unit 1362, the information providing unit 1364 provides the connection information of the connection apparatus 1200 to the connected apparatus 1100. Further, when the information providing unit 1364 receives the acquisition request of the connection information of the connected apparatus 1100 from the connection apparatus 1200 from the information acquiring unit 1362 after receiving the notification that the confirmation information is the same from the connected apparatus 1100, the information providing unit 1364 provides the connection information of the connected apparatus 1100 to the connection apparatus 1200.

Further, in order to achieve the above function, the information providing unit 1364 mainly includes a collating unit 1364A, a session searching unit 1364B, and an information transmitting unit 1364C.

The collating unit 1364A collates the key information, which is directly received from the information acquiring unit 1362 or extracted from the storage unit 1326 and acquired from the connection apparatus 1200, and the key information provided from the registration information providing unit 1354 to the connected apparatus 1100. As the collating result, when the two key information are matched with each other, the collating unit 1364A transmits a signal indicating that the two key information are matched with each other to the session searching unit 1364B and the registration information generating unit 1352 and the matched key information to the session searching unit 1364B. Meanwhile, when the two key information are not matched with each other, the collating unit 1364A transmits a signal indicating that the two key information are not matched with each other to the connecting unit 1366. The connecting unit 1366 that has received the signal completes the session that is established with the connected apparatus 1100 and transmits the session completion notification to the connected apparatus 1100 and the connection apparatus 1200 through the communicating unit 1332.

When receiving the signal indicating that the key information acquired from the connection apparatus 1200 and the key information provided to the connected apparatus 1100 are matched with each other, the session searching unit 1364B searches whether the corresponding session exists in the key information received together with the signal. When the corresponding session exists, the session searching unit 1364B transmits the signal indicating that the corresponding session exists and information about the corresponding session to the information transmitting unit 1364C. Meanwhile, when the corresponding session does not exist, the session searching unit 1364B transmits the session completion notification to the connection apparatus 1200 through the communicating unit 1332.

When receiving the signal indicating that the session corresponding to the matched key information exists from the session searching unit 1364B, the information transmitting unit 1364C transmits the confirmation information to the apparatus (connected apparatus 1100 in this embodiment) where the corresponding session is established, based on information about the corresponding session received together with the signal.

Further, when receiving from the information acquiring unit 1362 the notification indicating that the confirmation information is the same as the result of the confirmation process form the connected apparatus 1100, the information transmitting unit 1364C provides the connection information of the connection apparatus 1200 to the connected apparatus 1100. Further, when the information transmitting unit 1364C receives the acquisition request of the connection information of the connected apparatus 1100 from the connection apparatus 1200 after receiving the notification indicating that the confirmation information is the same from the connected apparatus 1100, the information transmitting unit 1364C provides the connection information of the connected apparatus 1100 to the connection apparatus 1200.

The communicating unit 1332 performs reception of a key information acquisition request from the connected apparatus 1100, transmission of key information and the confirmation information to the connected apparatus 100, reception of the key information of the connected apparatus 1100 from the connected apparatus 1100, reception of the key information and connection information of the connection apparatus 1200 from the connection apparatus 1200, transmission of the connection information of the connection apparatus 1200 with respect to the connected apparatus 1100, and transmission of the connection information of the connected apparatus 1100 with respect to the connection apparatus 1200.

The functional configuration of each apparatus has been described. Next, a process flow in each apparatus will be described.

(Process Flow in Connected Apparatus 1100)

Figure 30B:
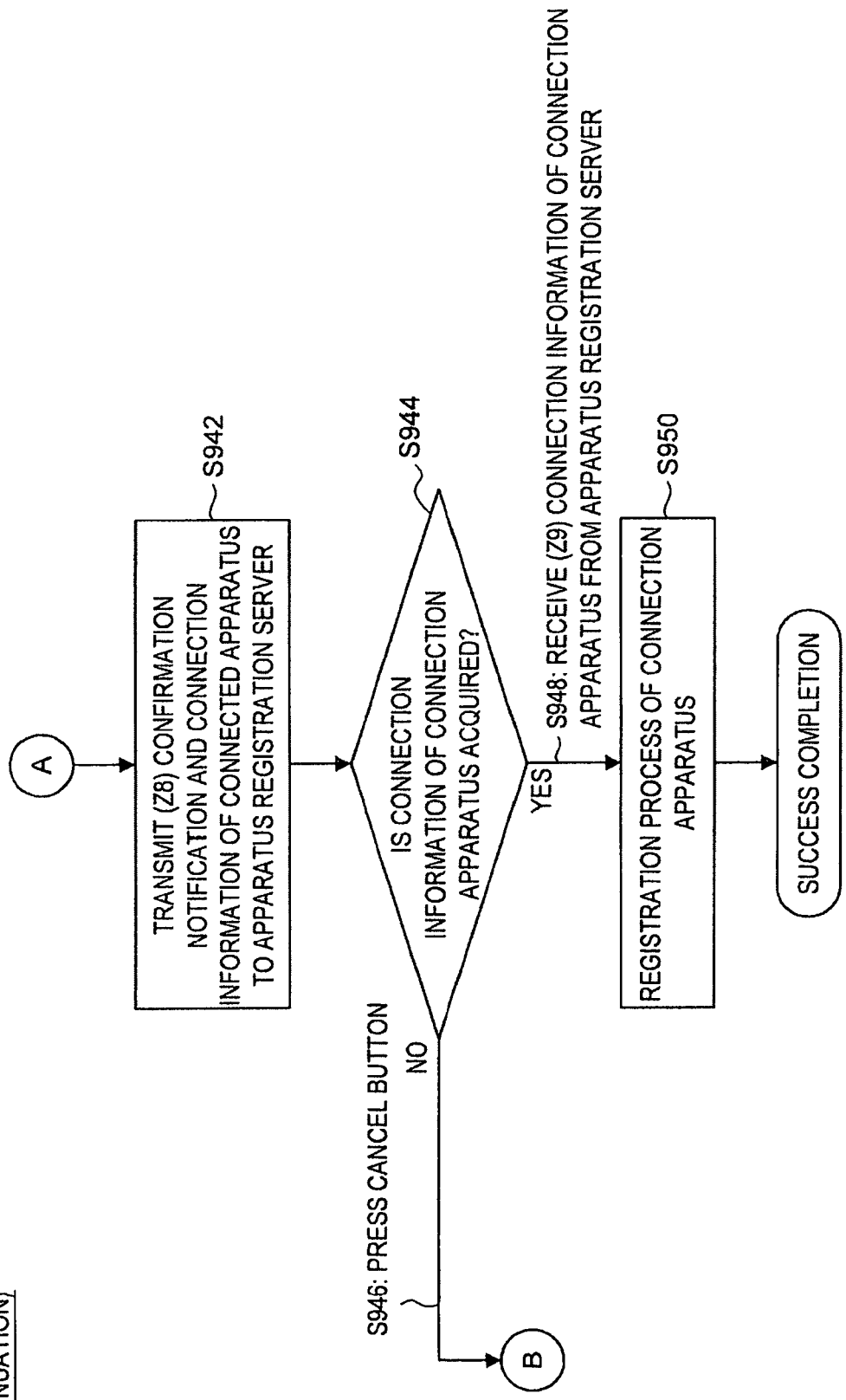
FIG. 30B is a flowchart illustrating a process flow in the first terminal apparatus according to the embodiment.

First, based on FIGS. 30A, 30B, and 31, a process flow in the connected apparatus 1100 will be described in detail. FIGS. 30A and 30B are flowcharts illustrating a process flow in a connected apparatus 1100, and FIG. 31 is a diagram illustrating an example of a display screen at the time of an apparatus registration process in a connected apparatus 1100. FIGS. 30A and 30B show the symbols (Z1 to X10, T1, and T2) of the individual processes shown in FIG. 26 together. In the below description, the case where a PIN to which an available period is set is used as key information and the confirmation information is exemplified.

Before describing the specific process flow in the connected apparatus 1100, the description is given to the configuration of a display screen at the time of an apparatus registration process in the connected apparatus 1100 shown in FIG. 31.

As shown in FIG. 31, on a display screen 1180 at the time of an apparatus registration process in the connected apparatus 1100, for example, a list 1182 of apparatuses registered in the connected apparatus 1100 (hereinafter, referred to as "registered apparatus list"), an apparatus registration start button 1184, a key information display screen 1186, and a confirmation information display screen 1192 are displayed.

In this example, in the registered apparatus list 1182, the user U1 is a grandfather and the user U2 is a grandchildren, and a PVR that is disposed in a house of the grandchildren and a game machine that is disposed in a house of Morita are all registered in the connected apparatus 1100 of the user U1. In this example, in the key information display screen 1186, a PIN 1188 (hereinafter, this may be called "registration codes") that is composed of a combination of figures three digits "493-718" is displayed as the key information, and a cancel button 1190 that is used to cancel an apparatus registration process is displayed. Further, in the confirmation information display screen 1192, a PIN 1194 (hereinafter, this may be called "confirmation codes") that is composed of a combination of figures three digits "118-526" is displayed as the confirmation information, and a confirmation button 1196 that is used to notify a result of the confirmation process and a confirmation cancel button 1198 are displayed. Hereinafter, based on FIGS. 30A and 30B and with reference to FIG. 31, a specific process flow in the connected apparatus 1100 will be described.

As shown in FIG. 30A, first, the apparatus registration start button 1184 is pressed by the user U1 of the connected apparatus 1100 (S902). If the apparatus registration start button 1184 is pressed, a signal indicating that the apparatus registration starts is transmitted to the registration information requesting unit 1152. The registration information requesting unit 1152 that has received the signal transmits an acquisition request (Z1) of the registration codes to the apparatus registration server 1300 (S904). Next, the CPU 106 of the connected apparatus 1100 determines whether the registration codes are acquired from the apparatus registration server 1300 (S906). As the determined result, when the registration codes are not acquired from the apparatus registration server 1300 and the cancel button 1190 is pressed by the user U1 of the connected apparatus 1100 (S908), the registration information requesting unit 1152 transmits the session completion notification to the apparatus registration server 1300 (S910), and completes an apparatus registration process (apparatus registration failure). As the determined result in Step S906, when the registration codes are not acquired from the apparatus registration server 1300 and the session completion notification is received from the apparatus registration server 1300 (S912), a completion notification of the apparatus registration failure is UI-displayed on the display screen 1180 of the connected apparatus 1100 (S914), and completes an apparatus registration process (apparatus registration failure). Meanwhile, as the determined result in Step S906, when the registration codes are received from the apparatus registration server 1300 (Z2) (S916), for example, the registration codes (PIN 1188) is displayed on the key information display screen 1186 by the output unit 122 (S918). The output method of the PIN 1188 is not limited to the above method, and a method using another output unit may be used, the detailed description of which is omitted because the description is given above.

Next, the user U1 who visually recognizes the PIN 1188 displayed on the key information display screen 1186 notifies (T1) the user U2 of the connection apparatus 1200 of the PIN 1188, by using a predetermined notifying unit that is capable of notifying information of only a specific counterpart such as a telephone (S920). The user U2 who receives the PIN 1188 inputs the PIN 1188 to the connection apparatus 1200.

Then, the registration information requesting unit 1152 transmits (Z3) the acquisition request (in this example, polling) of the confirmation information (confirmation codes) to the apparatus registration server 1300 (S922). After the connected apparatus 1100 transmits the acquisition request of the confirmation codes, the CPU 106 of the connected apparatus 1100 determines whether the confirmation codes are acquired from the apparatus registration server 1300 (S924). As the determined result, when the confirmation codes are not acquired from the apparatus registration server 1300 and the cancel button 1190 is pressed by the user U1 of the connected apparatus 1100 (S926), the session completion notification is transmitted to the apparatus registration server 1300 (S910), and an apparatus registration process is completed (apparatus registration failure). Further, as the determined result in Step S924, when the confirmation codes are not received from the apparatus registration server 1300 and the session completion notification is received from the apparatus registration server 1300 (S928), the completion notification of the apparatus registration failure is UI-displayed on the display screen 1180 of the connected apparatus 1100 (S914), and the apparatus registration process is completed (apparatus registration failure). Meanwhile, as the determined result in Step S924, when the confirmation codes are received (Z6) from the apparatus registration server 1300 (S930), for example, the confirmation codes (PIN 1194) is displayed on the confirmation information display screen 1192 by the output unit 122 (S932). The output method of the PIN 1194 is not limited to the above method, and a method using another output unit may be used, the detailed description of which is omitted because the description is given above.

Next, the user U1 who visually recognizes the PIN 1194 displayed on the confirmation information display screen 1192 confirms (T2) where the confirmation codes issued to the connected apparatus 1100 and the connection apparatus 1200 are the same, with the user U2 of the connection apparatus 1200 of the PIN 1188, by using a predetermined notifying unit that is capable of notifying information of only a specific counterpart such as a telephone (S934).

As the confirmed (T2) result, the CPU 106 of the connected apparatus 1100 determines whether the confirmation button 1196 is pressed by the user U1 or the confirmation cancel button 1198 is pressed (S936). As the determined result, when the confirmation cancel button 1198 is pressed by the user U1 (S938), the session completion notification is transmitted to the apparatus registration server 1300 (S910), and the apparatus registration process is completed (apparatus registration failure). Meanwhile, as the determined result in Step S936, when the confirmation button 1196 is pressed by the user U1 (S940), as shown in FIG. 30B, the connected apparatus 1100 transmits (Z8) the notification of the result of the confirmation process and the connection information of the connected apparatus 1100 to the apparatus registration server 1300 (S942).

Then, the CPU 106 of the connected apparatus 100 determines whether the connection information of the connection apparatus 1200 is acquired (S944). As the determined result, when the connection information of the connection apparatus 1200 is not acquired and the cancel button 1190 is pressed by the user U1 (S946), the session completion notification is transmitted to the apparatus registration server 1300 (S910), and the apparatus registration process is completed (apparatus registration failure). Meanwhile, as the determined result in Step S944, when the connection information of the connection apparatus 1200 is received (Z9) from the apparatus registration server 1300 (S948), a registration process on the connection apparatus 1200 is executed based on the received connection information (S950) and the apparatus registration process on the connection apparatus 1200 is completed (apparatus registration success). As such, if the apparatus registration process is executed, the connection apparatus 1200 is added to the registered apparatus list 1182 of the display screen 1180.

(Process Flow in Connection Apparatus 1200)

Next, based on FIGS. 32A and 32B and FIG. 33, a process flow in the connection apparatus 1200 will be described in detail. FIGS. 32A and 32B are flowcharts illustrating a process flow in a connection apparatus 1200, and FIG. 33 is a diagram illustrating an example of a display screen at the time of an apparatus registration process in a connection apparatus 1200. FIGS. 32A and 32B show the symbols (Z1 to Z10, T1, and T2) of the individual processes shown in FIG. 26 together. The case where a PIN to which an available period is set is used as key information and the confirmation information is exemplified, similar to the case of the above-described connected apparatus 100.

Before describing the specific process flow in the connection apparatus 1200, the description is given to the configuration of a display screen at the time of an apparatus registration process in the connection apparatus 1200 shown in FIG. 33.

As shown in FIG. 33, on a display screen 1280 at the time of an apparatus registration process in the connection apparatus 1200, for example, a list 1282 of apparatuses registered in the connection apparatus 1200 (hereinafter, referred to as "registered apparatus list"), an apparatus registration start button 1284, a key information input screen 1286, and a confirmation information display screen 1292 are displayed.

In this example, in the registered apparatus list 1282, the user U1 is a grandfather and the user U2 is a grandchildren, and a PC that is disposed in a house of the grandfather, a TV that is disposed in a house of Tanaka, and a game machine that is disposed in a house of Morita are all registered in the connection apparatus 1200 of the user U2. In this example, in the key information input screen 1286, when a PIN 188 (hereinafter, this may be called "registration codes") that is composed of a combination of figures of three digits "493-718" as the key information is notified to the user U2 from the user U1, a PIN input column 1288 is displayed to allow the user U2 to input the PIN 1188, and a cancel button 1290 that is used to cancel an apparatus registration process is displayed. In this example, in the confirmation information display screen 1292, when a PIN 1294 (hereinafter, this may be called "confirmation codes") that is composed of a combination of figures of three digits "118-526" as the confirmation information is displayed, and a cancel button 1296 that is used to cancel an apparatus registration process after the confirmation information is acquired is displayed. Hereinafter, based on FIGS. 32A and 32B and with reference to FIG. 33, a specific process flow in the connection apparatus 1200 will be described.

As shown in FIG. 32A, first, after the PIN 1188 is notified to the user U2 of the connection apparatus 1200 from the user U1 of the connected apparatus 1100, the apparatus registration start button 1284 is pressed by the user U2 (S952). If the apparatus registration start button 1284 is pressed, a signal indicating that the apparatus registration starts is transmitted to the key information input unit 1252. The key information input unit 1252 that has received the signal requests the user U2 to input the PIN 1188 notified (T1) to the user U2 from the user U1 (S954). The PIN input request is made when the output unit 222 of the connection apparatus 1200 that has received the corresponding request signal from the key information input unit 1252 performs UI display ("please input registration codes input to apparatuses to be registered" shown in FIG. 33) on the key information input screen 1286. Next, the CPU 206 of the connection apparatus 1200 determines whether the user U2 inputs the PIN 1188 to the PIN input column 1288 as the result of the PIN input request (S956). As the determined result, when the PIN 1188 is not input and the cancel button 1290 is pressed by the user U2 (S958), the connection apparatus 1200 completes an apparatus registration process of the connected apparatus 1100 (apparatus registration failure). In this example, since the PIN 1188 is information where an available period is set, even when the PIN 1188 is not input by the user U2 during the available period, the apparatus registration of the connected apparatus 1100 is completed as a failure. Meanwhile, as the determined result in Step S956, when the PIN 1188 is input by the user U2 (S960), the information providing unit 1254 of the connection apparatus 1200 notifies the apparatus registration server 1300 of the connection information (Z4) of the connection apparatus 1200 and the PIN (T1) (S962).

Then, the CPU 206 of the connection apparatus 1200 determines whether confirmation information (confirmation codes) is acquired from the apparatus registration server 1300 (S964). As the determined result, when the confirmation codes are not acquired from the apparatus registration server 1300 and the cancel button 1290 is pressed by the user U2 of the connection apparatus 1200 (S966), the connection apparatus 1200 completes an apparatus registration process on the connected apparatus 1100 (apparatus registration failure). Further, as the determined result in Step S964, when the confirmation codes are not acquired from the apparatus registration server 1300 and the session completion notification is received from the apparatus registration server 1300 (S968), the completion notification of the apparatus registration failure is UI-displayed on the display screen 1280 of the connection apparatus 1200 (S970), and the apparatus registration process is completed (apparatus registration failure). Meanwhile, as the determined result in Step S964, when the confirmation codes are received (Z5) from the apparatus registration server 1300 (S972), for example, the confirmation codes (PIN1294) are displayed on the information display screen 1292 by the output unit 122 (S974). The output method of the PIN 1294 is not limited to the above method, and a method using another output unit may be used, the detailed description of which is omitted because the description is given above.

After the confirmation codes are displayed on the confirmation information display screen 1292, the connection apparatus 1200 transmits (Z7) the acquisition request of the connection information of the connected apparatus 1100 (polling in this example) to the apparatus registration server 1300 (S976).

Next, as shown in FIG. 30B, it is confirmed (T2) whether the confirmation codes issued to the connected apparatus 1100 and the connection apparatus 1200 are the same between the user U2 capable of visually recognizing the PIN 1194 displayed on the confirmation information display screen 1192 and the user U1 of the connected apparatus 1100, by using a predetermined notifying unit that is capable of notifying information of only a specific counterpart such as a telephone (S978).

As the confirmed (T2) result, the apparatus registration server 1300 determines whether the confirmation button 1196 is pressed by the user U1 of the connected apparatus 1100 (S980). As the determined result, when the confirmation button 1106 is not pressed by the user U1 and the session completion notification is received from the apparatus registration server 1300 (S982), the completion notification of the apparatus registration failure is UI-displayed on the display screen 1280 of the connection apparatus 1200 (S970), and the apparatus registration process is completed (apparatus registration failure). Meanwhile, as the determined result in Step S980, when the confirmation button 1106 is pressed by the user U1 (S984), the CPU 206 of the connection apparatus 1200 determines whether the corresponding connection information is acquired by connection information acquiring polling of the connected apparatus 1100 (S986). As the determined result, when the connection information of the connected apparatus 1100 is not acquired and the cancel button 1296 is pressed by the user U2 (S988), the connection apparatus 1200 completes an apparatus registration process on the connected apparatus 1100 (apparatus registration failure). Meanwhile, as the determined result in Step S986, when the connection information of the connected apparatus 1100 is received (Z10) from the apparatus registration server 1300 (S990), a registration process on the connected apparatus 1100 is executed based on the received connection information (S992), and an apparatus registration process on the connected apparatus 1100 is completed (apparatus registration success). As such, if the apparatus registration is performed, the connected apparatus 1100 is added to the registered apparatus list 1282 of the display screen 1280.

(Process Flow in Apparatus Registration Server 1300)

Next, based on FIGS. 34A, 35A, and 35B, a process flow in the apparatus registration server 1300 will be described in detail. FIG. 34 is a flowchart illustrating the entire process flow of an apparatus registration server 1300 that manages a plurality of sessions, among a process flow in the apparatus registration server 1300, and FIGS. 35A and 35B are flowcharts illustrating a process flow for every session among a process flow in an apparatus registration server 1300. FIG. 34 and FIGS. 35A and 35B show the symbols (Z1 to Z10, T1, and T2) of the individual processes shown in FIG. 26 together. The case where a PIN to which an available period is set is used as key information is exemplified, similar to the case of the above-described connected apparatus 1100.

First, the entire process flow of the apparatus registration server 1300 that manages a plurality of sessions will be described with reference to FIG. 34.

As shown in FIG. 34, the apparatus registration server 1300 enters a waiting state when the connected apparatus 1100 and the connection apparatus 1200 do not have access (connection request) to the apparatus registration server 1300. In this waiting state, when receiving arbitrary information from another apparatus (the connected apparatus 1100 or the connection apparatus 1200 in this state), the apparatus registration server 1300 discriminates the contents of the received information. The process proceeds to three channels P to R in accordance with the determined result of the received information.

First, when the apparatus registration server 1300 receives the registration code acquisition request (Z1) from the connected apparatus 1100 (S1002), the process proceeds to the channel P. In this example, the registration information generating unit 1352 of the apparatus registration server 1300 that has received the registration code acquisition request generates the PIN 1188 composed of a combination of figures of three digits where the available period is set (S1004). As described above, Step S1004 is not necessarily performed after Step S1002. That is, the PIN 1188 may not be generated in accordance with the registration code acquisition request (Z1) of the connected apparatus 1100. Alternatively, the PIN 1188 may be generated by the registration information generating unit 1352 in advance, recorded in the storage unit 1326 of the apparatus registration server 1300, and extracted from the storage unit 1326. Next, the apparatus registration server 1300 transmits the PIN 1188 generated in Step S1004 to the connected apparatus 1100 and establishes a session with the connected apparatus 1100 as a transmission destination of the PIN 1188 (S1006), and the apparatus registration server 1300 reenters a waiting state. The session that is established with the connected apparatus 1100 is maintained during the available period of the PIN 1188 as long as the apparatus registration server 1300 does not receive the session completion notification from the connected apparatus 1100.

Second, when the confirmation code acquisition request is received (Z3) from the connected apparatus 1100 during the available period of the PIN 1188 (S1008), when the connection information of the connection apparatus 1200 and the notification of the registration codes are received from the connection apparatus 1200 (S1010), when the connection information acquisition request of the connected apparatus 1100 is received (Z7) from the connection apparatus 1200, and when the notification of the result of the confirmation process is received (Z8) from the connected apparatus 1100, the process proceeds to the channel B. The apparatus registration server 1300 also receives the registration codes when each information is received. The collating unit 1364A of the apparatus registration server 1300 collates the PIN received from the connection apparatus 1200 and the PIN 1188 issued to the connected apparatus 1100 (S1016). Next, the CPU 306 of the apparatus registration server 1300 determines whether the PIN received from the connection apparatus 1200 is matched with the PIN 1188 issued to the connected apparatus 1100 as the collating result in Step S1016 (S1018). As the determined result, when the two PINs are not matched with each other, the apparatus registration server 1300 reenters a waiting state. Meanwhile, as the determined result in Step S1018, when the two PINs are matched with each other, the session searching unit 1364B searches whether a session corresponding to the matched PIN 1188, that is, in this example, a session established between the apparatus registration server 1300 and the connected apparatus 1100 and the connection apparatus 1200 exists, and the CPU 306 determines the searched result (S1020). As the determined result, when it is determined that the corresponding session exists, information about the acquisition request of each apparatus is transmitted to a counterpart whose session is established through the corresponding session, that is, in this example, the connected apparatus 1100 or the connection apparatus 1200 (S1022), and the apparatus registration server 1300 reenters a waiting state. Meanwhile, as the determined result in Step S1020, when it is determined that the corresponding session does not exist, an error notification is transmitted to an apparatus (the connected apparatus 1100 or the connection apparatus 1200) that has transmitted the corresponding information (S1024), and the apparatus registration server 1300 reenters a waiting state.

Third, when the session completion notification (session completion request notification) is received from the connected apparatus 1100 (S1026), the process proceeds to the channel C. The apparatus registration server 1300 also receives the PIN when the session completion notification is received from the connected apparatus 1100. The collating unit 1364A of the apparatus registration server 1300 collates the PIN received from the connected apparatus 1100 and the registration codes (PIN 1188) issued to the connected apparatus 1100 (S1028). Next, the CPU 306 of the apparatus registration server 1300 determines whether the PIN received from the connected apparatus 1100 together with the session completion notification is matched with the PIN 1188 issued to the connected apparatus 1100 as the collating result in Step S1028 (S1030). As the determined result, when the two PINs are not matched with each other, the apparatus registration server 1300 reenters a waiting state. Meanwhile, as the determined result in Step S1030, when the two PINs are matched with each other, the session searching unit 1364B searches whether a session corresponding to the matched PIN 1188, that is, in this example, a session established between the apparatus registration server 1300 and the connected apparatus 1100 exists, and the CPU 306 determines the searched result (S1032). As the determined result, when it is determined that the corresponding session exists, the session completion notification (notification indicating that the session is actually completed) is transmitted to a counterpart whose session is established through the corresponding session, that is, in this example, the connected apparatus 1100 (S1034), and the apparatus registration server 1300 reenters a waiting state. Meanwhile, as the determined result in Step S1032, when it is determined that the corresponding session does not exist, the session completion notification is transmitted to the corresponding apparatus (in this case, connection apparatus 1200) (S1024), and the apparatus registration server 1300 reenters a waiting state.

Next, with reference to FIGS. 35A and 35B, a process flow for every session of the apparatus registration server 1300 that manages a plurality of sessions will be described. In the below description, a process flow in the session that is established between the apparatus registration server 1300 and the connected apparatus 1100 is exemplified.

As shown in FIG. 35A, after the apparatus registration server 1300 establishes the session with the connected apparatus 1100 (S1042), the apparatus registration server 300 notifies (Z2) the connected apparatus 1100 of the registration codes (PIN 1188) through the established session (S1044). In this example, since the PIN 1188 is information where the available period is set, a session timer starts from a point of time when the session is notified to the connected apparatus 1100 (S1046). Next, the CPU 306 determines whether the registration codes (PIN 1188) are notified from the connection apparatus 1200 within the restriction time of the session timer (S1048). As the determined result, when the registration codes are not received from the connection apparatus 200 and the session timer becomes timeout (S1050), the apparatus registration server 1300 notifies the connected apparatus 1100 of the session completion (S1052) and completes an apparatus registration process (apparatus registration failure). In addition, as the determined result in Step S1048, when it is determined that the session completion is notified to the connection apparatus 1200 (S1054), the apparatus registration process is completed (apparatus registration failure). At this stage, when the confirmation code acquisition request is received (Z3) from the connected apparatus 1100 (S1056), the apparatus registration server 1300 transmits an error notification to the connected apparatus 1100 (S1058) and the process returns to Step S1048.

Meanwhile, as the determined result in Step S1048, when it is determined that the notification of the registration codes and the connection information of the connection apparatus 1200 are received (Z4) from the connection apparatus 1200 (S1060), the registration information generating unit 1352 of the apparatus registration server 1300 generates the confirmation codes (S1062), and notifies (Z6) the connection apparatus 1200 of the created confirmation codes (S1064).

Next, as shown in FIG. 35B, the CPU 306 of the apparatus registration server 1300 determines whether the acquisition request of the confirmation codes is received from the connected apparatus 1100 (S1066). As the determined result, it is determined that the acquisition request of the confirmation codes is not received from the connected apparatus 1100. At this stage, when the apparatus registration server 1300 receives (Z7) the acquisition request of the connection information of the connected apparatus 1100 from the connection apparatus 1200 (S1068), the apparatus registration server 1300 transmits an error notification to the connection apparatus 1200 (S1070), and the process returns to Step S1066. Meanwhile, as the determined result in Step S1066, when it is determined that the acquisition request of the confirmation codes is received (Z3) from the connected apparatus 1100 (S1072), the apparatus registration server 1300 notifies (Z6) the connected apparatus 1100 of the confirmation codes (S1074).

Next, the CPU 306 of the apparatus registration server 1300 determines whether the notification indicating that it is confirmed as the confirmation result that the confirmation information is the same between the connected apparatus 1100 and the connection apparatus 1200 is given from the connected apparatus 1100 (S1076). As the determined result, it is determined that the notification indicating that it is confirmed as the confirmation result that the confirmation information is the same between the connected apparatus 1100 and the connection apparatus 1200 is not given from the connected apparatus 1100. At this stage, when the apparatus registration sever 1300 receives (Z7) the acquisition request of the connection information of the connected apparatus 1100 from the connection apparatus 1200 (S1078), the apparatus registration server 1300 transmits an error notification to the connection apparatus 1200 (S1080) and the process returns to Step S1076. Meanwhile, as the determined result in Step S1076, when the notification indicating that it is confirmed as the confirmation result that the confirmation information is the same between the connected apparatus 1100 and the connection apparatus 1200 is received (Z8) from the connected apparatus 1100 and the connection information of the connected apparatus 1100 is simultaneously received (S1082), the apparatus registration server 1300 transmits (Z9) the connection information of the connection apparatus 1200 to the connected apparatus 1100 (S1084).

When the apparatus registration server 1300 receives (Z7) the acquisition request of the connection information of the connected apparatus 1100 from the connection apparatus 1200 after transmitting (Z9) the connection information of the connection apparatus 1200 to the connected apparatus 1100 (S1086), the apparatus registration server 1300 transmits (Z10) the connection information of the connected apparatus 1100 to the connection apparatus 1200 (S1088) and completes an apparatus registration process (success completion).

It should be understood by those skilled in the art that various modifications, combinations, sub-combinations and alterations may occur depending on design requirements and other factors insofar as they are within the scope of the appended claims or the equivalents thereof.

What is claimed is:

1. A connection authentication system, comprising:
a first terminal apparatus;
a second terminal apparatus configured for connecting to the first terminal apparatus through a network; and
a connection authentication server that is connected to the first terminal apparatus and the second terminal apparatus,
wherein the first terminal apparatus includes:
a first memory storing a first program; and
a first processor configured to execute the first program to cause the first terminal apparatus to perform a first method, comprising:
acquiring authentication information from the connection authentication server,
notifying a user of the first terminal apparatus of the authentication information, and
acquiring connection information of the second terminal apparatus from the connection authentication server,
the second terminal apparatus includes:
a second memory storing a second program; and
a second processor configured to execute the second program to cause the second terminal apparatus to perform a second method, comprising:
allowing a user of the second terminal apparatus to input the authentication information transmitted from the user of the first terminal apparatus to the user of the second terminal apparatus, and
providing the authentication information and the connection information of the second terminal apparatus to the connection authentication server,
and the connection authentication server includes:
a third memory storing a third program; and
a third processor configured to execute the third program to cause the connection authentication server to perform a third method, comprising:
providing the authentication information to the first terminal apparatus, wherein the connection authentication server holds the authentication information provided to the first terminal apparatus for only a predetermined period of time,
acquiring the authentication information and the connection information of the second terminal apparatus from the second terminal apparatus, and
collating the authentication information provided to the first terminal apparatus and the authentication information acquired from the second terminal apparatus,
detecting whether a session formed between the connection authentication server and the first terminal apparatus exists or not, wherein the session only exists during the predetermined period of time, and providing the connection information of the second terminal apparatus to the first terminal apparatus when the provided authentication information and the acquired authentication information are matched with each other and the session is detected.

2. The connection authentication system according to claim 1,
wherein the first method further includes transmitting the authentication information from the user of the first terminal apparatus to the user of the second terminal apparatus by using a notifying unit that notifies only a predetermined counterpart of information.

3. The connection authentication system according to claim 2,
wherein the notifying unit uses a telephone circuit.

4. The connection authentication system according to claim 1,
wherein the connection information includes at least network and address information.

5. The connection authentication system according to claim 1,
wherein the first method further includes requesting the authentication information in accordance with a request from a user of the first terminal apparatus; and acquiring the authentication information and the connection information of the second terminal apparatus.

6. A connection authentication system, comprising: a first terminal apparatus;
a second terminal apparatus configured for connecting to the first terminal apparatus through a network; and
a connection authentication server that is connected to the first terminal apparatus and the second terminal apparatus,
wherein the first terminal apparatus includes:
a first memory storing a first program; and
a first processor configured to execute the first program to cause the first terminal apparatus to perform a first method, comprising:
acquiring authentication information from the connection authentication information server,
notifying an a user of the first terminal apparatus of the authentication information,
acquiring from the connection authentication server confirmation information needed when it is confirmed whether the second terminal apparatus receives the authentication information transmitted from the user of the first terminal apparatus,
notifying the user of the first terminal apparatus of the confirmation information, and
acquiring connection information of the second terminal apparatus from the connection authentication server,
the second terminal apparatus includes:
a second memory storing a second program; and
a second processor configured to execute the second program to cause the second terminal apparatus to perform a second method, comprising:
allowing a user of the second terminal apparatus to input the authentication information transmitted from the user of the first terminal apparatus to the user of the second terminal apparatus,
providing the authentication information and the connection information of the second terminal apparatus to the connection authentication server, a confirmation information acquiring unit that acquires the confirmation information from the connection authentication server, and
notifying the user of the second terminal apparatus of the confirmation information, and the connection authentication server includes:
a third memory storing a third program; and
a third processor configured to execute the third program to cause the connection authentication server to perform a third method, comprising:
providing the authentication information to the first terminal apparatus, wherein the connection authentication server holds the authentication information provided to the first terminal apparatus for only a predetermined period of time,
acquiring the authentication information and the connection information of the second terminal apparatus from the second terminal apparatus,
collating the authentication information provided to the first terminal apparatus and the authentication information acquired from the second terminal apparatus, detecting whether a session formed between the connection authentication server and the first terminal apparatus exists or not, wherein the session only exists during the predetermined period of time, providing provides the confirmation information to the second terminal apparatus when the provided authentication information and the acquired authentication information are matched with each other and the session is detected, providing the confirmation information to the first terminal apparatus in accordance with an acquisition request of the confirmation information from the first terminal apparatus, and
providing the connection information of the second terminal apparatus to the first terminal apparatus.

7. The connection authentication system according to claim 6,
wherein the first method further includes
confirming whether the confirmation information provided to the first terminal apparatus and the confirmation information provided to the second terminal apparatus are the same, and notifying the connection authentication server of the confirmation result when the confirmation information provided to the first terminal apparatus and the confirmation information provided to the second terminal apparatus are the same,
the third method further includes
receiving the notification of the confirmation result from the first terminal apparatus, and
providing the connection information of the second terminal apparatus to the first terminal apparatus only when the confirmation result receiving unit receives the notification of the confirmation result from the first terminal apparatus.

8. The connection authentication system according to claim 7,
wherein the first method further includes
providing the connection information of the first terminal apparatus to the connection authentication server, when the confirmation result is notified to the connection authentication server,
the second method further includes
acquiring the connection information of the first terminal apparatus from the connection authentication server, and providing the connection information of the first terminal apparatus to the second terminal apparatus in accordance with a request from the second terminal apparatus, after the confirmation result receiving unit receives the notification of the confirmation result from the first terminal apparatus.

9. A connection authentication server that is connected to a first terminal apparatus and connected to a second terminal apparatus connected to the first terminal apparatus through a network, the connection authentication server comprising:
   a memory storing a program; and
   a processor configured to execute the program to cause the connection authentication server to perform a method, comprising:
      providing authentication information to the first terminal apparatus, wherein the connection authentication server holds the authentication information provided to the first terminal apparatus for only a predetermined period of time;
      acquiring the authentication information and the connection information of the second terminal apparatus from the second terminal apparatus, after the authentication information is transmitted to a user of the second terminal apparatus from a user of the first terminal apparatus to which the authentication information is notified from the first terminal apparatus; and
      collating the authentication information provided to the first terminal apparatus and the authentication information acquired from the second terminal apparatus, detecting whether a session formed between the connection authentication server and the first terminal apparatus exists or not, wherein the session only exists during the predetermined period of time, and providing the connection information of the second terminal apparatus to the first terminal apparatus when the provided authentication information and the acquired authentication information are matched with each other and the session is detected.

10. A connection authentication method that provides connection information from a connection authentication server to a first terminal apparatus after providing the connection information from a second terminal apparatus having predetermined connection information to the connection authentication server connected to the second terminal apparatus and the first terminal apparatus, when the connection information is provided from the second terminal apparatus to the first terminal apparatus connected to the second terminal apparatus through a network, the connection authentication method comprising the steps of:
   providing authentication information to the first terminal apparatus by the connection authentication server, wherein the connection authentication server holds the authentication information provided to the first terminal apparatus for only a predetermined period of time;
   notifying a user of the first terminal apparatus of the authentication information by the first terminal apparatus;
   transmitting the authentication information to a user of the second terminal apparatus by the user of the first terminal apparatus;
   inputting the authentication information to the second terminal apparatus by the user of the second terminal apparatus;
   providing the input authentication information and the connection information to the connection authentication server by the second terminal apparatus; and
   collating the authentication information provided to the first terminal apparatus and the authentication information acquired from the second terminal apparatus, detecting whether a session formed between the connection authentication server and the first terminal apparatus exists or not, wherein the session only exists during the predetermined period of time, and providing the connection information of the second terminal apparatus to the first terminal apparatus by the connection authentication server when the provided authentication information and the acquired authentication information are matched with each other and the session is detected.

11. A non-transitory computer-readable storage medium storing a program that, when executed by a processor causes a computer in a connection authentication server, which is connected to a first terminal apparatus and connected to a second terminal apparatus connected to the first terminal apparatus through a network, to perform a method, the method comprising
   providing authentication information to the first terminal apparatus, wherein the connection authentication server holds the authentication information provided to the first terminal apparatus for only a predetermined period of time;
   acquiring the authentication information and the connection information of the second terminal apparatus from the second terminal apparatus, after the authentication information is transmitted to a user of the second terminal apparatus from a user of the first terminal apparatus to which the authentication information is notified from the first terminal apparatus; and
   collating the authentication information provided to the first terminal apparatus and the authentication information acquired from the second terminal apparatus, detecting whether a session formed between the connection authentication server and the first terminal apparatus exists or not, wherein the session only exists during the predetermined period of time, and provides the connection information of the second terminal apparatus to the first terminal apparatus when the provided authentication information and the acquired authentication information are matched with each other and the session is detected.

* * * * *